(12) United States Patent
Kondo et al.

(10) Patent No.: US 6,987,884 B2
(45) Date of Patent: Jan. 17, 2006

(54) IMAGE PROCESSING DEVICE AND METHOD, AND RECORDED MEDIUM

(75) Inventors: Tetsujiro Kondo, Tokyo (JP); Yasunobu Node, Tokyo (JP); Hisakazu Shiraki, Kanagawa (JP); Katsuhisa Shinmei, Tokyo (JP)

(73) Assignee: Sony Corporation, Tokyo (JP)

( * ) Notice: Subject to any disclaimer, the term of this patent is extended or adjusted under 35 U.S.C. 154(b) by 542 days.

(21) Appl. No.: 10/089,926

(22) PCT Filed: Aug. 7, 2001

(86) PCT No.: PCT/JP01/06794

§ 371 (c)(1),
(2), (4) Date: Jul. 31, 2002

(87) PCT Pub. No.: WO02/13512

PCT Pub. Date: Feb. 14, 2002

(65) Prior Publication Data

US 2003/0035594 A1 Feb. 20, 2003

(51) Int. Cl.
G06K 9/46 (2006.01)
G06K 9/66 (2006.01)
(52) U.S. Cl. .................. 382/190; 382/224; 382/275; 382/299; 345/641; 348/701; 348/910
(58) Field of Classification Search ............. 382/190, 382/224, 298, 299, 275, 300; 348/701, 620, 348/458, 910; 345/641, 647
See application file for complete search history.

(56) References Cited

U.S. PATENT DOCUMENTS

| 5,497,430 | A | * | 3/1996 | Sadovnik et al. ........... 382/156 |
| 5,499,057 | A | | 3/1996 | Kondo et al. ............... 348/607 |
| 5,511,136 | A | * | 4/1996 | Kim ........................... 382/275 |
| 5,602,938 | A | * | 2/1997 | Akiyama et al. ........... 382/155 |
| 5,778,095 | A | * | 7/1998 | Davies ....................... 382/225 |
| 5,841,470 | A | * | 11/1998 | Welsh ..................... 375/240.1 |
| 5,852,470 | A | * | 12/1998 | Kondo et al. ............... 348/448 |
| 5,991,464 | A | * | 11/1999 | Hsu et al. ................... 382/300 |
| 6,516,088 | B1 | * | 2/2003 | Kondo et al. ............... 382/162 |
| 6,658,155 | B1 | * | 12/2003 | Kondo et al. ............... 382/238 |

(Continued)

FOREIGN PATENT DOCUMENTS

JP 6-225178 8/1994

(Continued)

*Primary Examiner*—Bhavesh M. Mehta
*Assistant Examiner*—Manav Seth
(74) *Attorney, Agent, or Firm*—Frommer Lawrence & Haug LLP; William S. Frommer

(57) ABSTRACT

A storage picture generating unit (191) weight-adds an input picture and a storage picture to reduce the noise in a still picture portion. An area extraction unit (193) extracts a class tap from the input picture, while extracting a block from each of the input picture and the storage picture. A feature value detection unit (194) detects the dynamic range and the results of the waveform analysis from the class tap, while detecting the still/moving information of the subject pixel from the block. A class code detection unit (195) generates a class code which is based on the feature value. A table (196) outputs to an estimation calculating unit (198) sets of the prediction coefficients held by the table and which are associated with the class code. An area extraction unit (197) extracts prediction taps from the input picture and the storage picture. Using the sets of the prediction coefficients and the pixel information from the area extraction unit (197), the estimation calculating unit (198) sequentially generates pixel values y of an output picture.

78 Claims, 45 Drawing Sheets

U.S. PATENT DOCUMENTS

2003/0039407 A1 * 2/2003 Okada .................. 382/298

FOREIGN PATENT DOCUMENTS

| JP | 7-115569 | 5/1995 |
| JP | 8-51599 | 2/1996 |
| JP | 11-27564 | 1/1999 |
| JP | 2000-78534 | 3/2000 |
| JP | 2000-134511 | 5/2000 |
| WO | WO 98/51072 | 11/1998 |

* cited by examiner

FIG.4A
(PRIOR ART)
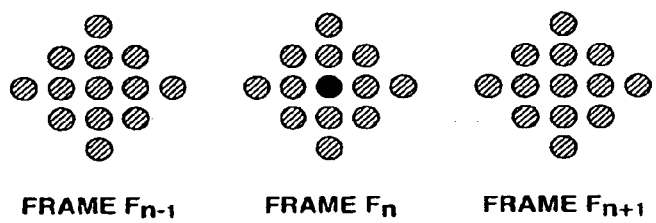
FRAME $F_{n-1}$     FRAME $F_n$     FRAME $F_{n+1}$
FIG.4B
(PRIOR ART)
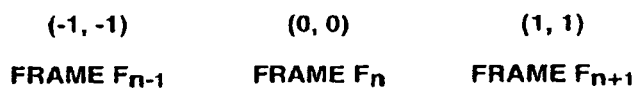
FIG.4C
(PRIOR ART)
FRAME $F_{n-1}$     FRAME $F_n$     FRAME $F_{n+1}$

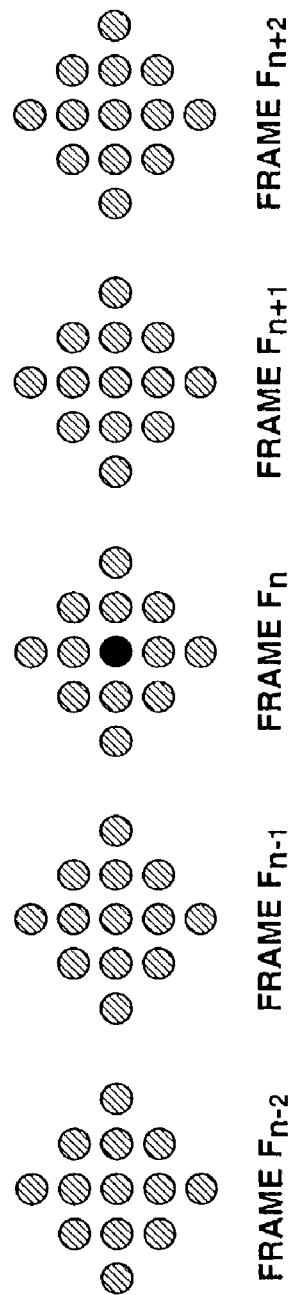
FIG.25A
FIG.25B

TELOP (FEATURE PICTURE)

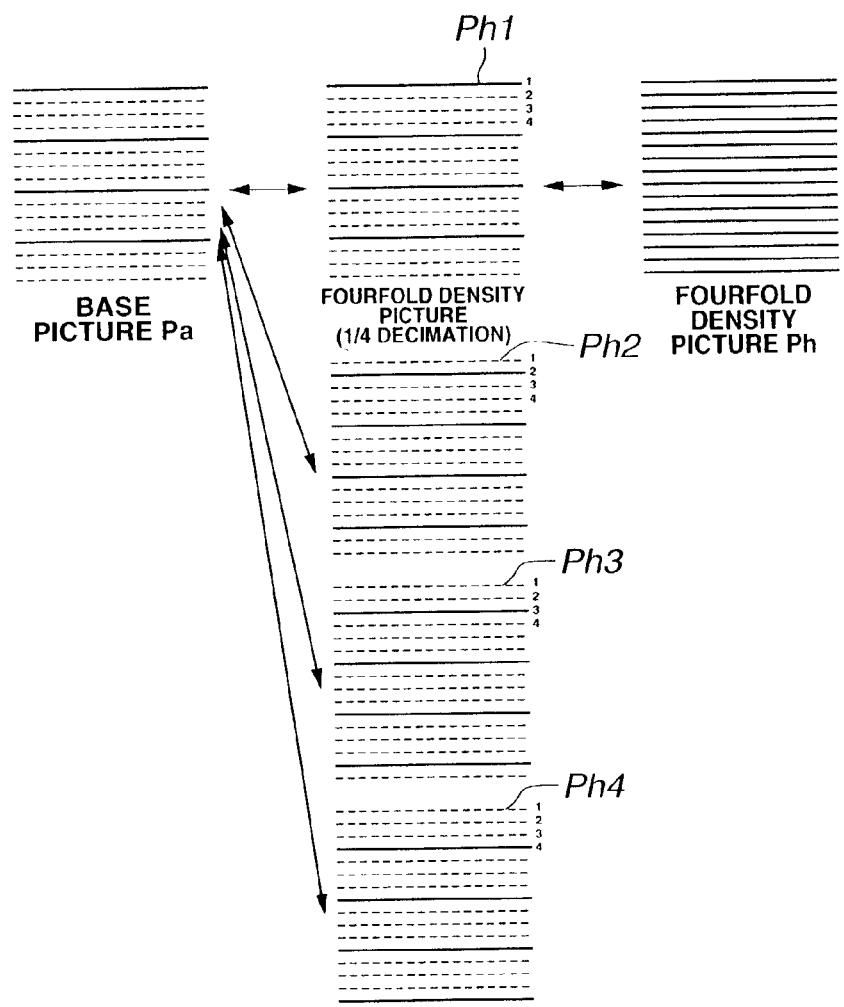
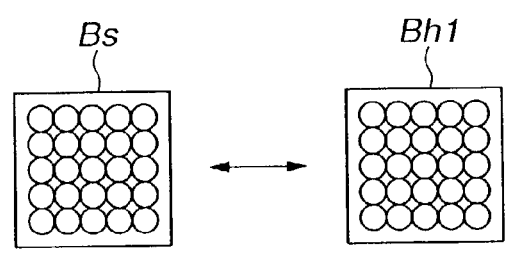
FIG.44A
FIG.44B

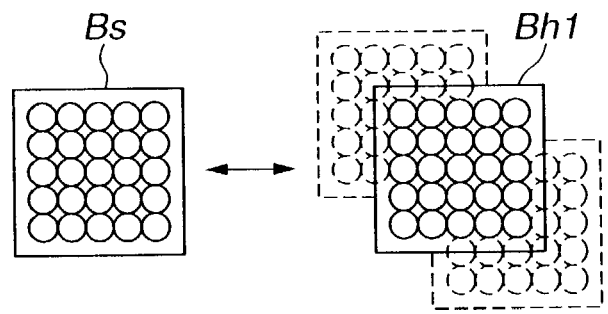
FIG.45
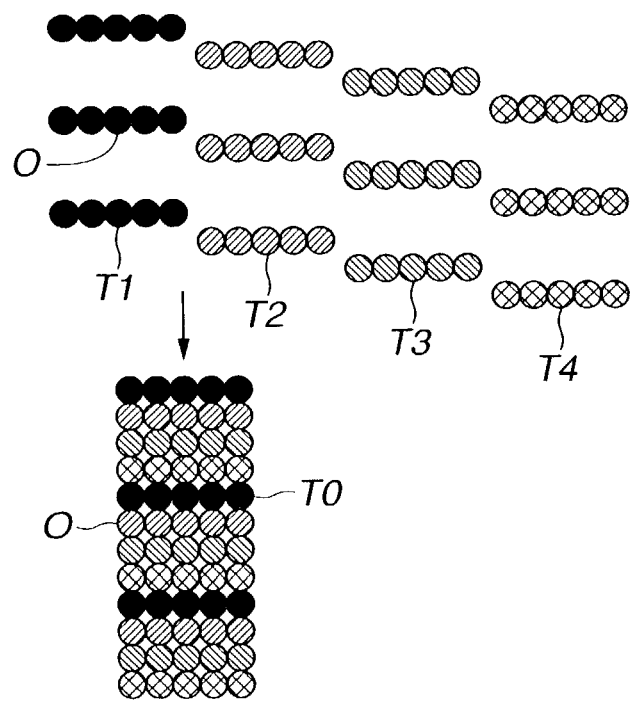
FIG.46A
FIG.46B

US 6,987,884 B2

IMAGE PROCESSING DEVICE AND METHOD, AND RECORDED MEDIUM

TECHNICAL FIELD

This invention relates to a picture processing method and a picture processing apparatus, and to a recording medium. More particularly, it relates to a picture processing method and a picture processing apparatus, and to a recording medium, for satisfactorily generating a picture higher in quality than an input picture.

BACKGROUND ART

Up to now, a technique of performing variable processing on an input picture to generate a picture of higher picture quality has been developed. By utilizing this technique, it is possible to generate, from a noisy input picture, a picture reduced in noise, or to generate a picture having its edge not blurred, from an input picture containing a picture area having relative movement with respect to other picture portions, such as background, referred to below as a feature area, e.g., a telop, and having the edge blurred.

Referring to FIGS. 1 to 9, the conventional method of generating a picture reduced in noise is explained.

In a conventional picture processing apparatus 10, a noisy input picture is input to a substracter 11 and to an amplifier 14. The substracter 11 is also fed from a frame memory 17 with a picture delayed one frame with respect to the input picture. The picture from the frame memory 17 is also supplied to an amplifier 16.

The substracter 11 subtracts the picture, sent from the frame memory 17, from the input picture, to send the resulting difference to a difference calculation unit 12. The difference calculation unit 12 acquires the absolute value of the results of the calculations from the substracter 11, as a difference between the input picture and the picture from the frame memory 17 (picture of the directly previous frame picture) to output the so acquired absolute value to a threshold value decision unit 13.

The threshold value decision unit 13 compares the difference value from the difference calculation unit 12 to a preset threshold value and, based on the results of comparison, decides whether or not the input picture is a still picture portion or a moving picture portion, from pixel to pixel, to set a weighting value p based on the result of the decision.

If the input picture is determined to be the still picture portion, the weighting value p is set to a preset fixed value between 0 and 0.5. If the input picture is determined to be the moving picture portion, the weighting value p is set to a value 1.

The amplifier 14 amplifies the signal of the input picture, with the weighting value p, as set by the threshold value decision unit 13, as an amplification factor, to send the amplified signal to an adder 15. The amplifier 16 amplifies the signals of the picture from the frame memory 17, using a value corresponding to subtraction of the weighting value p from unity (1), as an amplification factor, to send the resulting amplified signal to the adder 15, which then sums the outputs of the amplifiers 14, 16 together to output the resulting sum signal.

That is, if the input picture is the still picture portion, the pixel value of the input picture and the pixel value of a picture delayed by one frame from the input picture are weight-summed together, with a weighting value p. By summing the noisy input picture to the picture of the directly previous frame, in this manner, temporally non-steady elements, such as noise, may be reduced.

However, if the input picture is a still picture portion, the weighting value p is set at a certain fixed value, and hence the noise cannot be reduced in association with its magnitude or direction. Moreover, if, due to mistaken decision by the threshold value decision unit 13, the moving picture portion is determined to be the still picture portion, weight-addition with the weighting value p is also applied to the moving picture portion, so that, in this case, trailing type picture quality deterioration is produced.

If the input picture is the moving picture portion, the weight-addition with the weighting value p=1 is executed. That is, the input picture is output directly, such that the noise is not reduced for the moving picture portion. On the other hand, if the input picture is the still picture portion, but the noise contained therein is significant, the still picture portion may be erroneously determined to be the moving picture portion. In such case, the input picture (still picture portion) is directly output, that is, the noise is not reduced.

FIG. 2 shows another illustrative structure of a conventional picture processing apparatus. In a picture processing apparatus 20, shown in FIG. 2, the noise of the moving picture portion is reduced by classification adaptive processing which is based on taps corresponding to the motion vector.

The input picture, corrupted with noise, is sent to a frame memory 21-1. The frame memory 21-1 delays the input picture by one frame and sends the so delayed input picture to a frame memory 21-2, a motion vector detection unit 22 and to area extraction units 24, 27.

The frame memory 21-2 delays the picture from the frame-memory 21-2 by one frame and sends the so delayed picture to a frame memory 21-3, a motion vector detection unit 23 and to the area extraction units 24, 27.

The frame memory 21-3 delays the picture from the frame-memory 21-2 by one frame and sends the so delayed picture to the motion vector detection unit 23 and to the area extraction units 24, 27.

The motion vector detection unit 22 applies motion matching to two temporally consecutive frames, sent from the frame memories 21-1, 21-2, to detect the motion vector to send the detected results to the area extraction unit 24.

The motion vector detection unit 23 applies motion matching to two temporally consecutive frames, sent from the frame memories 21-2, 21-3, to detect the motion vector to send the detected results to the area extraction unit 27.

The area extraction unit 24 references the motion vector supplied from the motion vector detection unit 22 to extract preset picture areas as class taps from the frames supplied from the frame memories 21-1 to 21-3.

FIG. 3A shows picture areas extracted as class taps. A sum-total of three pixels, namely a subject pixel on a frame Fn from the frame memory 21-2, as indicated with a black circle in the drawing, a pixel on a frame Fn−1 from the frame memory 21-1 (frame directly previous to the frame Fn), lying at a position specified by the motion vector from the motion vector detection unit 22 with respect to the subject pixel, as indicated by a hatched circle, and a pixel on a frame Fn+1 from the frame memory 21-3 (frame directly following the frame Fn), lying at a position specified by the motion vector from the motion vector detection unit 22 with respect to the subject pixel, as indicated by a hatched circle, are extracted as being class taps.

If, for example, the frame Fn and the other frames are as indicated in FIG. 3B, that is if the motion vector between the frame Fn−1 and the frame Fn is (−1, −1) and the motion vector between the frame Fn+1 and the frame Fn is (1, 1), with the motion vector between the frame Fn and the frame Fn being naturally (0, 0), as shown in FIG. 3B, the subject pixel on the frame Fn, the pixel on the frame Fn−1 at a position specified by the motion vector (−1, −1) with respect to the subject pixel and the pixel on the frame Fn+1 at a position specified by the motion vector (1, 1) with respect to the subject pixel, are extracted as being class taps, as shown in FIG. 3C.

The area extraction unit 24 sends the extracted class taps to a class code generating unit 25.

The class code generating unit 25 applies e.g., ADRC processing to the class taps supplied from the area extraction unit 24 and extracts tempo-spatial patterns of the class taps while generating a class code indicating the class obtained on classification conforming to the extracted patterns. The class code generating unit 25 sends the generated class code to a ROM table 26.

The ROM table 26 holds a set of prediction coefficients calculated for a case where a noisy picture is a pupil picture and a noise-free picture is a teacher picture, from class to class, and outputs what corresponds to the class code sent from the class code generating unit 25, from among the prediction coefficients of the set, to an estimation processing unit 28.

The area extraction unit 27 references the motion vector supplied from the motion vector detection unit 23 to extract preset picture areas as prediction taps from picture data of the frames supplied from the frame memories 21-1 to 21-3.

FIG. 4A shows the structure of the prediction taps. A subject pixel on the frame Fn, indicated with a black circle in the drawing, along with pixels lying around the subject pixel, indicated with thin black in the drawing, totaling at 13 pixels, a pixel on the frame Fn−1 specified by the motion vector from the motion vector detection unit 22 with respect to the subject pixel, along with pixels lying around the pixel, indicated with thin black in the drawing, totaling at 13 pixels, and a pixel on the frame Fn+1 specified by the motion vector from the motion vector detection unit 22 with respect to the subject pixel, along with pixels lying around the pixel, indicated with thin black in the drawing, totaling at 13 pixels, are extracted as being prediction taps.

If, for example, the motion vector between the frame Fn−1 and the frame Fn is (−1, −1) and the motion vector between the frame Fn and the frame Fn+1 is (1, 1), with the motion vector between the frame Fn and the frame Fn being naturally (0, 0), as shown in FIG. 4B, the subject pixel on the frame Fn, a pixel on the frame Fn−1 at a position specified by the motion vector (−1, −1) with respect to the subject pixel and a pixel on the frame Fn+1 at a position specified by the motion vector (1, 1) with respect to the subject pixel, along with each 13 pixels there around, are extracted as being class taps, as shown in FIG. 4C.

The area extraction unit 27 sends the extracted prediction taps to the estimation processing unit 28.

The estimation processing unit 28 executes preset calculations, based on the prediction taps supplied from the area extraction unit 27 and on the set of the prediction coefficients, supplied from the ROM memory 26, to generate a picture reduced in noise.

However, in the present instance, since the block matching is first carried out to detect the motion vector, a large amount of calculations are needed, thus entailing extremely time-consuming operations.

FIG. 5 shows another illustrative structure of the conventional picture processing apparatus. In a picture processing apparatus 30, shown in FIG. 5, classification adaptive processing based on taps corresponding to the motion vector is similarly carried out to reduce the noise in the moving picture portion. However, in the present case, the motion vector is detected by a method in which the processing load is lesser than with the block matching.

This picture processing apparatus 30 is provided with a tap array decision unit 31, which is to take the place of the motion vector detections units 22, 23 of the picture processing apparatus 20 of FIG. 2. It is noted that parts or components equivalent to those shown in FIG. 2 are denoted by the same base numerals to omit the corresponding description for simplicity.

A noisy input picture is sent to a frame memory 21-1. This frame memory 21-1 delays the input picture by one frame and routes the so delayed input picture to a frame memory 21-2, an area extraction unit 24, an area extraction unit 27 and to a tap array decision unit 31.

The frame memory 21-2 delays the picture from the frame memory 21-1 by one frame and sends the so delayed picture to a frame memory 21-3, area extraction units 24, 27 and to the tap array decision unit 31.

The frame memory 21-3 delays the picture from the frame memory 21-2 by one frame and sends the so delayed picture to a frame memory 21-4, area extraction units 24, 27 and to the tap array decision unit 31.

The frame memory 21-4 delays the picture from the frame memory 21-3 by one frame and sends the so delayed picture to a frame memory 21-5, area extraction units 24, 27 and to the tap array decision unit 31.

The frame memory 21-5 delays the picture from the frame memory 21-4 by one frame and routes the so delayed picture to the area extraction units 24, 27 and to the tap array decision unit 31.

The tap array decision unit 31 detects the motion vector from the frame memories 21-1 to 21-5, and decides the arraying positions of the class taps or prediction taps, based on the so detected motion vector, to send the results of decision to the area extraction units 24, 27.

The motion vector is detected in the tap array decision unit 31 based on the following premises:

In five consecutive frames, the interval between the first frame (frame number 1) and the last frame (frame number five) is short, with the picture movement over the five frames being a rectilinear movement at an equal speed.

If the noise is contained in none of the five consecutive frames, the variance of pixels of the respective frames lying at the same position of the picture is equal to 0 or extremely close to 0.

That is, in these premises, a straight line segment may be drawn which passes through a subject pixel on the frame Fn (frame from the frame memory 21-3), and pixels lying in register with the subject pixel, that is lying at the same positions on the picture, on the frame Fn−1 (frame from the frame memory 21-2), frame Fn−2 (frame from the frame memory 21-1), frame Fn+1 (frame from the frame memory 21-4) and frame Fn+2 (frame from the frame memory 21-5), in a three-dimensional plane comprised of X axis and the Y axis on the picture and time, as shown in FIG. 6. That is, the tap array decision unit 31 detects this straight line segment as being a motion vector.

Referring to the flowchart of FIG. 7, the operation of the tap array decision unit 31, in case of executing the processing of tap array decision, is hereinafter explained.

At step S1, the tap array decision unit 31 sets, on the frame Fn, an area comprised of, for example, 5×5 pixels, centered about a subject pixel on the frame Fn from the frame memory 21-3.

At the next step S2, the tap array decision unit 31 selects a pixel from the area of the 5×5 pixels on the frame Fn, as set at step S1, as the center pixel, while setting a search range centered about a pixel on the frame Fn−1 from the frame memory 21-2, registering with the center pixel.

At step S3, the tap array decision unit 31 initializes the coordinates (a, b), specifying a pixel in the search range, to (0, 0), as shown in FIG. 8.

At the next step S4, the tap array decision unit 31 generates a straight line segment passing through the pixel in the search range, specified by the coordinates (a, b), that is a pixel on the frame Fn−1, and through the subject pixel on the frame Fn.

At step S5, the tap array decision unit 31 calculates the variance between the pixels of the frame Fn−2 to Fn+2, lying on the line segment generated at step S4. At step S6, the tap array decision unit 31 verifies whether or not the so calculated variance is smaller than the variance values held at step S7, as later explained, that is whether or not the variance calculated at step S6 is the smallest of the variance values calculated for straight line segments passing through the pixels of the coordinates (a, b) checked so far and through the subject pixel. If the variance calculated is found to be of the least value, the program moves to step S7. At this step S7, the tap array decision unit 31 holds the variance value calculated at step S5 and the associated coordinate (a, b).

If the variance calculated is found at step S6 not to be of the least value, or if the variance value and the coordinates (a, b) are held at step S7, the program moves to step S8, where the tap array decision unit 31 updates the coordinates (a, b). The updating of the coordinates (a, b) may be done on a raster scan.

At the next step S9, the tap array decision unit 31 verifies whether or not the coordinates (a, b) updated at step S8 exceed the search range as set at step S2 (FIG. 8). If it is verified that the search range is not exceeded, the program reverts to step S4 to execute the subsequent processing. If conversely the search range is found to be exceeded, the tap array decision unit 31 assumes that the search for the search range has been finished and proceeds to step S10 to vote for the coordinates (a, b) held at step S7.

At the next step S11, the tap array decision unit 31 checks whether or not all of the pixels in the area as set at step S1 have been selected out as being the center pixel If it is verified that not all of the pixels have been selected out as being the center pixel, the program reverts to step S2 to take out another pixel as being the center pixel to prosecute the following processing. If conversely all of the pixels have been taken out as the center pixel, the program moves to step S12.

At step S12, the tap array decision unit 31 detects the coordinates (a, b) voted for the largest number of times at step S10. That is, the straight line passing through the pixel on the frame Fn−1 specified by the coordinates (a, b) and the subject pixel on the frame Fn is detected to detect the straight line segment as the motion vector. The tap array decision unit 31 sends the position information of pixels of the frames Fn−2 to Fn+2, lying on the so detected line segment, to the area extraction units 24, 27.

This terminates the processing.

Since the preset straight line passing through the five consecutive frames is detected as a motion vector, it is unnecessary to carry out the voluminous calculations as needed in the case of block matching.

FIG. 9 shows another illustrative structure of the conventional picture processing apparatus. In the picture processing apparatus 50, shown in FIG. 9, the noisy input picture is sent to each of a filter for reducing the noise of the noisy still picture portion 51, a filter for reducing the noise of the noisy moving picture portion 52 and to a motion detection unit 53.

The filter for reducing the noise of the noisy still picture portion 51 is made up of the components from the amplifier 14 to the frame memory 17 of the picture processing apparatus 10 of FIG. 1, and performs weight addition on the input picture and a picture delayed one frame from the input picture. Thus, if the input picture is the still picture portion, the noise contained in the still picture portion may be reduced.

The filter for reducing the noise of the noisy moving picture portion 52 is made up by the picture processing apparatus 20 shown in FIG. 2 or by the picture processing apparatus 30 shown in FIG. 5, and executes classification adaptive processing based on taps corresponding to the motion vector. So, if the input picture is the moving picture portion, the noise contained in the still picture portion may be reduced.

The motion detection unit 53 detects the motion from the input picture, on the pixel basis, and outputs the results of detection to an output switching unit 54.

If the result of detection from the motion detection unit 53 indicates that the input picture is the still picture portion, the output switching unit 54 selects an output of the filter for reducing the noise of the noisy still picture portion 51 to route the so selected output to outside. If conversely the result of detection from the motion detection unit 53 indicates that the input picture is the moving picture portion, the output switching unit 54 selects an output of the filter for reducing the noise of the noisy moving picture portion 52 to route the so selected output to outside.

This reduces the noise contained in both the still picture portion and the moving picture portion.

However, if, in the case of the present picture processing apparatus 50, the input picture is the still picture portion or the moving picture portion, the processing by the filter for reducing the noise of the noisy moving picture portion 52 or that by the filter for reducing the noise of the noisy still picture portion 51 becomes redundant, respectively.

Consequently, the conventional picture processing apparatus 50 has a drawback that, as described above, the noise contained in the input picture cannot be reduced effectively.

Although it has been practiced to generate picture signals of the fourfold density from the input picture by e.g., linear interpolation, there is raised a problem that linear interpolation leads to a non-acute waveform of the picture signals to give a blurred picture as the result of the linear processing.

Meanwhile, a picture the edge of the feature area of which is not blurred may be generated by applying, for example, the classification adaptive processing.

Referring to FIGS. 10 to 12, the picture processing of generating a picture, the edge of the feature area of which is not blurred, is explained.

FIG. 10 shows an illustrative structure of a picture processing apparatus adapted for generating a picture the edge of the feature area of which is not blurred. In a picture processing apparatus 60, shown in FIG. 10, the input picture, the edge of the feature area (picture area relatively moving to the remaining picture area) of which is blurred, is sent to the a feature area detecting portion 61 and to a classification adaptive processing unit 62.

The feature area detecting portion 61 detects the feature area contained in the input picture to send the detected feature area to a synthesizing unit 63. Meanwhile, the feature area detecting portion 61 detects the feature area so that the pixel density of the feature area will be equal to or higher than that of the input picture.

The classification adaptive processing unit 62 applies classification adaptive processing for removing the noise, correcting the luminance or generating a high definition picture, to the input picture, and outputs the resulting picture to the synthesizing unit 63.

The synthesizing unit 63 synthesizes the feature area from the feature area detecting portion 61 to a picture from the classification adaptive processing unit 62. By taking out the feature area once and synthesizing the so taken out feature area to the remaining picture portion, it is possible to generate a picture the edge of the feature area of which is not blurred.

FIG. 11 shows an illustrative structure of the feature area detecting portion 61. The input picture is sent to a delay circuit 71 and to a motion vector detection circuit 75. The delay circuit 71 delays the input picture, supplied thereto, by a time needed for processing by circuits from the synthesizing circuit 72 to the phase shifting circuit 76, to route the delayed input picture to the synthesizing circuit 72. This allows the synthesizing circuit 72, as later explained, to synthesize the input picture to the corresponding picture.

The synthesizing circuit 72 synthesizes the input picture, supplied thereto from the delay circuit 71, to the phase-shifted picture stored in a storage memory 73 and which is supplied from the phase shifting circuit 76. The synthesizing circuit 72 also routes the so synthesized picture to the storage memory 73.

The storage memory 73 stores the picture supplied from the synthesizing circuit 72 to generate a storage picture, while routing the picture to the detection circuit 74 and to the phase shifting circuit 76.

FIG. 12A shows typical level distribution of pixel values forming the feature area on the stored picture. Thus, in the present instance, the level distribution of the feature area on the stored picture is the same as that of the input picture, however, the level distribution of pixel values of the pixels making up the picture portion other than the feature area is flattened out, as shown for example in FIG. 12B.

The detection circuit 74 detects the feature area from the stored picture supplied from the storage memory 73 to route the so detected feature area to the synthesizing unit 63. Since the feature area on the stored picture has characteristics as explained with base to FIG. 12, the detection circuit 74 is able to detect the feature area accurately.

The motion vector detection circuit 75 is fed with the input picture and with picture data and display positions of the feature area from the detection circuit 74. The motion vector detection circuit 75 detects the motion vector between the feature area from the detection circuit 74 and the feature area in the input picture to route the results of detection to the phase shifting circuit 76.

The phase shifting circuit 76 phase-shifts the storage picture from the storage memory 73, based on the motion vector from the motion vector detection circuit 75, to send the phase-shifted picture to the synthesizing circuit 72.

This allows to generate the picture the edge of the feature area of which is not blurred. However, in synthesizing the feature area with the other picture portions, special processing needs to be carried out at a boundary portion, thus complicating the processing by the synthesizing unit 63.

The picture processing apparatus 60, configured as described above, suffers the problem that a picture of high picture quality, for example, a picture reduced in noise or a picture the edge of the feature area of which is not blurred, cannot be produced satisfactorily from the input picture.

DISCLOSURE OF THE INVENTION

In view of the above depicted status of the art, it is an object of the present invention to enable a picture of high picture quality to be produced satisfactorily from an input picture.

The present invention provides a picture processing apparatus for generating a second picture from a first picture, the second picture being of higher picture quality than the first picture, in which the apparatus includes acquisition means for acquiring the first picture, storage means for storing the first picture, acquired by the acquisition means, storage processing means for storing a new first picture acquired by the acquisition means at a position registering with the first picture stored in the storage means to permit a storage picture of the first picture to be stored in the storage means, first extraction means for extracting the first pixel information from both the storage picture and the first picture, acquired by the acquisition means, based on the position of a subject pixel of the second picture, feature value detection means for detecting a preset feature value from the first pixel information, classification means for classifying the subject pixel to one of a plurality of classes based on the feature value, second extraction means for extracting the second pixel information from both the storage picture and the first picture, acquired by the acquisition means, based on the position of the subject pixel, and generating means for generating the subject pixel by using the second pixel information in accordance with a generating system preset corresponding to the classes classified by the classification means.

The present invention also provides a picture processing method for generating a second picture from a first picture, the second picture being of higher picture quality than the first picture, in which the method includes an acquisition step of acquiring the first picture, a storage step of storing the first picture, acquired by the acquisition step, a storage processing step of storing a new first picture acquired by the acquisition step at a position registering with the first picture stored at the storage step to permit a storage picture of the first picture to be stored at the storage step, a first extraction step of extracting the first pixel information from both the storage picture and the first picture, acquired by the acquisition step, based on the position of a subject pixel of the second picture, a feature value detection step of detecting a preset feature value from the first pixel information, a classification step of classifying the subject pixel to one of a plurality of classes based on the feature value, a second extraction step of extracting the second pixel information from both the storage picture and the first picture, acquired by the acquisition step, based on the position of the subject pixel, and a generating step of generating the subject pixel by the second pixel information in accordance with a generating system preset corresponding to the classes classified by the classification step.

The present invention also provides a recording medium having recorded thereon a computer-readable program adapted for generating a second picture from a first picture, the second picture being of higher picture quality than the first picture, in which the program includes an acquisition step of acquiring the first picture, a storage step of storing the first picture, acquired by the acquisition step, a storage processing step of storing a new first picture acquired by the acquisition step at a position registering with the first picture stored at the storage step to permit a storage picture of the first picture to be stored at the storage step, a first extraction step of extracting the first pixel information from both the storage picture and the first picture, acquired by the acquisition step, based on the position of a subject pixel of the second picture, a feature value detection step of detecting a preset feature value from the first pixel information, a classification step of classifying the subject pixel to one of a plurality of classes based on the feature value, a second extraction step of extracting the second pixel information from both the storage picture and the first picture, acquired by the acquisition step, based on the position of the subject pixel, and a generating step of generating the subject pixel by the second pixel information in accordance with a generating system preset corresponding to the classes classified at the classification step.

The present invention also provides a picture processing apparatus for learning preset data used in generating a second picture from a first picture, the second picture being higher in picture quality than the first picture, in which the apparatus includes generating means for generating a pupil picture equivalent to the first picture, storage means for storing the pupil picture, storage processing means for causing a new pupil picture, generated by the generating means, to be stored at a position registering with the pupil picture stored in the storage means for causing a storage picture of the pupil picture to be stored in the storage means, first extraction means for extracting the first picture information from both the storage picture and the pupil picture generated by the generating means, based on the position of the subject pixel of teacher data equivalent to the second picture, feature value detection means for detecting a preset feature value from the first pixel information, classification means for classifying the subject pixel to one of a plurality of classes, second extraction means for extracting the second pixel information from both the storage picture and the first picture generated by the generating means, based on the position of the subject pixel and calculation means for finding the preset data from one class of classifying by the classification means to another, by using the second pixel information and the teacher data.

The present invention also provides a picture processing method by a picture processing apparatus for learning preset data used in generating a second picture from a first picture, the second picture being higher in picture quality than the first picture, in which the method includes a generating step of generating a pupil picture equivalent to the first picture, a storage step of storing the pupil picture, a storage processing step of causing a new pupil picture, generated by processing at the generating step, to be stored at a position registering with the pupil picture stored in the storage step for causing a storage picture of the pupil picture to be stored in the storage step, a first extraction step of extracting the first picture information from both the storage picture and the pupil picture generated by the generating step, based on the position of the subject pixel of teacher data equivalent to the second picture, a feature value detection step of detecting a preset feature value from the first pixel information, a classification step of classifying the subject pixel to one of a plurality of classes, by way of classification, based on the feature value, a second extraction step of extracting the second pixel information from both the storage picture and the first picture generated by processing at the generating step, based on the position of the subject pixel, and a calculation step of finding the preset data from one class of classifying by the classification step to another, by using the second pixel information and the teacher data.

The present invention also provides a recording medium having recorded thereon a computer-readable program for a picture processing apparatus adapted for learning preset data usable for generating a second picture from a first picture, the second picture being of higher picture quality than the first picture, in which the program includes a generating step of generating a pupil picture equivalent to the first picture, a storage step of storing the pupil picture, a storage processing step of causing a new pupil picture, generated by processing at the generating step, to be stored at a position registering with the pupil picture stored in the storage step of causing a storage picture of the pupil picture to be stored in the storage step, a first extraction step of extracting the first picture information from both the storage picture and the pupil picture generated by the generating step, based on the position of a subject pixel of teacher data equivalent to the second picture, a feature value detection step of detecting a preset feature value from the first pixel information, a classification step of classifying the subject pixel to one of a plurality of classes, a second extraction step of extracting the second pixel information from both the storage picture and the first picture generated by processing at the generating step, based on the position of the subject pixel, and a calculation step of finding the preset data from one class of classifying by the classification step to another, by using the second pixel information and the teacher data.

BRIEF DESCRIPTION OF THE DRAWINGS

FIGS. 4A, 4B and 4C illustrate the structure of prediction taps in the picture processing apparatus of FIG. 2.

FIGS. 25A, 25B show the structure of prediction taps in the picture processing apparatus of FIG. 21.

FIGS. 44A, 44B illustrate a base picture and a four-fold density picture in the processing of motion vector detection in case of generating a picture (stored picture) higher in picture quality than the input picture (pupil picture).

FIG. 45 shows the relation between a base block and a reference block.

FIGS. 46A, 46B illustrate an absolute value sum table.

BEST MODE FOR CARRYING OUT THE INVENTION

Figure 1:
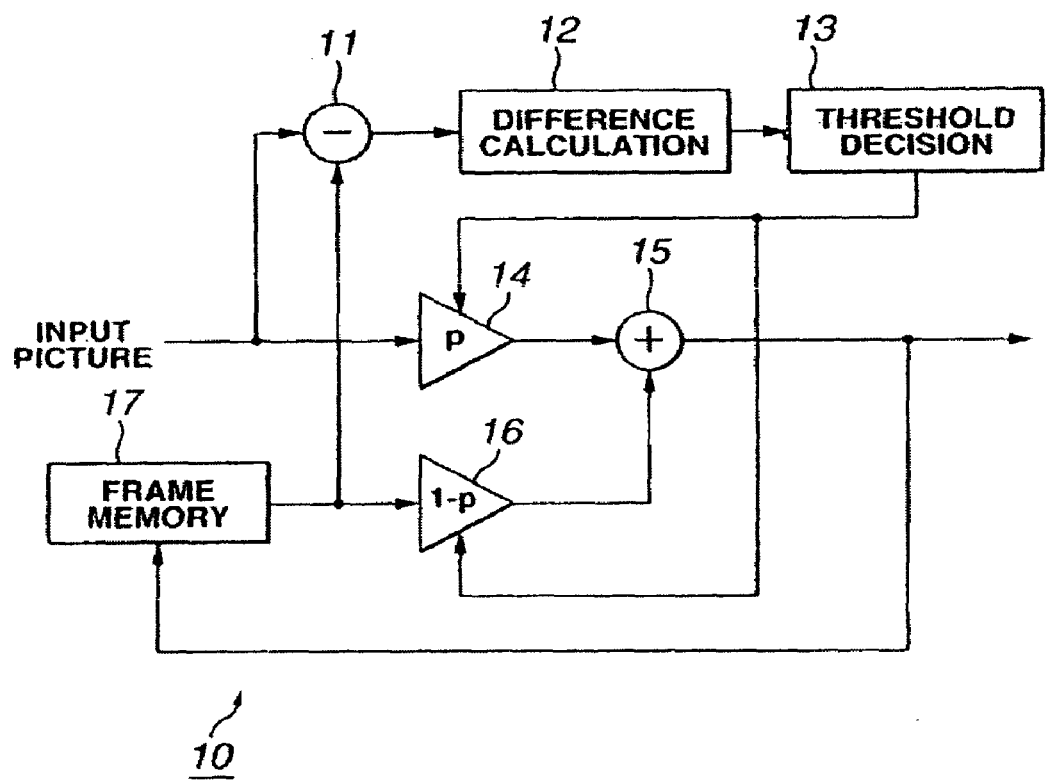
FIG. 1 is a block diagram showing an illustrative structure of a conventional picture processing apparatus.
Figure 2:
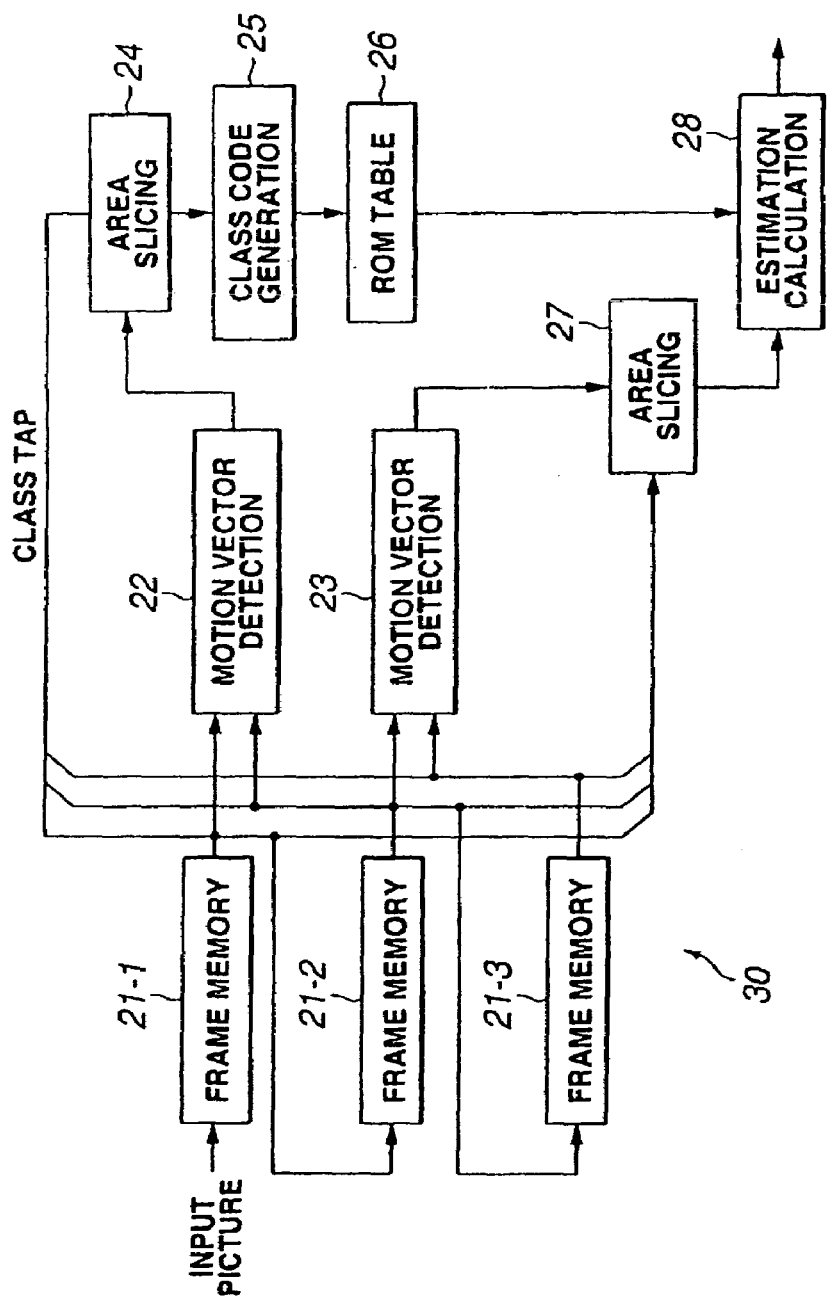
FIG. 2 is a block diagram showing another illustrative structure of the conventional picture processing apparatus.
Figure 3A:
FIGS. 3A, 3B and 3C illustrate the structure of class taps in the picture processing apparatus of FIG. 2.
Figure 3B:
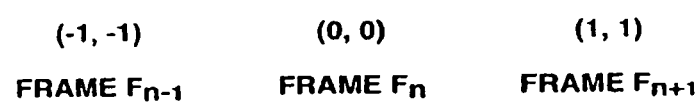
Figure 3C:
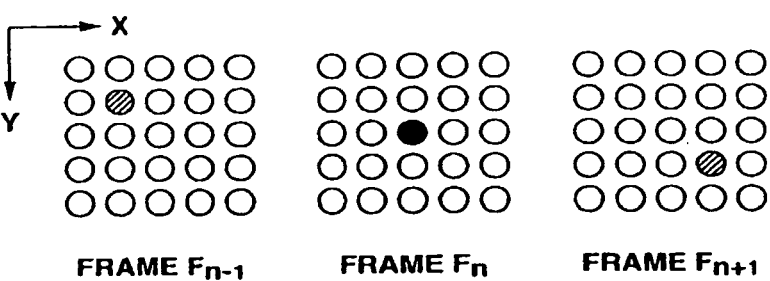

Referring to the drawings, certain preferred embodiments of the present invention will be explained in detail.

Figure 13:
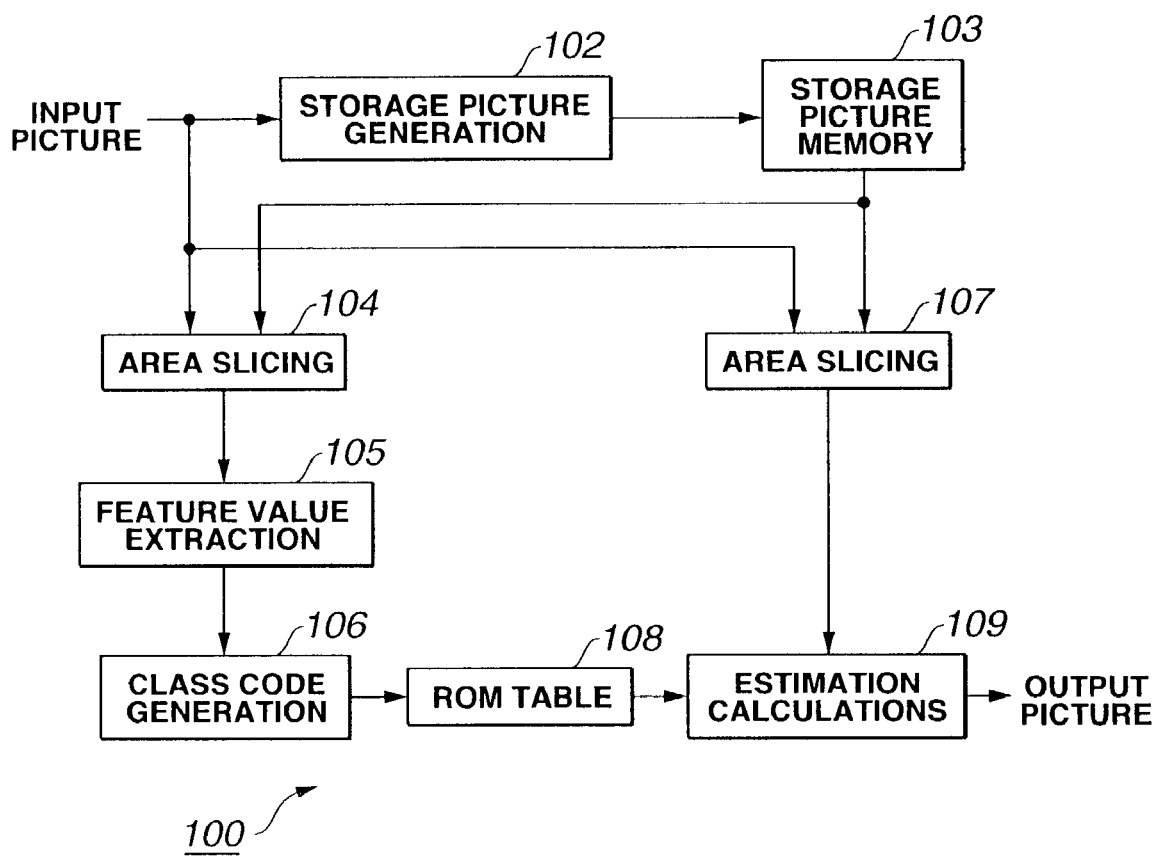
FIG. 13 is a block diagram showing an illustrative structure of a picture processing apparatus embodying the present invention.

FIG. 13 shows an illustrative structure of a picture processing apparatus 100 embodying the present invention. This picture processing apparatus 100 executes classification adaptive processing for noise reduction. In this classification adaptive processing, prediction coefficients, calculated by the learning processing, as later explained, are used.

This picture processing apparatus 100 includes a storage picture generating unit 102, an area extraction unit 104 and an area extraction unit 107.

The storage picture generating unit 102 executes the processing of effectively reducing the noise contained in the still picture portion of the input picture or the processing of detecting the feature area.

FIGS. 14 to 19 show an illustrative structure of the storage picture generating unit 102.

Figure 14:
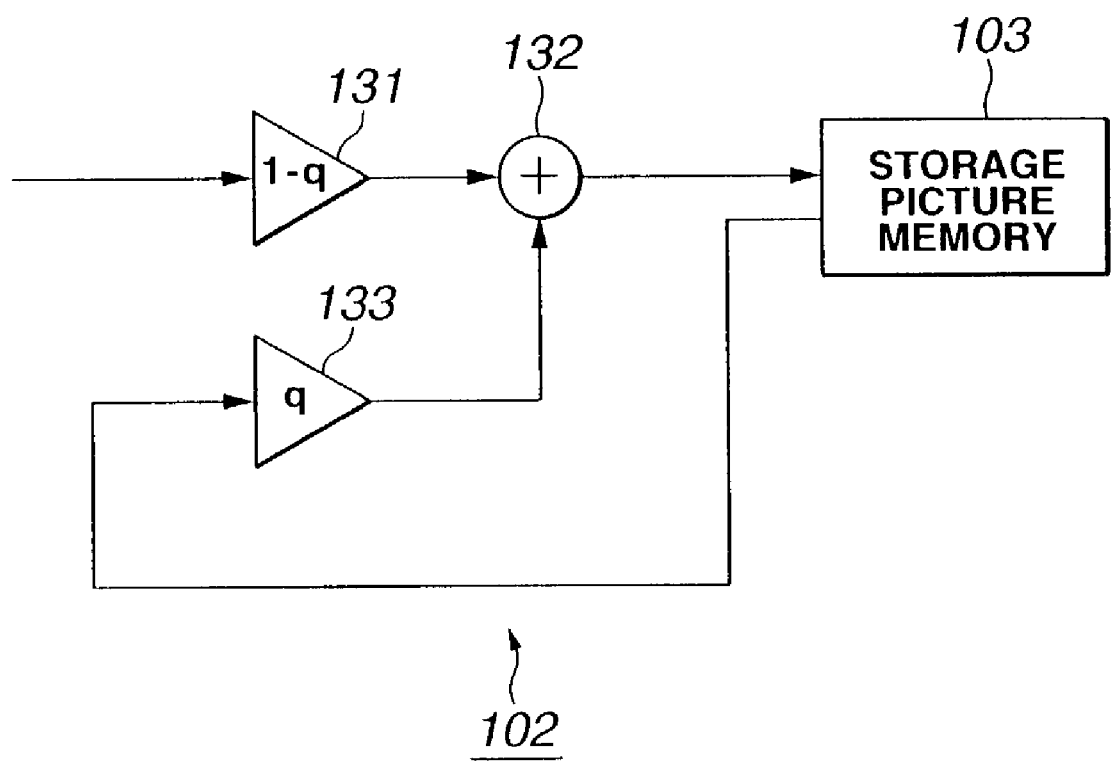
FIG. 14 is a block diagram showing an illustrative structure of a storage picture generating unit in the picture processing apparatus of FIG. 13.

FIG. 14 shows an exemplary structure of the storage picture generating unit 102 in case of reducing the noise in the still picture portion. A noisy pupil picture is sent to an amplifier 131, which amplifier 131 amplifies signals of the pupil picture, supplied thereto, with a value equal to unity (1) less a weighting value q (0<q<1), as an amplification factor, and routes the resulting amplified value to an adder 132.

From a storage picture memory 103, which will be explained subsequently, a storage picture generated immediately previously by the storage picture generating unit 102, that is a storage picture previous to the now supplied pupil picture by one frame, is sent to an amplifier 133, which amplifier 133 amplifies the signal of the storage picture, with the weighting value q as the amplification factor, to route the resulting amplified picture to an adder 132.

The adder 132 sums an output of the amplifier 131 to an output of the amplifier 133 to route the resulting sum to the storage picture memory 103.

That is, in this storage picture generating unit 102, the input picture and the storage picture previous to the input picture by one frame are weight-added based on the weighting value q. For example, if the value q=0.8, a storage picture is generated by adding 20% of the input picture to 80% of the storage picture. By summing the input picture and the storage picture preceding the input picture by one frame, at a preset proportion, the noise in the still picture portion can be reduced more effectively, as compared to the conventional picture processing apparatus 10 shown in FIG. 1.

Meanwhile, the storage picture, initially weight-added to the input picture, may be no other than the input picture initially stored in the storage picture memory 103, or may be a picture obtained on averaging plural input pictures.

Figure 15:
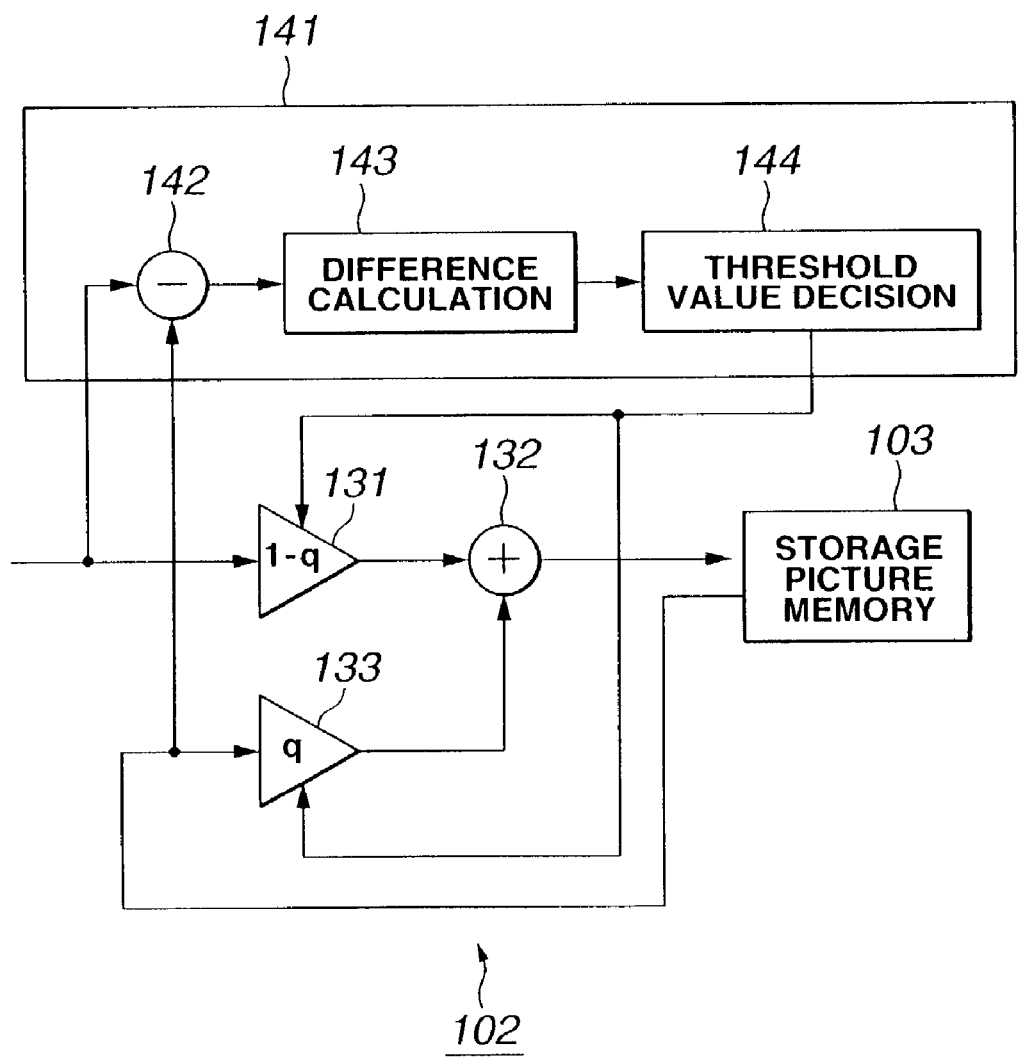
FIG. 15 is a block diagram showing another illustrative structure of a storage picture generating unit in the picture processing apparatus of FIG. 13.

FIG. 15 shows another exemplary structure of the storage picture memory 103 in case of reducing the noise in the still picture portion. This storage picture generating unit 102 is made up of the storage picture generating unit 102 of FIG. 14 and a motion detection unit 141. This motion detection unit 141 is made up by components from a substracter 142 to a threshold value decision unit 144, having the functions similar to those of the components from the substracter 11 to the threshold value decision unit 13 forming the picture processing apparatus 10 shown in FIG. 1. That is, in this storage picture generating unit 102, the input picture and the storage picture are weight-summed based on the weighting value q corresponding to the movement of the input picture. The weighting value q may also be set based on the difference in luminance between the input picture and the storage picture, in place of on the picture movement.

Figure 16:
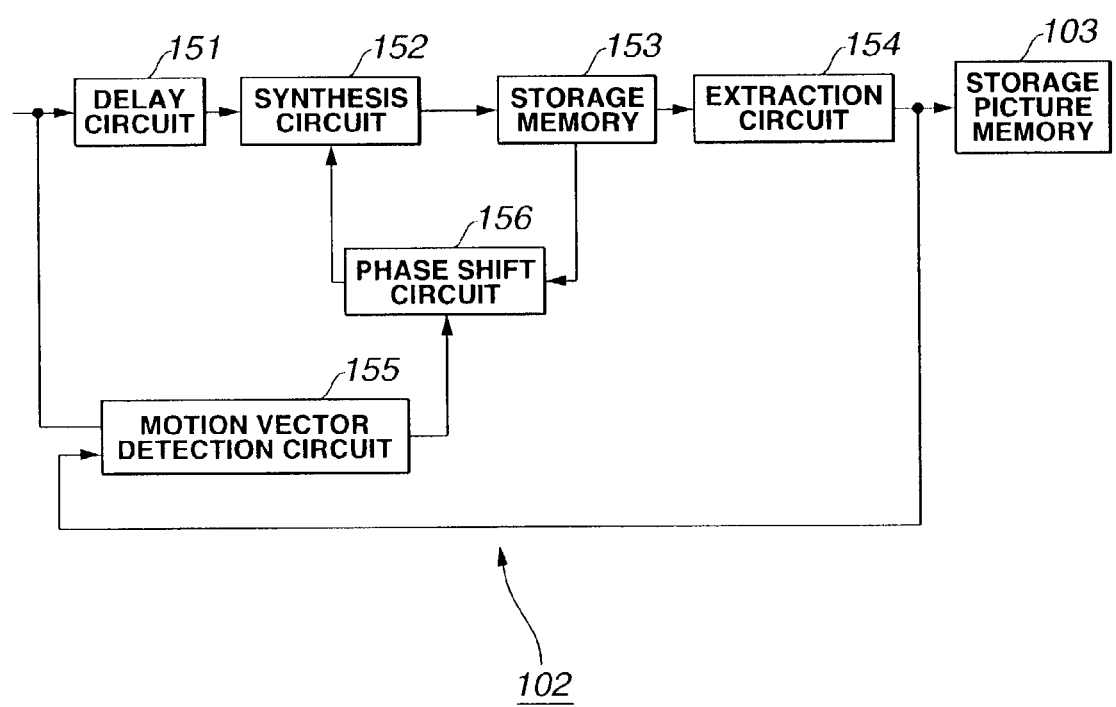
FIG. 16 is a block diagram showing still another illustrative structure of a storage picture generating unit in the picture processing apparatus of FIG. 13.

FIG. 16 shows an illustrative structure of the storage picture generating unit 102 in case of detection of the feature area.

In this storage picture generating unit 102, the input picture is sent to a delay circuit 151 and to a motion vector detection circuit 155. The delay circuit 151 delays the input picture, supplied thereto, by time needed for processing in a synthesis circuit 152 and a phase shifting circuit 156, as later explained, to route the delayed input picture to the synthesis circuit 152. This allows the synthesis circuit 152 to synthesize the input picture and the associated picture together.

The synthesis circuit 152 sums the input picture, supplied from the delay circuit 151, to the phase-shifted storage picture, stored in a storage memory 153 and which is supplied from the phase shifting circuit 156. The synthesis circuit 152 sends the synthesized picture to the storage memory 153.

The storage memory 153 stores the picture, supplied from the synthesis circuit 152, to generate a stored picture, which is routed to an detection circuit 154 and to the phase shifting circuit 156.

The detection circuit 154 detects the feature area from the storage picture, supplied from the storage memory 153, to send the so detected feature area to the motion vector detection circuit 155. Although the level distribution of the feature area on the storage picture is the same as that of the input picture, the level distribution of pixel values of pixels making up a picture portion other than the feature area is flattened out, so that the detection circuit 154 is able to detect the feature area high accurately.

The motion vector detection circuit 155 is fed with the input picture and with the picture data and the display positions of the feature area from the detection circuit 154. The motion vector detection circuit 155 detects the motion vector between the feature area from the detection circuit 154 and the feature area in the input picture to route the results of detection to the phase shifting circuit 156.

Based on the motion vector from the motion vector detection circuit 155, the phase shifting circuit 156 phase-shifts the storage picture from the storage memory 153 to route the resulting phase-shifted storage picture to the synthesis circuit 152.

That is, with the present storage picture generating unit 102, the feature area is detected, so that the input picture is stored in the storage picture, as a preset phase relationship is maintained between the feature area of the storage picture and the feature area of the storage picture.

Meanwhile, the pixel density of the feature area, here generated, may be higher than or equivalent to that of the input picture. However, the capacity of the storage picture memory 153 needs to be in meeting with the pixel density of the feature area.

The above-described storage picture generating unit 102 routes the picture reduced in noise and the feature area, thus generated and detected, respectively, as the storage picture to the storage picture memory 103.

A storage picture generating unit 191 performs weight addition on the input picture and the storage picture, based on the weighting value q, to reduce the noise in the still picture portion or to detect the feature area. The picture or the feature area, thus reduced in the noise in the still picture portion, is sent as the storage picture to a storage picture memory 192.

The storage picture memory 192 stores the storage picture from the storage picture generating unit 191, while suitably routing the stored storage picture to area extraction units 193, 197.

The area extraction unit 104 extracts the class tap from the input picture, while extracting a block from each of the input picture and the storage picture to route the so extracted class tap and blocks as the pixel information to a feature value detection unit 105.

Figure 17:
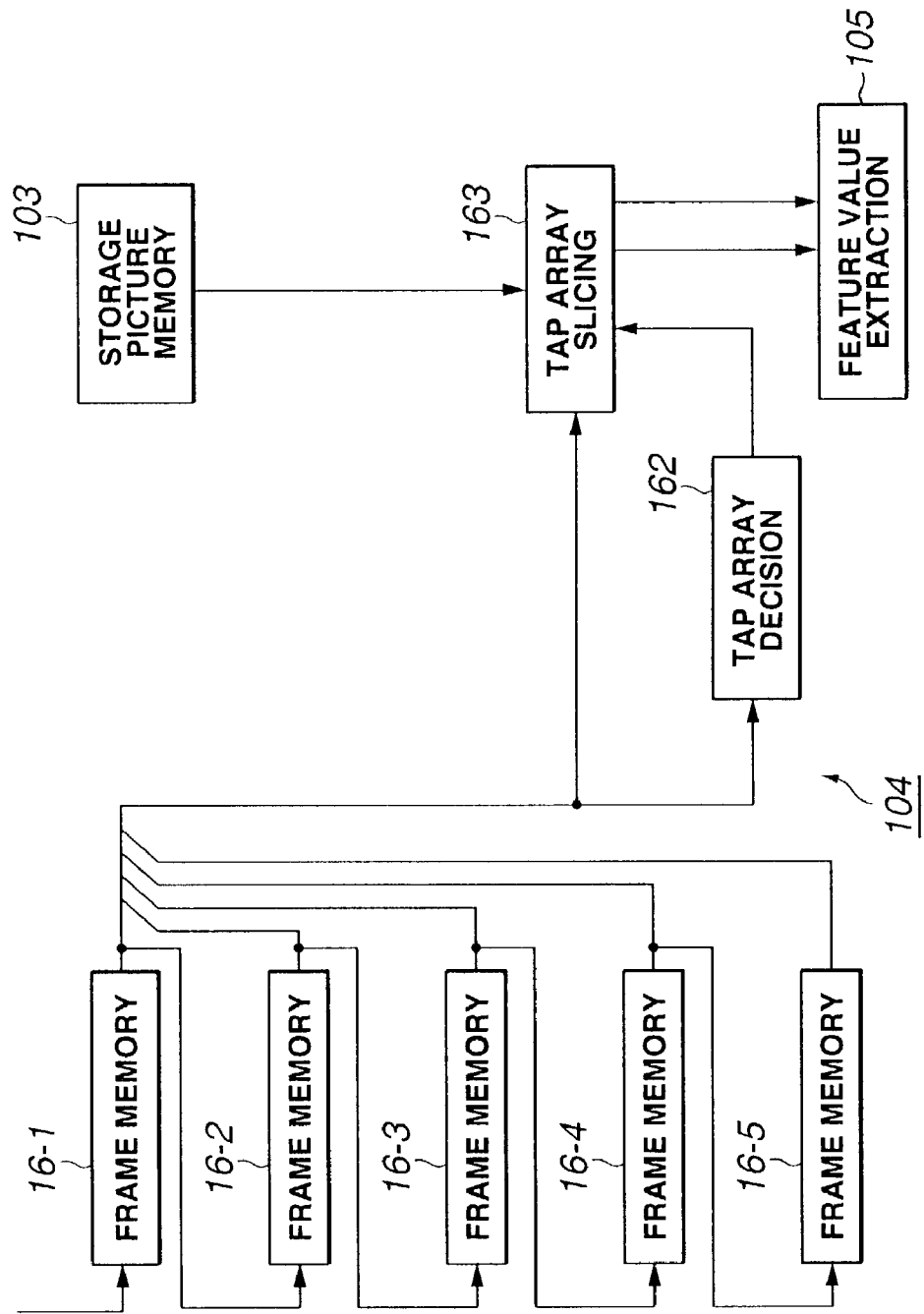
FIG. 17 is a block diagram showing an illustrative structure of an area extraction unit in the picture processing apparatus of FIG. 13.
Figure 18:
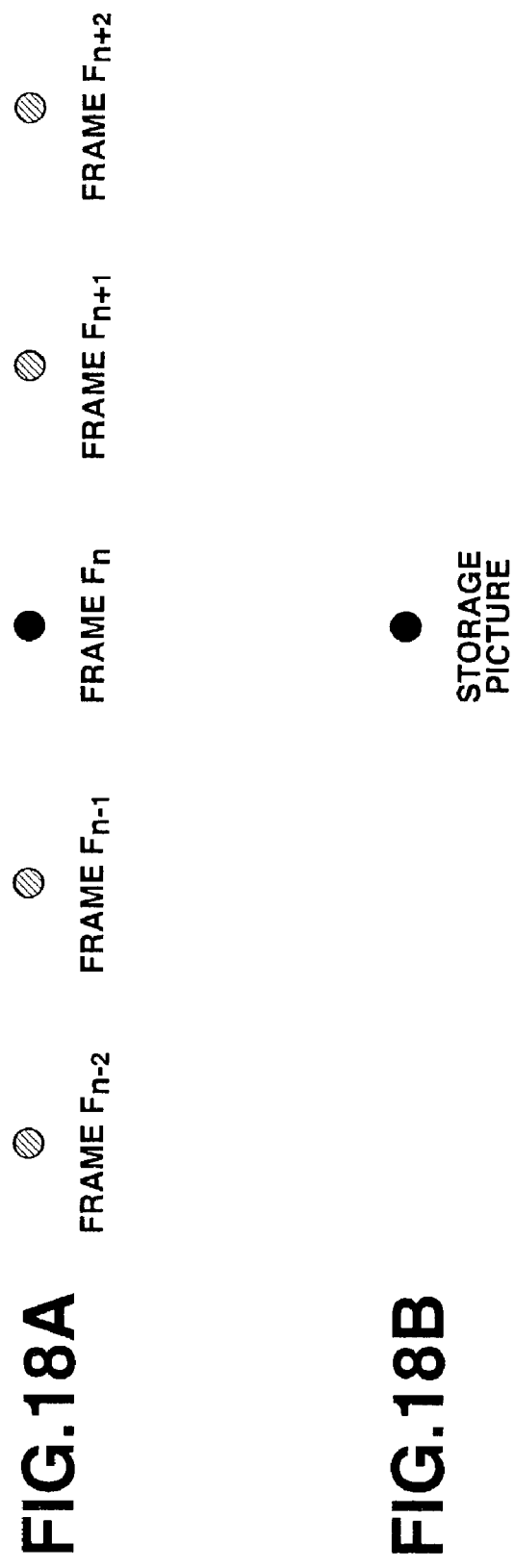
FIGS. 18A and 18B show a structure of a class tap in the picture processing apparatus of FIG. 13.

FIG. 17 shows an illustrative structure of the area extraction unit 104.

In this area extraction unit 104, the input picture is routed to a frame memory 16-1 and to a delay circuit 164, whilst the storage picture from the storage picture memory 103 is also routed to a block extraction unit 166.

The frame memory 16-1 delays the pupil picture by one frame and routes the so delayed pupil picture to a frame memory 16-2, a tap array decision unit 162 and to a class tap extraction unit 163.

The frame memory 16-2 delays the picture from the frame memory 16-1 by one frame and routes the so delayed picture to a frame memory 16-3, tap array decision unit 162 and to the class tap extraction unit 163.

The frame memory 16-3 delays the picture from the frame memory 161-2 by one frame and routes the so delayed picture to the frame memory 16-4, tap array decision unit 162 and to the class tap extraction unit 163.

The frame memory 16-4 delays the picture from the frame memory 161-3 by one frame and routes the so delayed picture to the frame memory 16-5, tap array decision unit 162 and to the class tap extraction unit 163.

The frame memory 16-5 delays the picture from the frame memory 16-4 by one frame and routes the so delayed picture to the tap array decision unit 162 and to the class tap extraction unit 163.

Figure 5:
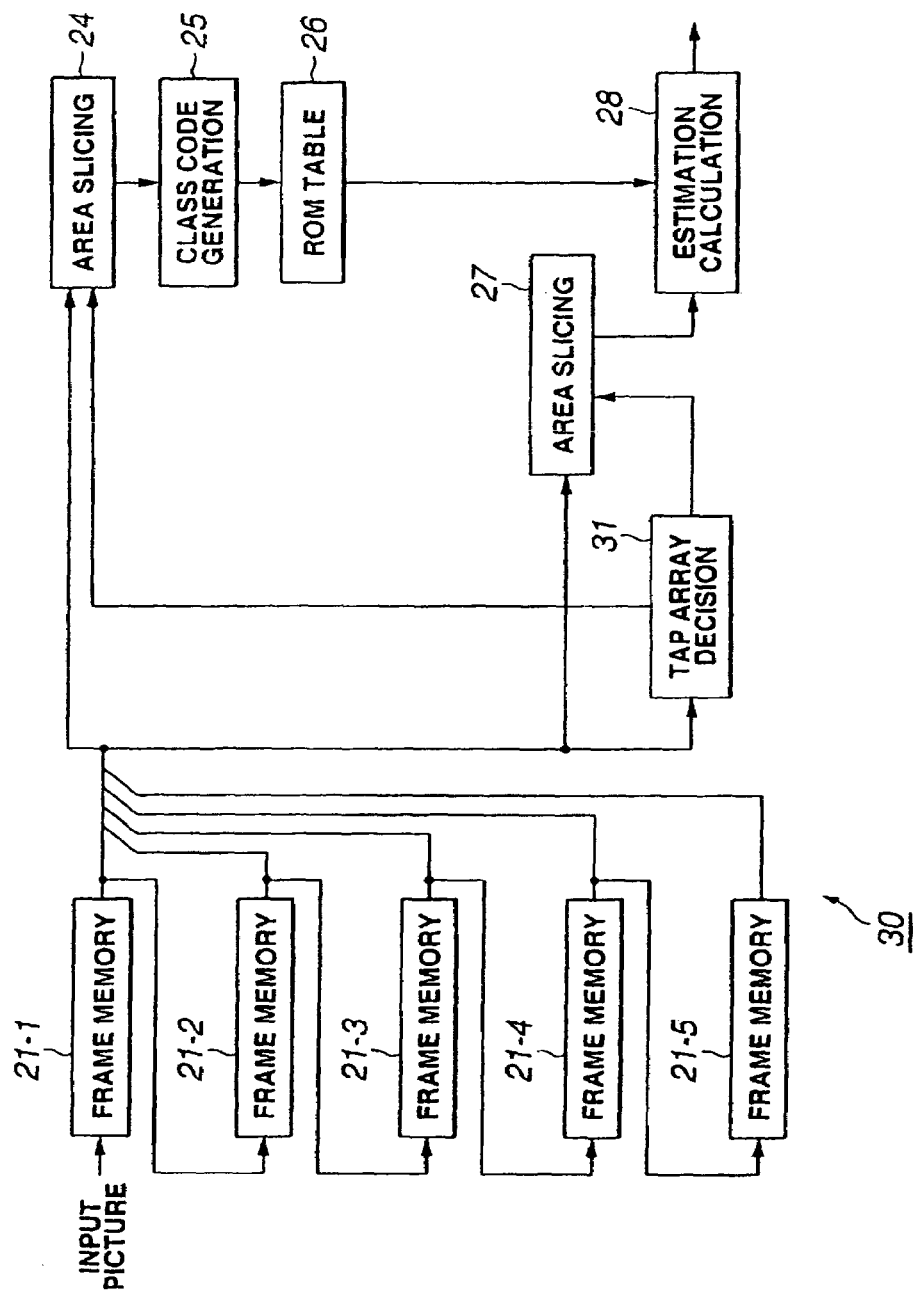
FIG. 5 is a block diagram showing another illustrative structure of the conventional picture processing apparatus.
Figure 6:
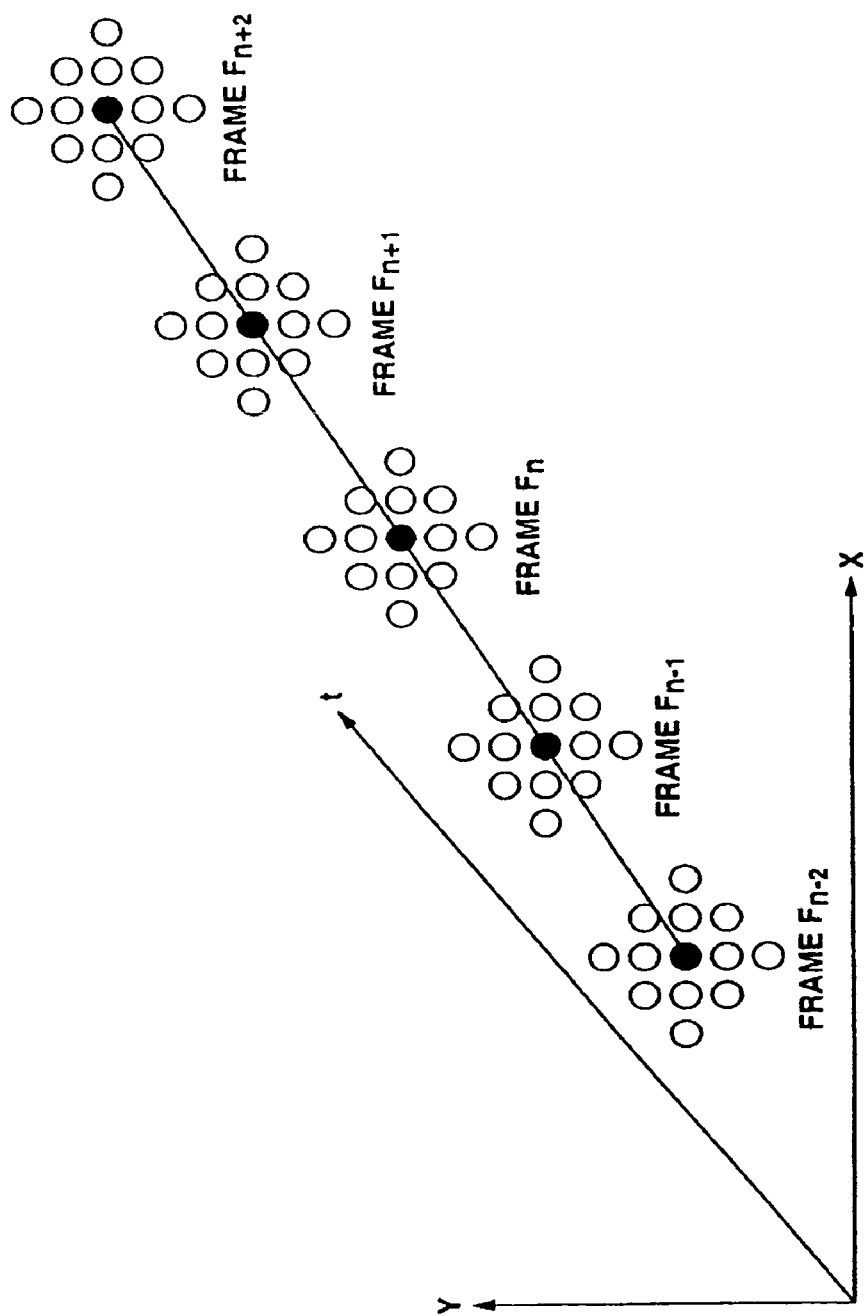
FIG. 6 illustrates the method for detecting the motion vector in the picture processing apparatus shown in FIG. 5.
Figure 7:
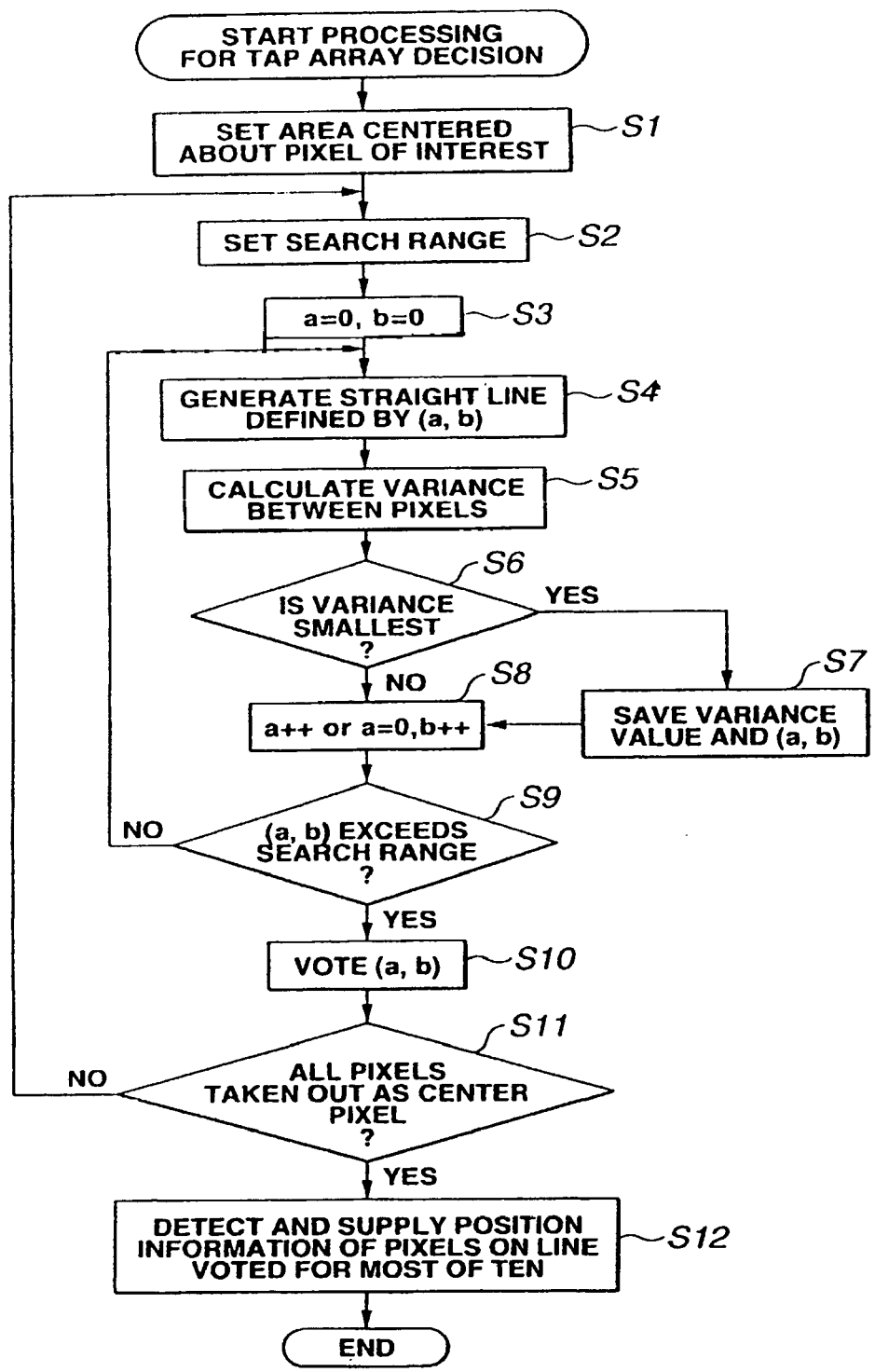
FIG. 7 is a flowchart for illustrating the processing of tap array decision in the picture processing apparatus of FIG. 5.
Figure 8:
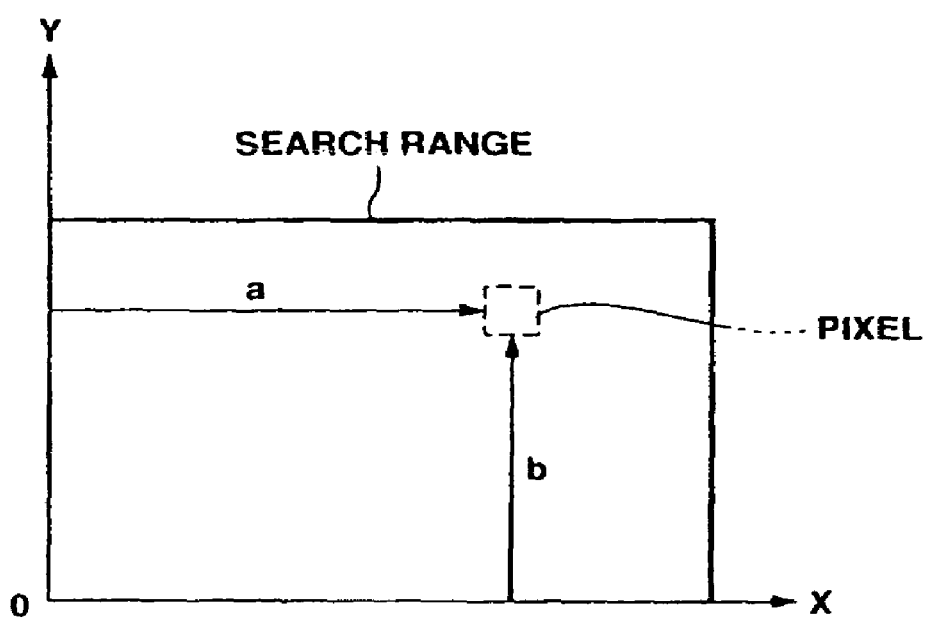
FIG. 8 illustrates the search range.
Figure 9:
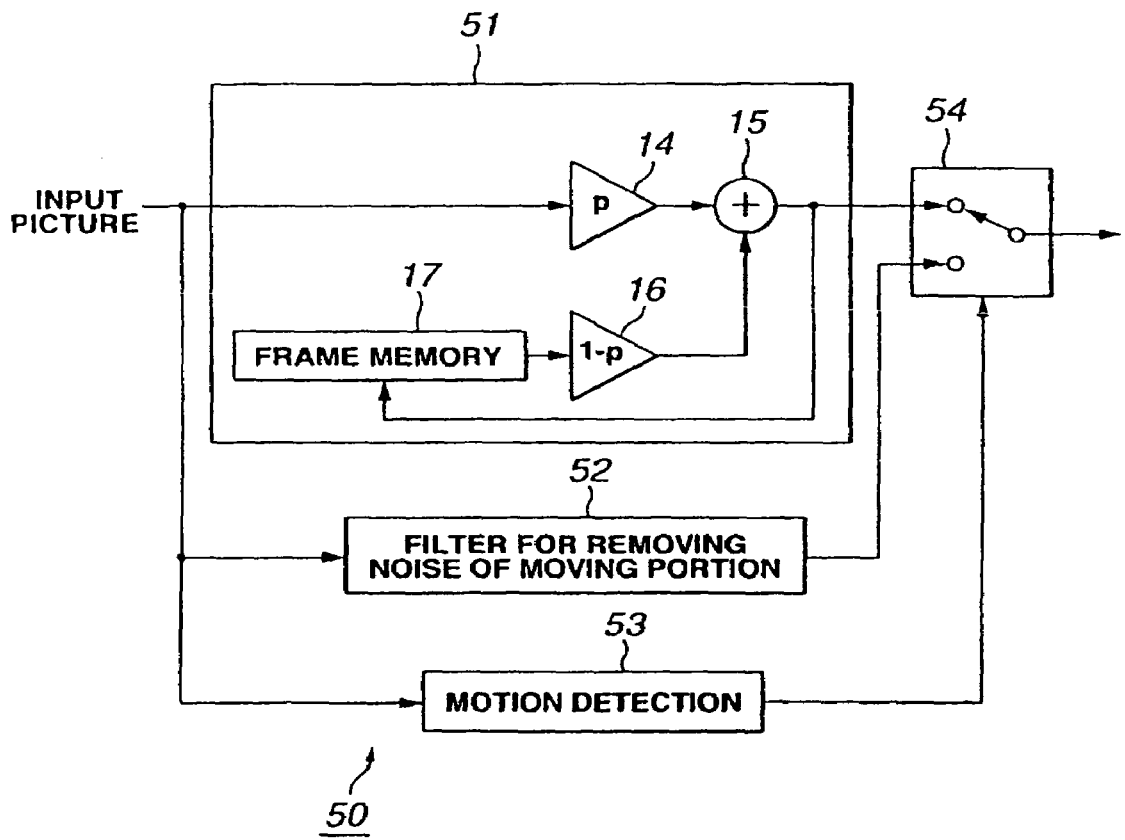
FIG. 9 is a block diagram showing another illustrative structure of the conventional picture processing apparatus.
Figure 10:
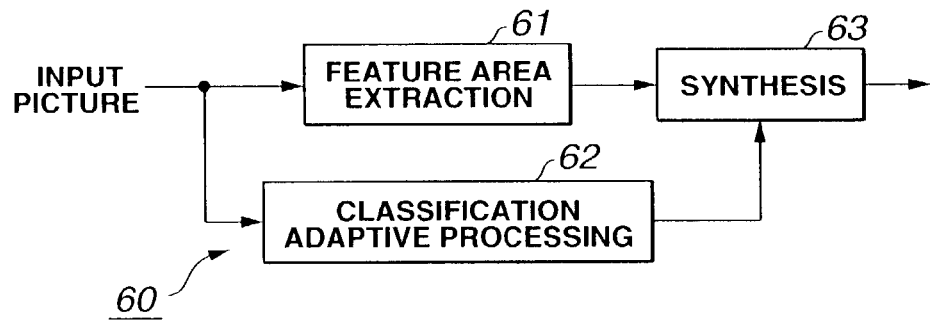
FIG. 10 is a block diagram showing an illustrative structure of a picture processing apparatus for generating a picture the edge of the feature area of which is not blurred.
Figure 11:
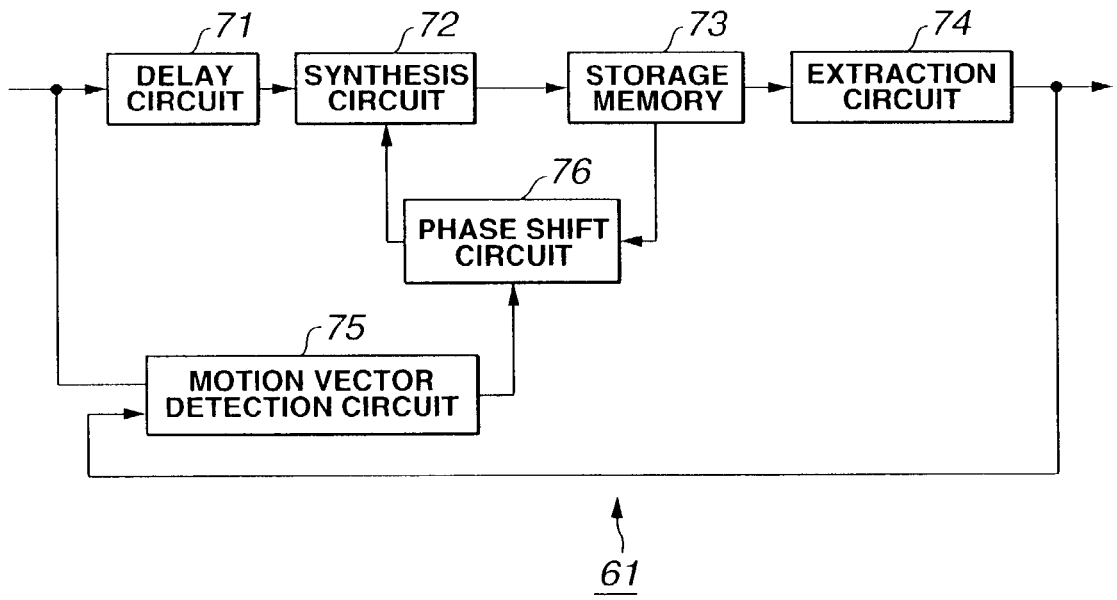
FIG. 11 is a block diagram showing an illustrative structure of a feature area detection unit in the picture processing apparatus of FIG. 10.
Figure 12A:
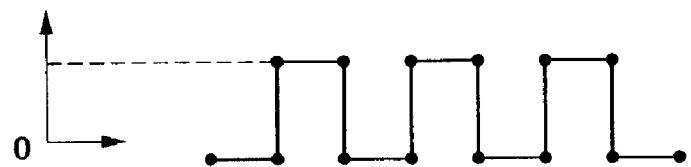
FIGS. 12A and 12B show level distribution of pixels of the feature area and those of the other picture portions.
Figure 12B:
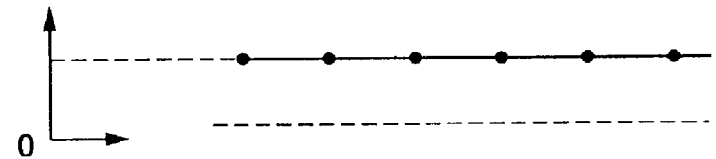

Based on the picture data on the frame, supplied from the frame memories 16-1 to 16-5, the tap array decision unit 162 decides the class tap arraying positions, and routes the results of decision to the class tap extraction unit 163. Meanwhile, the processing of tap array decision, executed by the tap array decision unit 162, is similar to that executed by the tap array decision unit 31 shown in FIG. 5 and hence is not here explained in detail.

The storage picture from the storage picture memory 103 is sent to the class tap extraction unit 163.

Referring to FIG. 18A, a subject pixel on the frame Fn, indicated with a black circle in the drawing, and pixels on the frames Fn−2 to Fn+2, indicated by hatched circles, lying in position relationships corresponding to the position information from the tap array decision unit 162 with respect to the subject pixel, are extracted as class taps. Also, the pixel on the storage picture lying at the same position as the subject pixel on the frame Fn, also becomes the subject pixel, and is extracted as the class tap. FIG. 18B shows the storage picture supplied from the storage picture memory 103 to the class tap extraction unit 163.

This class tap extraction unit 163 outputs the class taps, extracted from the input picture, to the feature value detection unit 105.

Figure 19:
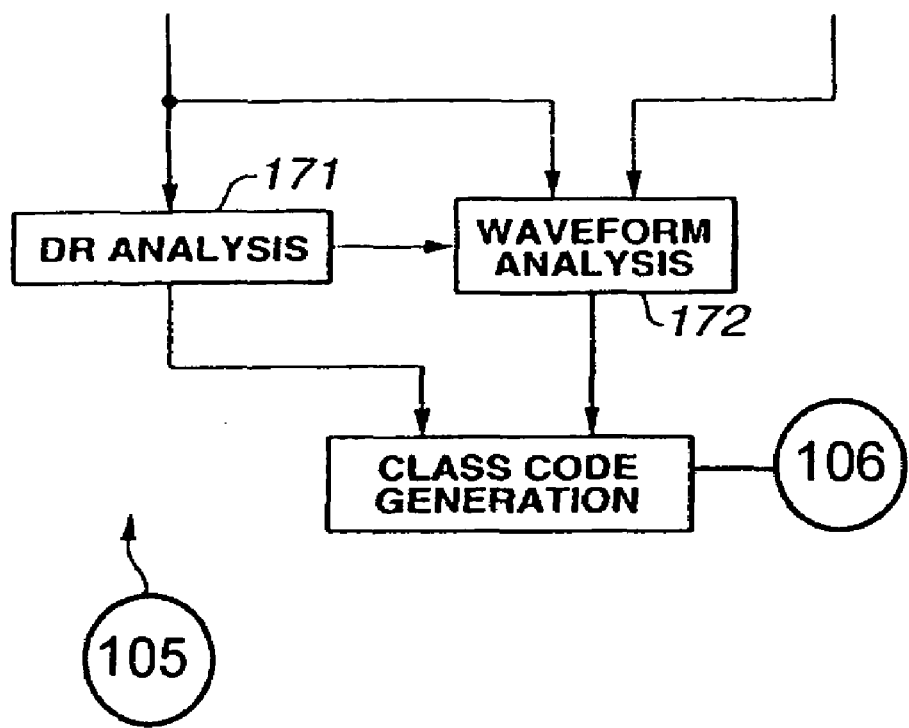
FIG. 19 is a block diagram showing an illustrative structure of a feature value detection unit in the picture processing apparatus of FIG. 13.

The feature value detection unit 105 is configured as shown in FIG. 19. In this feature value detection unit 105, the class taps, extracted from the input picture by the area extraction unit 104, are sent to a DR analysis unit 171 and to a waveform analysis unit 172. The class tap, extracted from the storage picture by the area extraction unit 104, is sent to the waveform analysis unit 172, The DR analysis unit 171 calculates the dynamic range of the pixel value of the pixels, forming the class taps supplied, and converts its value into a binary number, which then is routed to a class code generating unit 106.

The waveform analysis unit 172 performs waveform analysis simultaneously on the class taps extracted from the input picture and the class tap extracted from the storage picture.

For example, in a still picture, free of noise, no variations in the pixel values can occur from one frame to the next, as concerns the same pixel. In the case of a dynamic picture, deterioration in picture quality, such as blurring, may be noticed for a quick motion, however, there is basically no jitter, as concerns the same pixel. That is, if variations are noticed in the values of the same pixel, such variations may be regarded as being the noise. That is, waveform analysis of the class taps from the pupil picture and the class tap from the storage picture leads to detection of the noise contained therein.

Specifically, if the subject pixel is moving, there is produced difference in luminance between the storage picture and the input picture. So, the results of the ADRC processing reveals the difference between the pixel values of the two pixels. For example, in the case of the one-bit ADRC, the values of the two pixels are (0, 1) or (1, 0). On the other hand, if the subject pixel is the still picture portion, the difference in luminance is only negligible, so that the probability is high that, on ARC processing, the two pixel values become equal to each other. In the case of one-bit ADRC, for example, the two pixel values are (0, 0) or (1, 1).

The feature value detection unit 105 uses this principle in such a manner that it executes still/moving discrimination by waveform analysis and detects the dynamic range and the results of waveform analysis from the class taps from the area extraction unit 104, while detecting the information as to whether the subject pixel is still or moving, from the block of the area extraction unit 107, as the feature value needed for classification. The feature value detection unit 105 sends the result of decision to the class code generating unit 106.

The class code generating unit 106 generates the class code, derived from the feature value supplied from the feature value detection unit 105, and routes the so generated class code to a ROM table 108.

The ROM table 108 holds a set of the prediction coefficients, calculated from class to class by learning processing, which will be explained subsequently. The ROM table outputs, from the set of the prediction coefficients, stored therein, those corresponding to the class code from the class code generating unit 106, to an estimation calculating unit 109.

The area extraction unit 107 extracts prediction taps from the input picture and from the storage picture, to send the so extracted prediction taps to the estimation calculating unit 109.

Figure 20:
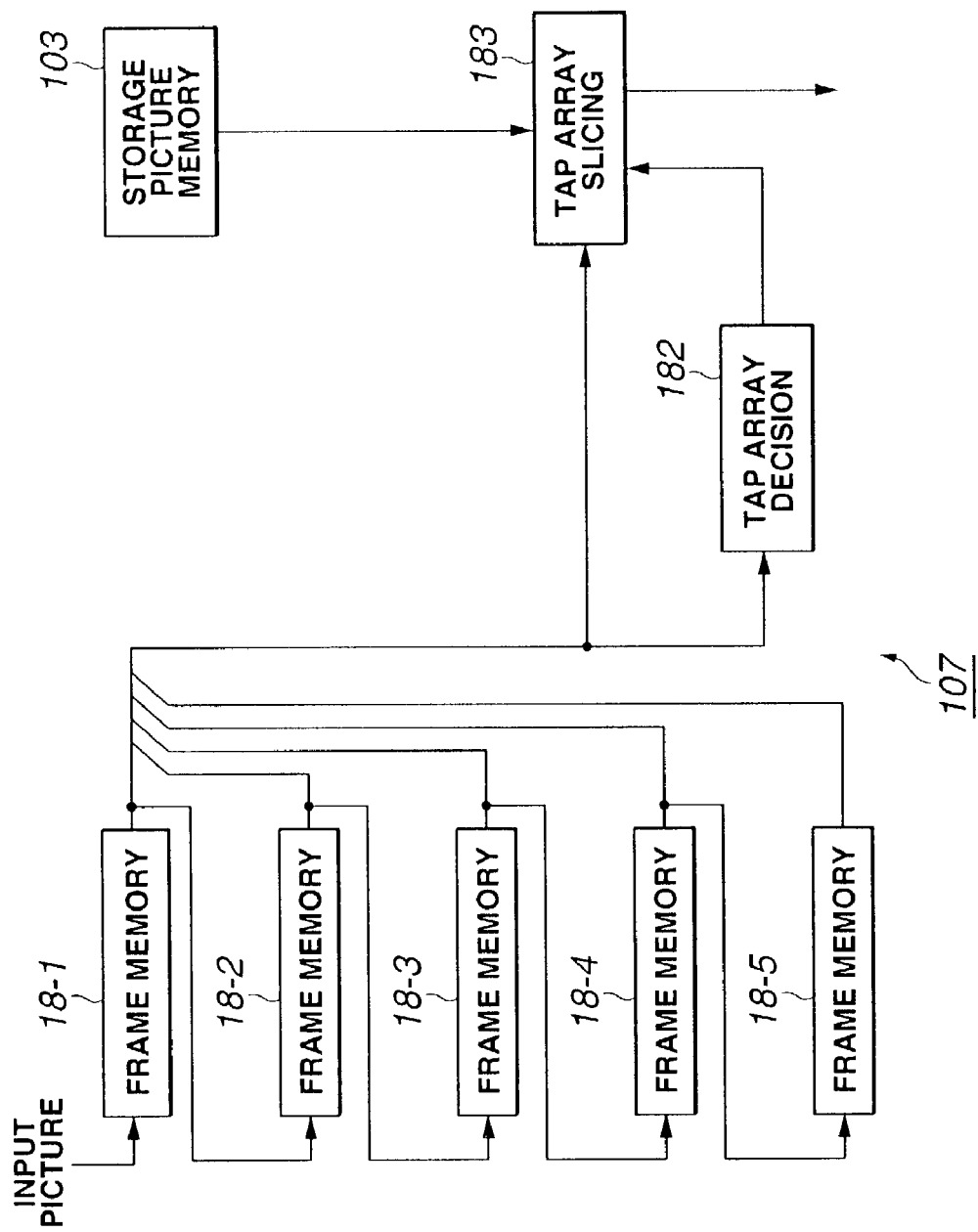
FIG. 20 is a block diagram showing another illustrative structure of an area extraction unit in the picture processing apparatus of FIG. 13.

FIG. 20 shows an exemplary structure of the area extraction unit 107.

In this area extraction unit 107, the input picture is sent to a frame memory 18-1, while the storage picture from the storage picture memory 103 is sent to a prediction tap extraction unit 183.

The frame memories 18-1 to 18-5 basically operate equivalently to the frame memories 16-1 to 16-5 of FIG. 17 and hence the corresponding description is here omitted for simplicity.

A tap array decision unit 182 decides the array positions of the prediction taps, based on the picture data of the frame sent from the frame memories 18-1 to 18-5, to send the results of decision to the prediction tap extraction unit 183. Meanwhile, the processing of tap array decision, to be performed by the tap array decision unit 182, is similar to that performed by the tap array decision unit 31 of FIG. 5 and hence is not here explained specifically.

With a pixel on the from supplied from the frame 18-3 as a subject pixel, the prediction tap extraction unit 183 extracts pixels on the frame Fn−2 from the frame memory 18-1, frame Fn−1 from the frame memory 18-2, frame Fn+1 from the frame memory 18-4 and the frame Fn+2 from the frame memory 18-5, lying in position relationships with respect to the subject pixel, corresponding to the position information from the tap array decision unit 182, as prediction taps, to output the so extracted prediction taps to a normal equation adder 108. The prediction tap extraction unit 183 also renders the pixel on the storage picture registering with the subject pixel on the frame Fn a subject pixel, and extracts pixels on the storage picture, lying at preset position relationships with respect to the subject pixel, as prediction taps.

Using the set of the prediction coefficients from the ROM table 108 and pixel data derived from the pixel information from the area extraction unit 107, the estimation calculating unit 109 calculates the equation (1) to sequentially generate pixel values y of the output picture as being the results of the calculations.

That is, the estimation calculating unit 109 calculates the equation (1):

$$y = w_1 \times x_1 + w_2 \times x_2 + \ldots + w_n \times x_n \quad (1)$$

which is a linear one-dimensional combination model prescribed by e.g. linear combination of pixel values of the extracted pixels $x_1, \ldots, x_n$ and prediction coefficients $w_1, \ldots, w_n$, to find the pixel values of the output picture.

Meanwhile, poly-dimensional or non-linear equations, other than the linear one-dimensional equation such as the equation (1), may also be calculated to find pixel values of the output picture.

Figure 21:
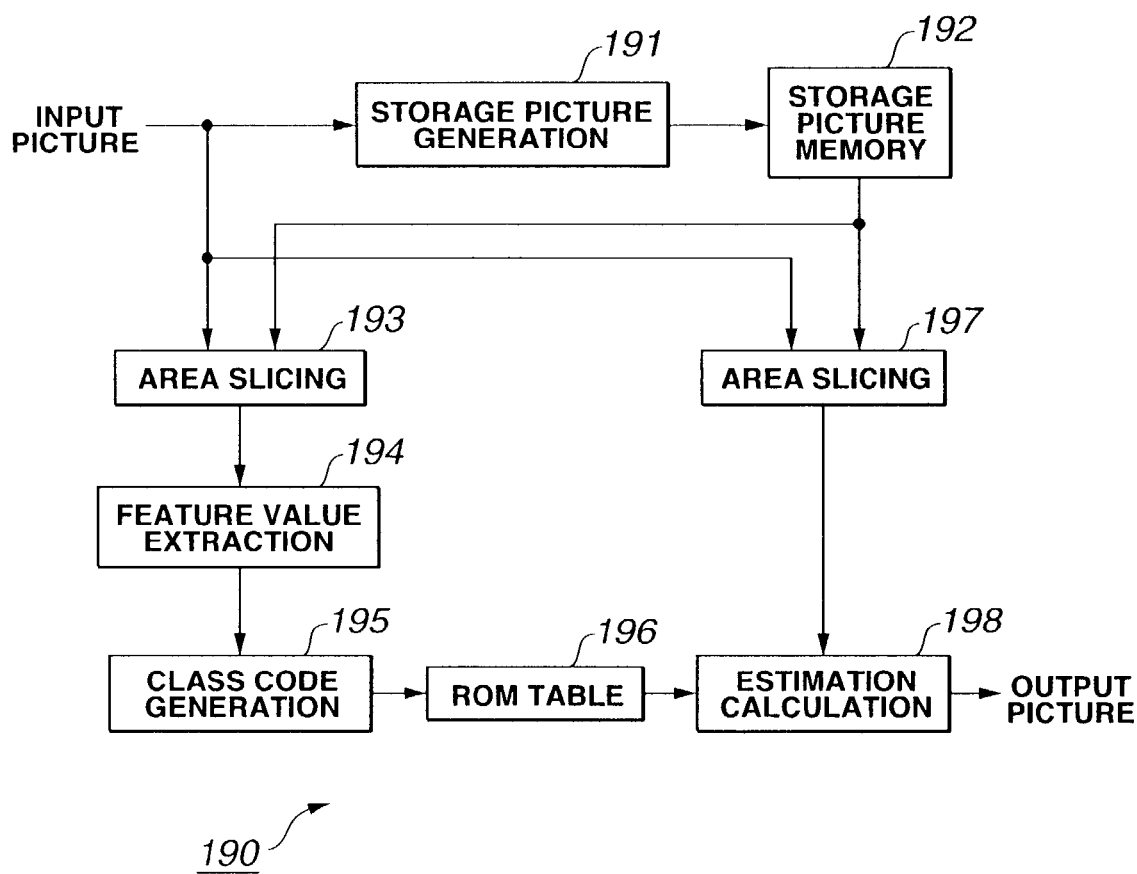
FIG. 21 is a block diagram showing another illustrative structure of a picture processing apparatus embodying the present invention.

FIG. 21 shows an exemplary structure of a picture processing apparatus 190 embodying the present invention. This picture processing apparatus 190 performs the processing of reducing the noise and correcting the edge of the feature area by classification adaptive processing. In this classification adaptive processing, prediction coefficients calculated by undermentioned learning processing are used.

In this picture processing apparatus 190, a noisy input picture or an input picture, the edge of the feature area of which is blurred, is sent to each of the storage picture generating unit 191 and area extraction units 193, 197.

The storage picture generating unit 191 is configured similarly to the storage picture generating unit 102 of the picture processing apparatus 100 shown in FIG. 13, and performs weight addition, with the weighting value q, of the input picture and the storage picture, to reduce the noise in the still picture portion or to detect the feature area. The picture having its still picture portion reduced in noise or the detected feature area is sent as the storage picture to the storage picture memory 192.

The storage picture memory 192 stores the storage picture from the storage picture generating unit 191 and routes the stored storage picture appropriately to the area extraction units 193, 197.

The area extraction unit 193 extracts class taps from the input picture, while extracting a block from each of the input picture and the storage picture. The area extraction unit sends the so extracted class taps and blocks as pixel information to a feature value detection unit 194.

Figure 22:
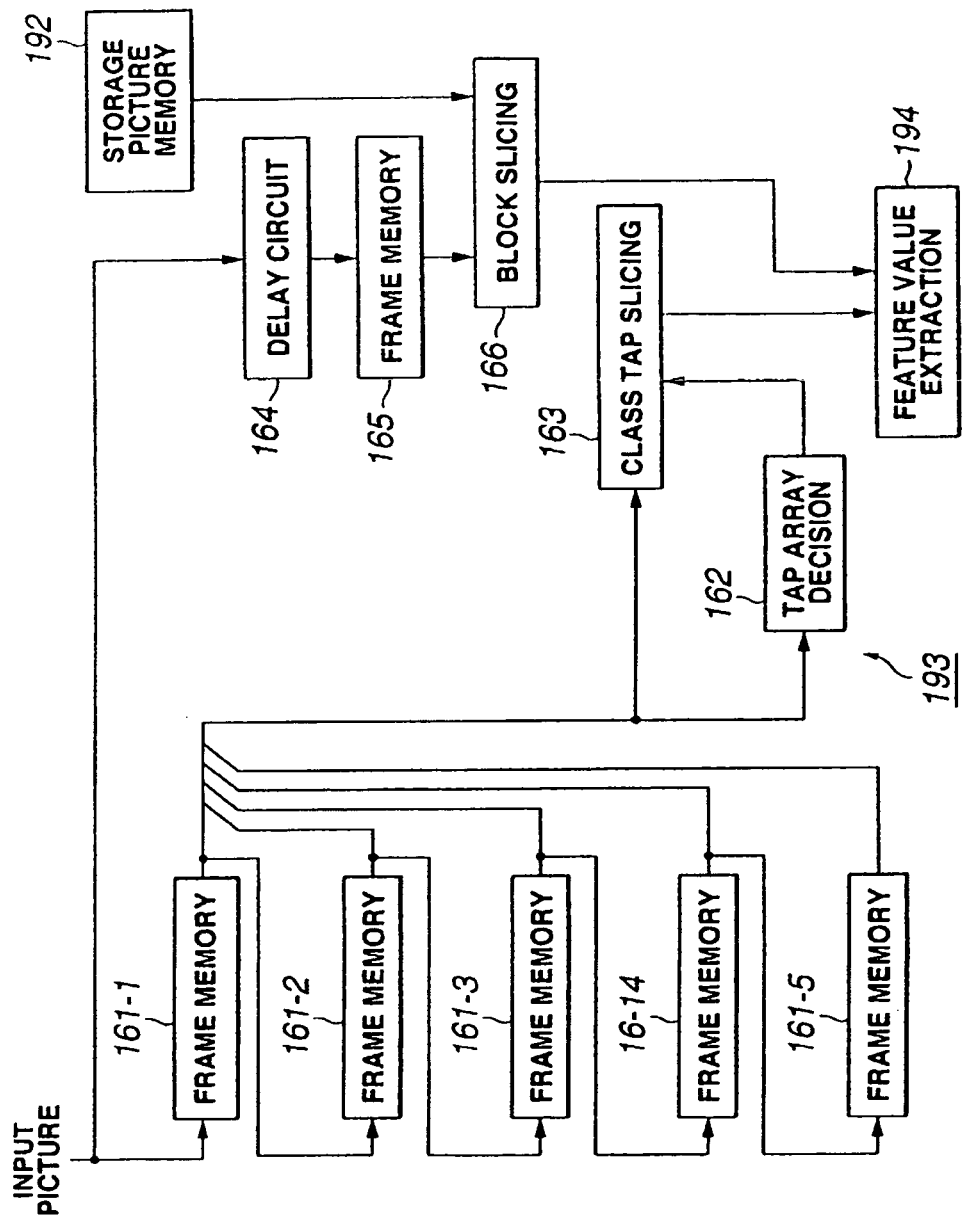
FIG. 22 is a block diagram showing an illustrative structure of the area extraction unit in the picture processing apparatus of FIG. 21.

FIG. 22 shows an illustrative structure of the area extraction unit 193.

In this area extraction unit 193, the input picture is sent to the frame memory 161-1 and to the delay circuit 164, while the storage picture from the storage picture memory 192 is sent to the block extraction unit 166.

The frame memory 161-1 delays the pupil picture by one frame to route the so delayed pupil picture to the frame memory 161-2, tap array decision unit 162 and to the class tap extraction unit 163.

The frame memory 161-2 delays the picture from the frame memory 161-1 by one frame to route the so delayed picture to the frame memory 161-3, tap array decision unit 162 and to the class tap extraction unit 163.

The frame memory 161-3 delays the picture from the frame memory 161-2 by one frame to route the so delayed picture to the frame memory 161-4, tap array decision unit 162 and to the class tap extraction unit 163.

The frame memory 161-4 delays the picture from the frame memory 161-3 by one frame to route the so delayed picture to the frame memory 161-5, tap array decision unit 162 and to the class tap extraction unit 163.

The frame memory 161-5 delays the picture from the frame memory 161-4 by one frame to route the so delayed picture to the tap array decision unit 162 and to the class tap extraction unit 163.

A tap array decision unit 162 decides the array positions of the class taps, based on the picture data of the frame sent from the frame memories 161-1 to 161-5, to send the results of decision to the prediction tap extraction unit 163. Meanwhile, the processing of tap array decision, to be performed by the tap array decision unit 162, is similar to that performed by the tap array decision unit 31 of FIG. 5 and hence is not here explained specifically.

With a pixel on the frame Fn supplied from the frame 161-3 as a subject pixel, the prediction tap extraction unit 163 extracts pixels on the frame Fn−2 from the frame memory 161-1 (frame preceding the frame Fn by two frames), frame Fn−1 from the frame memory 161-2 (frame preceding the frame Fn by one frame), frame Fn+1 from the frame memory 161-4 (frame later than the frame Fn by one frame) and the frame Fn+2 from the frame memory 161-5 (frame later than the frame Fn by two frames), lying in position relationships with respect to the subject pixel, corresponding to the position information from the tap array decision unit 162, as class taps, to output the so extracted class taps to the feature value detection unit 105.

Since the arraying of the respective taps can be switched in this manner on the pixel basis, and the tap positions can be changed depending on the motion vector, corresponding pixels can be extracted from frame to frame to allow to cope with movements.

The delay circuit 164 delays the pupil picture, sent thereto, in such a manner that a picture held by a frame memory 165 will be sent therefrom to the block extraction unit 166 corresponding to the supply timing of the picture held in the frame memory 161-3 therefrom to the class tap extraction unit 163.

The block extraction unit 166 is fed not only with the picture from the frame memory 165 but also with the storage picture from the storage picture memory 192.

The block extraction unit 166 extracts blocks of, for example, 8×8 pixels, lying at the same positions of the input picture and in the storage picture, to route the so extracted blocks to the feature value detection unit 194.

In this manner, the area extraction unit 193 extracts the class taps from the input picture, while extracting blocks from the input picture and the storage picture and routing the so extracted class taps and blocks as the pixel information to the feature value detection unit 194.

The feature value detection unit 194 detects preset feature value, from the pixel information supplied from the area extraction unit 193, such as class taps or blocks, to route the so detected feature value to a class code generating unit 195.

Figure 23:
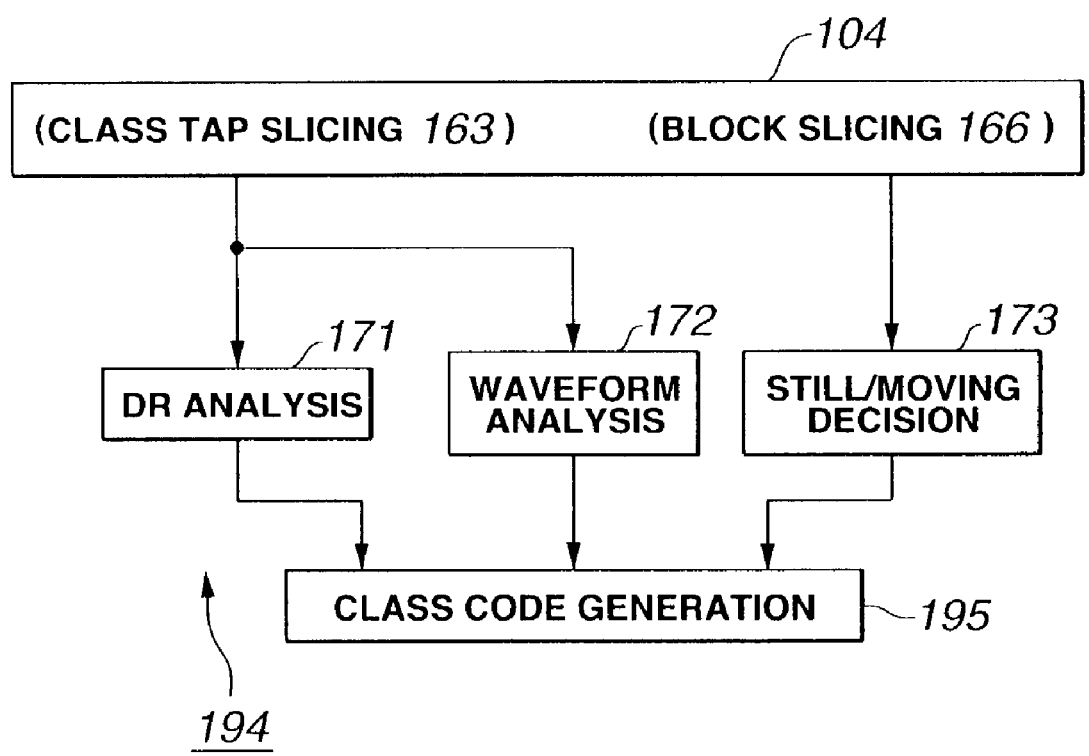
FIG. 23 is a block diagram showing an illustrative structure of a feature value detection unit in the picture processing apparatus of FIG. 21.

FIG. 23 shows an illustrative structure of the feature value detection unit 194. In this feature value detection unit 194, the class tap, extracted by the class tap extraction unit 163 of the area extraction unit 193, is sent to the DR analysis unit 171 and to the waveform analysis unit 172. The block extracted by the block extraction unit 166 of the area extraction unit 197 is sent to a still/moving decision unit 173.

The DR analysis unit 171 calculates the dynamic range of the pixel values of the pixels forming the class tap supplied thereto and converts its value to a binary number which is routed to the class code generating unit 195.

The waveform analysis unit 172 performs 1-bit ADRC processing, for example, based on pixel values of the pixels making up the class tap supplied thereto, for waveform analysis. The waveform analysis unit sends the bit string, representing the results of analysis, to the class code generating unit 195.

The still/moving decision unit 173 calculates the following equation (2):

$$\text{differential value} = \sum_{X}\sum_{Y} |Y[in(x, y)] - Y[tmp(x, y)]| \quad (2)$$

from one supplied block to another to calculate the differential value of the luminance of the pixels making up the block.

In the above equation, Y[in(x, y)] denotes a luminance value of a pixel on the block of the pupil picture specified by a coordinate (x, y) and Y[tmp(x, y)] denotes a luminance value of a pixel of the block of the storage picture specified by the coordinate (x, y).

On the other hand, the still/moving decision unit 173 checks whether or not the calculated value of the difference is larger than a preset threshold and, based on the result of decision, verifies whether the subject pixel is still or moving. If the calculated value of the difference is verified to be larger than the preset threshold value, the subject pixel is determined to be moving so that the still/moving decision unit 173 outputs the information specifying that effect, such as the value 0, to the class code generating unit 195. If conversely the calculated value of the difference is verified to be smaller than the preset threshold value, the subject pixel is determined to be still, so that the still/moving decision unit 173 outputs the information specifying that effect, such as the value 1, to the class code generating unit 195.

In this manner, the feature value detection unit 194 detects the dynamic range and the results of the waveform analysis, from the class taps from the area extraction unit 193, while detecting the information specifying whether or not the subject pixel is still or moving, from the block of the area extraction unit 197, as the feature value necessary for classification of the generated pixels, to send the resulting feature value to the class code generating unit 195.

In the present instance, the movement of the subject pixel represents the feature value. Alternatively, the difference in luminance between the block of the pupil picture and the block of the storage picture may be used as the feature value. The difference in luminance between one pixels also suffices. Both the movement of the subject pixel and the difference in luminance may be used as the feature values.

The class code generating unit 195 generates a class code, which is based on the feature value supplied from the feature value detection unit 194, to route the so generated class code to the ROM table 196.

The ROM table 196 holds the sets of the prediction coefficients, as calculated by the above-mentioned learning processing, from class to class, and outputs, from the sets of the prediction coefficients, stored therein, those corresponding to the class code from the class code generating unit 195 to an estimation calculating unit 198.

The area extraction unit 197 is configured similarly to the area extraction unit 107 of the picture processing apparatus 100, shown in FIG. 13, that is, is configured as shown in FIG. 20, and extracts prediction taps from the input picture and the storage picture to send the so extracted prediction taps to the estimation calculating unit 198.

Using the sets of the prediction coefficients from the ROM table 196, and the picture data based on the pixel information from the area extraction unit 197, the estimation calculating unit 198 calculates the above-mentioned equation (1), and sequentially generates the pixel values y of the output picture as being the results of the calculations.

The operation for generating a picture reduced in noise in the above-described picture processing apparatus 190 is hereinafter explained.

The noisy input picture is sent to the storage picture generating unit 191, area extraction unit 193 and to the area extraction unit 197.

In the present case, the storage picture generating unit 191 is configured similarly to the storage picture generating unit 102 of the picture processing apparatus 100, that is, configured similarly to the setup shown in FIG. 14 or FIG. 15. That is, the storage picture generating unit 191 generates the storage picture as it effectively reduces the noise of the still picture portion. The storage picture generated is sent to and stored in the storage picture memory 192.

The area extraction unit 193 extracts the class tap from the input picture, while extracting blocks from the input picture and the storage picture and routing them to the feature value detection unit 194.

Figure 24:
FIG. 24 shows the structure of class taps in the picture processing apparatus of FIG. 21.

In the present instance, a subject pixel on the frame Fn, indicated with a black circle, and the pixels on the frame Fn−2, frame Fn−1, frame Fn+1 and the frame Fn+2, indicated with hashed circles, lying in position relationships with respect to the subject pixel corresponding to the position information from the tap array decision unit, totaling at five pixels, are extracted as class taps, as shown in FIG. 24.

The feature value detection unit 194 calculates the dynamic range of the pixel values of the pixels, making up the class tap, based on the class taps from the area extraction unit 193, and performs waveform analysis by the 1-bit ADRC processing, while making still/moving decision for the subject pixel based on the block from the area extraction unit 193.

The feature value detection unit 194 sends the dynamic range, results of the waveform analysis and the results of the still/moving decision to the class code generating unit 195.

The class code generating unit 195 generates a class code, which is based on data from the feature value detection unit 194, to route the so generated class code to the ROM table 196.

The ROM table 196 outputs, from among the sets of the prediction coefficients for noise reduction, stored from class to class, those associated with the class code from the class code generating unit 195, to the estimation calculating unit 198.

The area extraction unit 197 extracts the prediction taps from the input picture and the storage picture to route the so extracted prediction taps to the estimation calculating unit 198.

In the present instance, a subject pixel on the frame Fn, indicated with a black circle, and each 13 pixels on the frames Fn−2 to Fn+2, indicated by hashed circles, lying in position relationships with respect to the subject pixel which are based on the position information from the tap array decision unit, are extracted as prediction taps, as shown in FIG. 25A. In addition, the pixel on the storage picture registering with the subject pixel on the frame Fn is rendered the subject pixel as indicated with a black circle in FIG. 25B, whilst the pixels on the storage picture, indicated with hashed circles, lying in preset position relationships with respect to the subject pixel, are also extracted as prediction taps.

Using the sets of the prediction coefficients from the ROM table 196, and pixel data of the prediction taps which are based on the pixel information from the area extraction unit 197, the estimation calculating unit 198 sequentially calculates the aforementioned equation (1) to sequentially generate pixel values y of the output picture.

Next, the operation of generating a picture, the edges of the feature area of which are not blurred, by the present picture processing apparatus 190, is now explained.

Figure 26A:
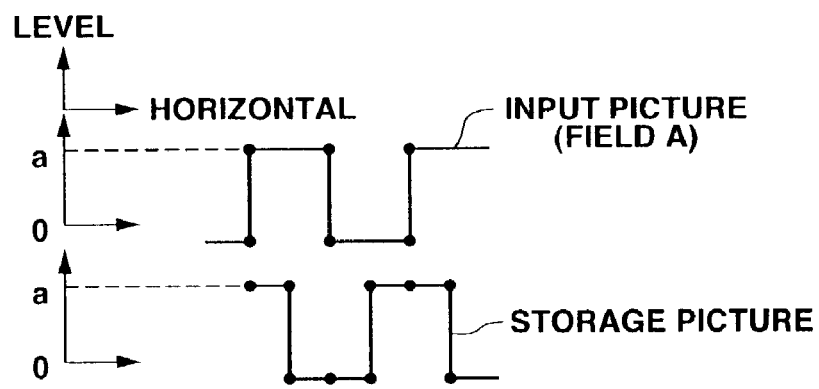
FIGS. 26A, 26B show another level distribution of pixels of the feature area and the other picture portions in case a high definition picture is to be generated from an input picture by synthesis as the pixels of feature areas of an input picture shifted to an out-of-phase position relative to those of a storage picture.
Figure 26B:
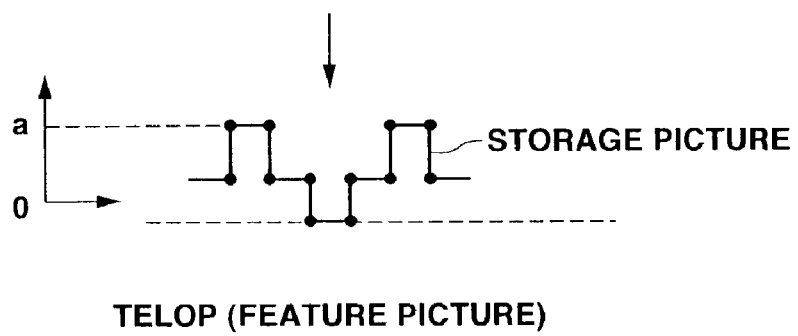

In this instance, the edges of the feature area are corrected by generating a picture of high definition from the input picture. That is, in the storage picture generating unit 191, the input picture and the storage picture are synthesized in such a manner that the pixels of the feature areas thereof are out of phase relative to each other a preset amount, as shown in FIG. 26A, whereby the feature area as the storage picture is detected. By so doing, the storage picture becomes a high definition picture having the same pixel density as that of an ultimately produced picture, as shown in FIG. 26B.

Figure 27A:
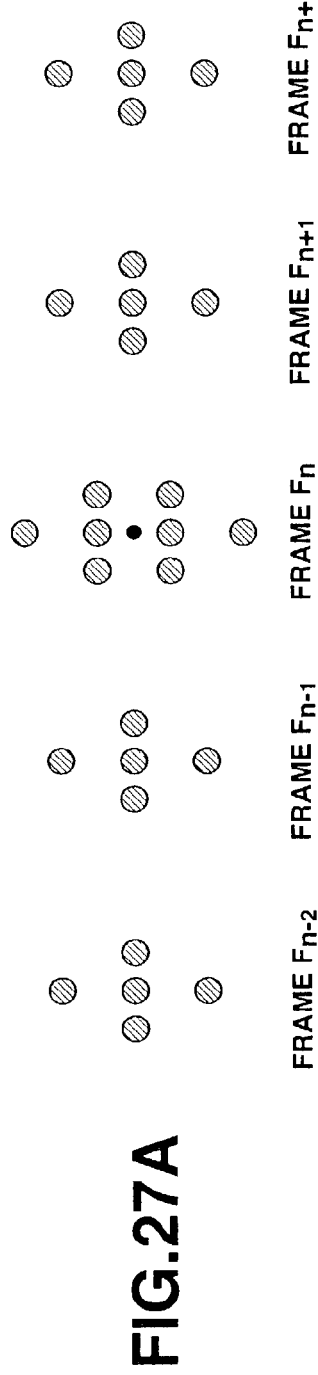
FIGS. 27A, 27B show another illustrative structure of class taps in the picture processing apparatus of FIG. 21.
Figure 27B:
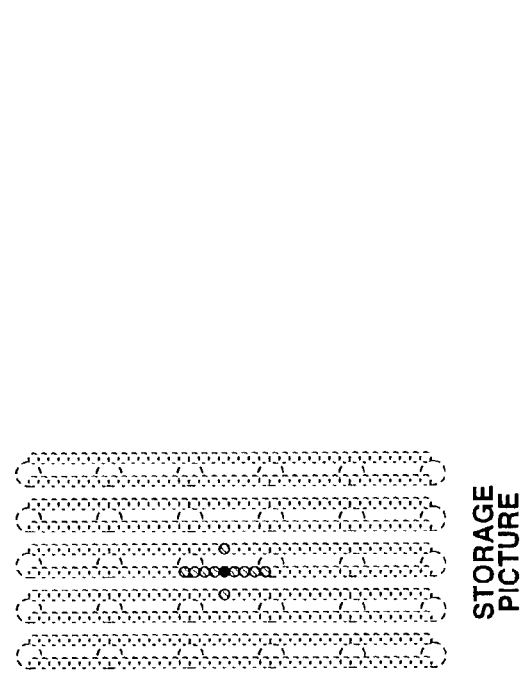

The operation of the area extraction unit 193 is basically the same as that in case of noise reduction, and hence is not explained specifically for simplicity. The class tap in the present instance is of a structure such as is shown in FIG. 27.

That is, the class taps are made up of eight pixels on the frame Fn, lying at a preset position relationship with a subject pixel, indicated by a hashed circle, of the ultimately produced picture (picture concurrent with the frame Fn and with the storage picture), each five pixels of the frames Fn−2, Fn−1, Fn+1 and Fn+2 (FIG. 27A) and 11 pixels of the storage picture.

Figure 28:
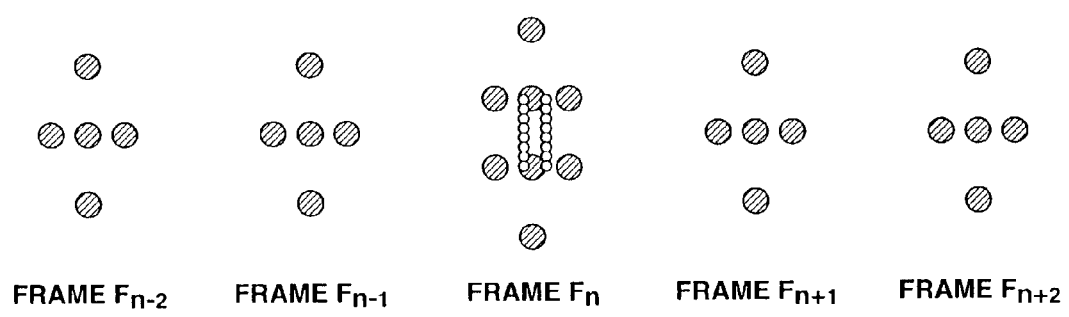
FIG. 28 shows another illustrative structure of prediction taps in the picture processing apparatus of FIG. 21.

Meanwhile, if a pixel of a picture generated between the pixels of the input picture is a subject pixel, the pixels on the frames Fn−2 to Fn+2, extracted as class taps, are not unchanged, as shown in FIG. 28, no matter which or the pixels is the subject pixel. The pixels extracted from the storage picture differ with the positions of the subject pixel.

Although the class taps are different in structure from the prediction taps, the the class taps and the prediction taps may also be the of the same structure.

Figure 29:
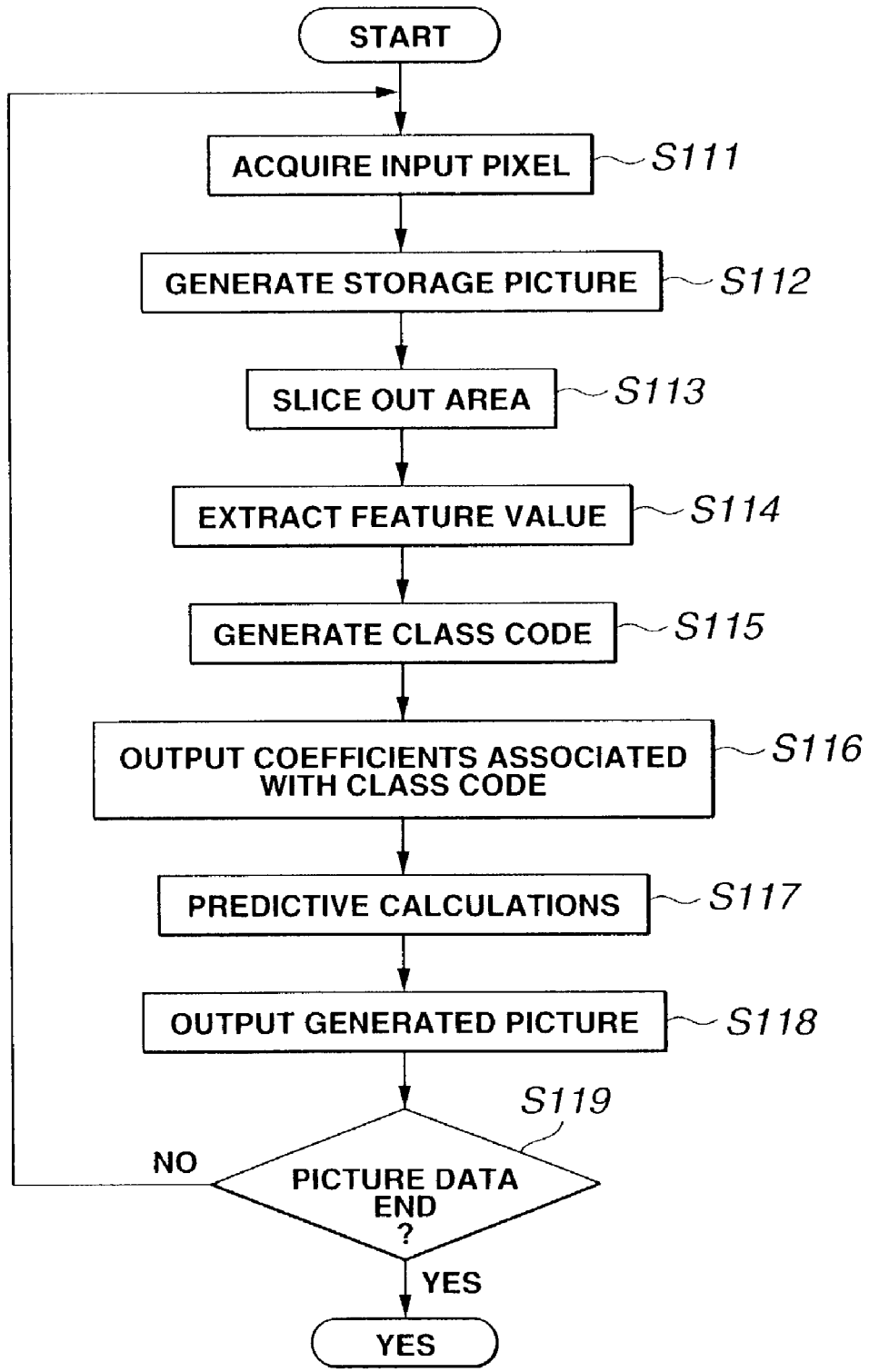
FIG. 29 is a flowchart showing the procedure of picture processing executed in the picture processing apparatus of FIG. 21.

In the above-described picture processing apparatus 190, the picture processing is carried out in accordance with the procedure shown in the flowchart shown in FIG. 29.

That is, in the present picture processing apparatus 190, an input picture is first acquired at step S111.

At the next step S112, a feature area, reduced in noise in the still picture portion, is detected from the input picture, by the storage picture generating unit 191, so as to be stored as a storage picture in the storage picture memory 192.

At the next step S113, the class tap is extracted from the input picture by the area extraction unit 193, whilst a block is extracted from each of the input picture and the storage picture.

At the next step S114, a preset feature value is detected from the input picture by the feature value detection unit 194, based on the class tap and the blocks extracted from the area extraction unit 193.

At the next step S115, the class code is generated by the class code generating unit 195, based on the feature value detected by the feature value detection unit 194.

At the next step S116, the sets of the prediction coefficients, corresponding to the class code generated by the class code generating unit 195, are output from the ROM table 196.

At the next step S117, predictive calculations are carried out by the estimation calculating unit 198, using the sets of the prediction coefficients from the ROM table 196, and the picture data of the prediction taps, which are based on the picture information from the area extraction unit 197.

At the next step S118, pixel values of the output picture, obtained on predictive calculations by the estimation calculating unit 198, are sequentially output.

In the present picture processing apparatus 190, it is checked at the next step S118 whether or not the totality of the pixel values of the output picture have been output. If there is any pixel value not as yet output, the program reverts to step S111 to repeat the processing as from the step S111 to the step S118 to output the totality of the pixel values of the output picture to terminate the processing.

Figure 30:
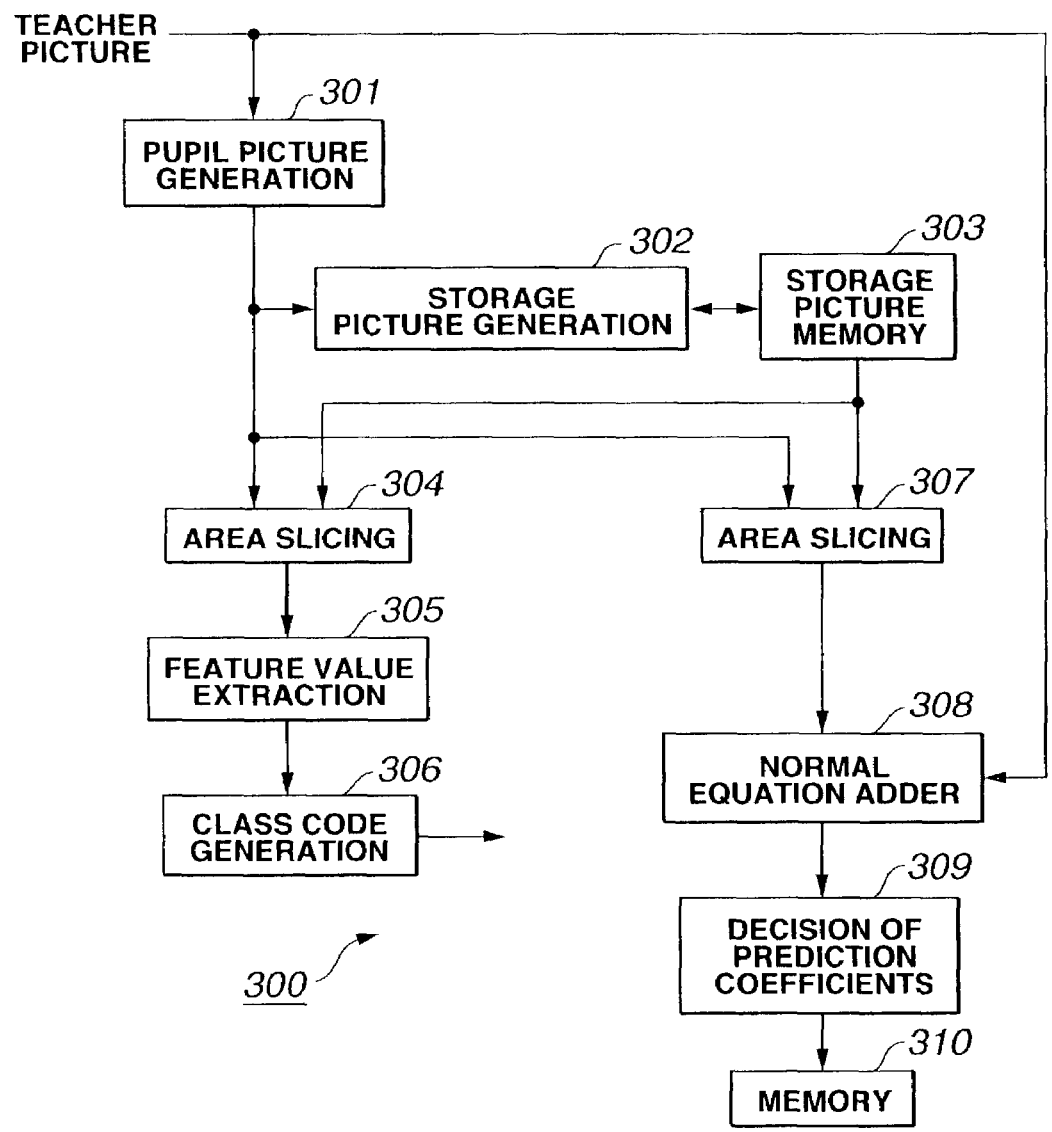
FIG. 30 is a block diagram showing an illustrative structure of a picture processing apparatus for executing the learning processing embodying the present invention.

FIG. 30 shows an exemplary structure of a picture processing apparatus 300 embodying the present invention. This picture processing apparatus 300 executes the learning processing for finding the prediction coefficients used in the processing of picture generation in the above-described picture processing apparatus 100, 190.

In this picture processing apparatus 300, a picture which is to be a teacher picture in learning, for example, a picture free of noise or a picture, the edges of the feature area of which are not blurred, is supplied to a pupil picture generating unit 301 and to a normal equation addition unit 308.

The pupil picture generating unit 301 processes the teacher picture in a preset fashion to generate a pupil picture corresponding to the input picture in the processing of picture generation. For example, noise is superimposed on the teacher picture to generate a pupil picture usable for calculating prediction coefficients in the processing of generating a picture reduced in noise, or the teacher picture is deteriorated in resolution, such as by decimation, to generate a pupil picture usable fore calculating the prediction coefficients in the processing of generating a picture the edge of the feature area of which is not blurred.

For example, if noise is superimposed on the teacher picture, the pupil picture generating unit 301 generates the random noise to add it to the teacher picture. The noise may also be superimposed on the teacher picture by a configuration shown for example in FIGS. 31 to 33.

Figure 31:
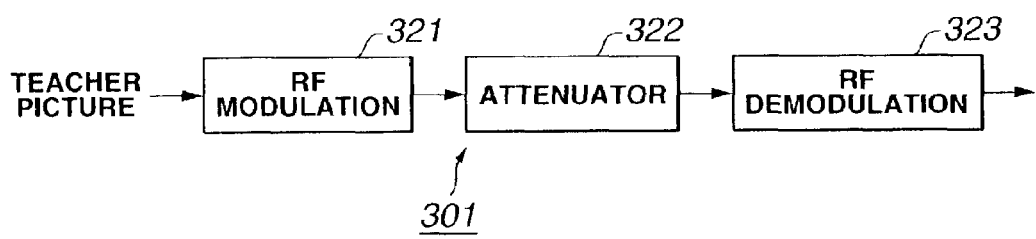
FIG. 31 is a block diagram showing an illustrative structure of a pupil picture generating unit in the picture processing apparatus of FIG. 30.

In the case of the pupil picture generating unit 301, shown in FIG. 31, an RF modulation unit 321 generates random noise, which is routed to an attenuator 322. The attenuator 322 attenuates the output of the RF modulation unit 321 to output the resulting attenuated output to an RF demodulation unit 323. The RF demodulation unit 323 RF demodulates the output of the attenuator 322 to generate a picture corresponding to the teacher picture with the noise superimposed thereon.

Figure 32:
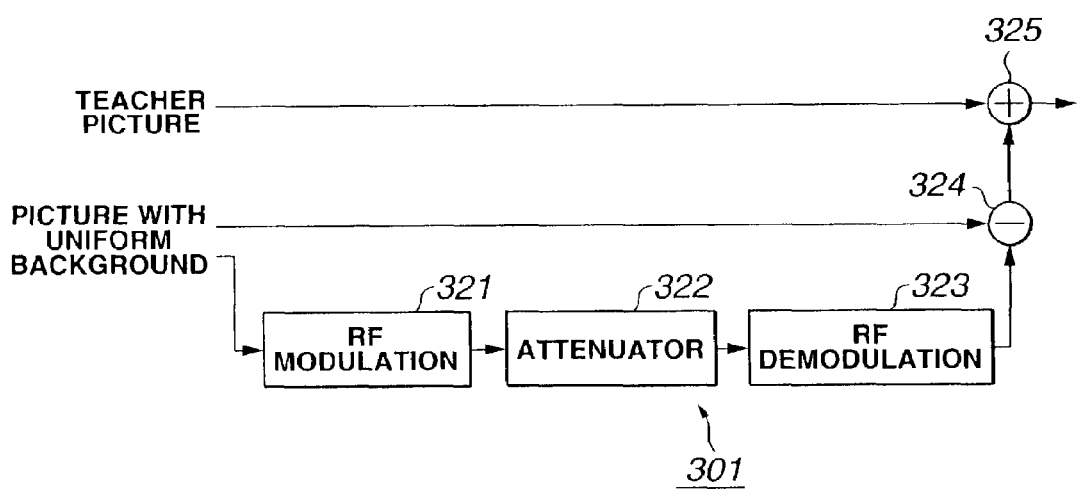
FIG. 32 is a block diagram showing another illustrative structure of the pupil picture generating unit in the picture processing apparatus of FIG. 30.

In the case of the pupil picture generating unit 301, shown in FIG. 32, a picture with a uniform background is sent to the RF modulation unit 321 and to a substracter 324. The processing by the components from the RF modulation unit 321 to the RF demodulation unit 323 is not explained here since it is the same as the processing explained with reference to FIG. 32. An output of the RF demodulation unit 323 is sent to the substracter 324. The substracter 324 calculates the difference between a picture with a uniform background and the output of the RF demodulation unit 323 to output the so calculated difference to an adder 325. The adder 325 sums the output of the substracter 324 to the teacher data to generate a picture corresponding to the teacher picture with the noise superimposed thereon.

Figure 33:
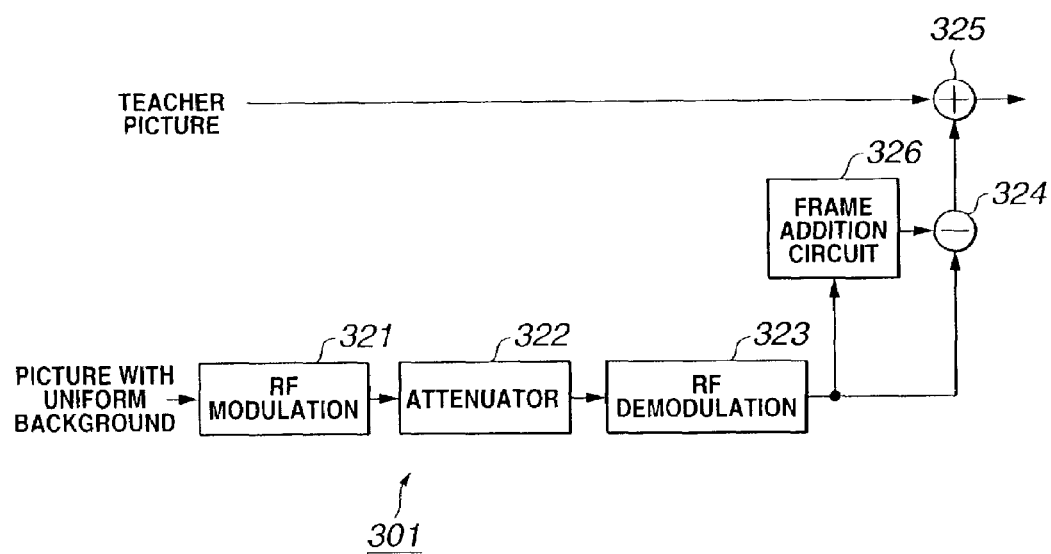
FIG. 33 is a block diagram showing still another illustrative structure of the pupil picture generating unit in the picture processing apparatus of FIG. 30.

In the pupil picture generating unit 301, shown in FIG. 33, the picture with a uniform background is sent to the RF modulation unit 321. The processing by the components from the RF modulation unit 321 to the RF demodulation unit 323 is not explained in detail since it is the same as that explained in connection with FIG. 31. An output of the RF demodulation unit 323 is sent to the substracter 324 and to a frame addition circuit 326. The frame addition circuit 326 generates a picture corresponding to an output of the RF demodulation unit 323 less the noise, by addition of a frame supplied from the RF demodulation unit 323, to send the so generated picture to the substracter 324. The processing by the substracter 324 and the adder 325 is not explained here since it is the same as the processing explained in connection with FIG. 32.

In the present picture processing apparatus 300, a storage picture generating unit 302, similar in structure to the storage picture generating unit 102 or 191 of the picture processing apparatus 100 shown in FIG. 13 or the picture processing apparatus 190 shown in FIG. 21, that is the configuration shown in FIGS. 14 to 16, is used. In the present storage picture generating unit 302, weight addition with the weighting value of q is applied to the pupil picture and to the storage picture of the directly previous frame. For example, if the value q=0.8, a storage picture is generated by adding 20% of the pupil picture to 80% of the storage picture. By summing the pupil picture and the storage picture preceding the pupil picture by one frame, at a preset proportion, the noise in the still picture portion can be reduced effectively. Moreover, since the pupil picture and the storage picture of the directly previous frame are stored and summed together at a preset proportion, the noise of the still picture portion can be reduced more effectively.

The storage picture generating unit 302 sends the picture so generated (detected) and which is reduced in noise as a storage picture to a storage picture memory 303.

The storage picture memory 303 holds a picture from the storage picture generating unit 302 and appropriately routes the storage picture to the area extraction units 304, 307.

Figure 34A:
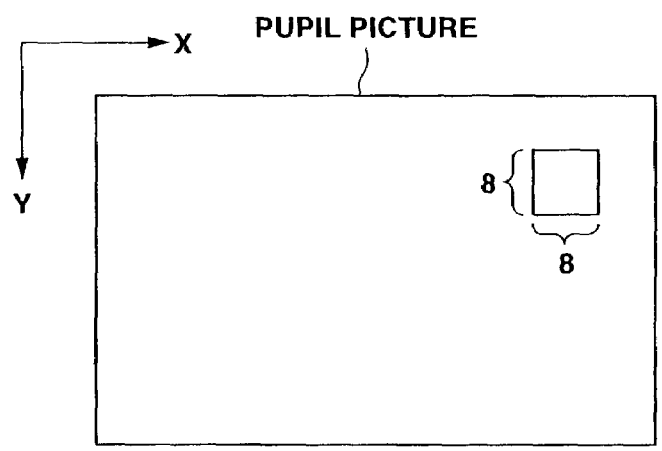
FIGS. 34A, 34B illustrate a block extracted by the area extraction unit in the picture processing apparatus of FIG. 30.
Figure 34B:
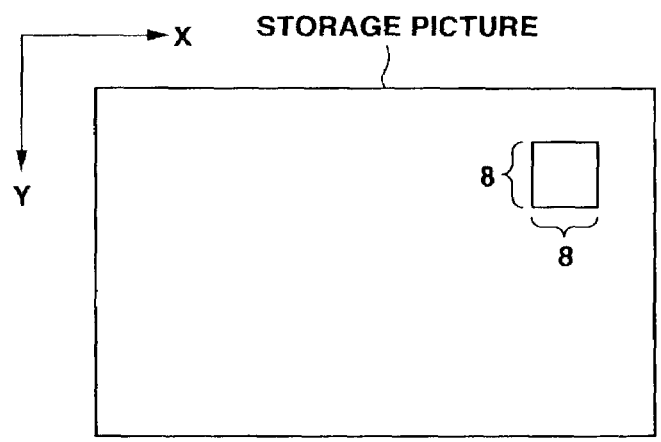

The area extraction unit 304 extracts the pixel information, necessary for classification, from the pupil picture from the pupil picture generating unit 301 and the storage picture from the storage picture memory 303, to route the so extracted information to the feature value detection unit 305. The area extraction unit 304 may be of the structure similar to that of the area extraction unit 193 in the above-described picture processing apparatus 190, that is, may be of the structure shown in FIG. 22. This area extraction unit 304 extracts the class taps from the pupil picture, while extracting the blocks of, for example, 8×8 pixels, lying at the same positions of the pupil picture and the storage picture, as shown in FIGS. 34A and 34B, to send the so extracted class taps and blocks as the pixel information to the feature value detection unit 305.

The feature value detection unit 305 detects the dynamic range and the results of the waveform analysis, from the class taps from the area extraction unit 304, while detecting the information specifying whether or not the subject pixel is still or moving, from the block of the area extraction unit 304, as the feature value necessary for classification of the generated pixels, to send the resulting feature value to the class code generating unit 306. The feature value detection unit 305 may be of the structure similar to that of the feature value detection unit 105 used in the picture processing apparatus 100, that is of the structure shown in FIG. 23.

In the present instance, the motion of the subject pixel is used as the feature value. Alternatively, the difference in luminance between the block of the pupil picture and that of the stored picture may be used as the feature value. The difference of luminance between one pixels may also suffice. It is also possible to use both the motion of the subject pixel and the different in luminance.

The class code generating unit 306 generates a class code, based on the feature value from the feature value detection unit 305, to send the so generated class code to the normal equation addition unit 308.

The area extraction unit 307 extracts the pixel information, needed for prediction, from the pupil picture from the pupil picture generating unit 301 and from the storage picture from the storage picture memory 303, and routes the pixel information so extracted to the normal equation addition unit 308. As this area extraction unit 307, the same type of the unit as the area extraction unit 107 in the above-described picture processing apparatus 100, shown in FIG. 20, is used.

Based on the class code from the class code generating unit 306, teacher picture and on the prediction taps from the area extraction unit 307, the normal equation addition unit 308 calculates data needed for solving the normal equation to find the prediction coefficients, and outputs the calculated results to a prediction coefficient decision unit 309.

Using the calculated results from the normal equation addition unit 308, the prediction coefficient decision unit 309 executes preset calculations to find class-based prediction coefficients to send the so calculated prediction coefficients to a memory 310 for storage therein.

The calculations executed in the normal equation addition unit 308 and in the prediction coefficient decision unit 309 are now explained.

In the above-described picture generation processing, the subject pixel and the pixels lying at preset position relationships with respect to the subject pixel are extracted from the input picture (noisy input picture or an input picture the edge of the feature area of which is blurred) and from the storage picture (the storage picture the noise in the still picture portion of which is reduced or the storage picture as the detected feature area). The above equation (1), which is the linear one-dimensional model defined by the linear combination of the values of the extracted pixels (pupil data) $x_1, \ldots, x_n$ and the prediction coefficients $w_1, \ldots, w_n$, as calculated by the learning processing, is calculated to find pixel values of the output picture.

Meanwhile, poly-dimensional or non-linear equations, instead of the linear one-dimensional equations, maybe calculated to find the pixel values of the output picture.

Although the equation (1) may be represented as the equation (3), the prediction coefficients w are not uniquely determined in case k=1, 2, 3, . . . , m in the equation (3), where m>n. Thus, in such case, the prediction coefficients w are found by the so-called least square method:

$$y_k = w_1 \times x_{k1} + w_2 \times x_{k2} + \ldots + w_n \times x_{kn} \qquad (3).$$

That is, the prediction coefficients are found so that the value of the equation (5) when the element $e_k$ of the error vector e is defined by the equation (4):

$$e_k = y_k - (w_1 \times x_{k1} + w_2 \times x_{k2} + \ldots + w_n \times x_{kn}) \qquad (4)$$

$$e^2 = \Sigma e_k^2 \qquad (5)$$

will be of the smallest value.

By way of explanation of the least square method more specifically, $e^2$ is partially differentiated with respect to the prediction coefficients $w_i$ (i=1, 2, . . . ), as indicated by the equation (6):

$$\frac{\partial e^2}{\partial w_i} = \sum_{k=0}^{m} 2\left(\frac{\partial e_k}{\partial w_i}\right) e_k = \sum_{p=0}^{m} 2x_{ki} \cdot e_k. \qquad (6)$$

If the pupil data $x_{ji}$, made up of pixel values of the extracted input picture or storage picture, are defined as indicated in the equation (7):

$$x_{ji} = \sum_{p=0}^{m} x_{pi} \cdot x_{pj} \tag{7}$$

and the pixel values of the teacher picture $y_i$ (teacher data) are defined as indicated in the equation (8):

$$y_i = \sum_{k=0}^{m} x_{ki} \cdot y_k \tag{8}$$

the equation (6) may be expressed by a matrix usually termed a normal equation indicated by the equation (9):

$$\begin{pmatrix} x_{11} & x_{12} & \cdots & x_{1n} \\ x_{21} & x_{22} & \cdots & x_{2n} \\ \cdots & \cdots & & \cdots \\ x_{n1} & x_{n2} & \cdots & x_{nn} \end{pmatrix} \begin{pmatrix} w_1 \\ w_2 \\ \cdots \\ w_n \end{pmatrix} = \begin{pmatrix} y_1 \\ y_2 \\ \cdots \\ y_n \end{pmatrix} \tag{9}$$

it being noted that the pupil data $x_{ji}$ means the number j row pupil data in the set of number i column pupil data (set of pupil data used for predicting the number i column pupil data $y_i$).

That is, the normal equation addition unit 308 calculates the equations (7) and (8), based on the pupil picture, storage picture and the teacher data, supplied thereto, to calculate the pupil data $x_{ij}$ formed by the values of pixels of the pupil picture or the storage picture and teacher data $y_i$ of pixel values of the teacher picture. Based on the routine matrix solution method, such as the sweep-out method, the prediction coefficient decision unit 309 solves the normal equation (9) to calculate the prediction coefficients w.

Figure 35:
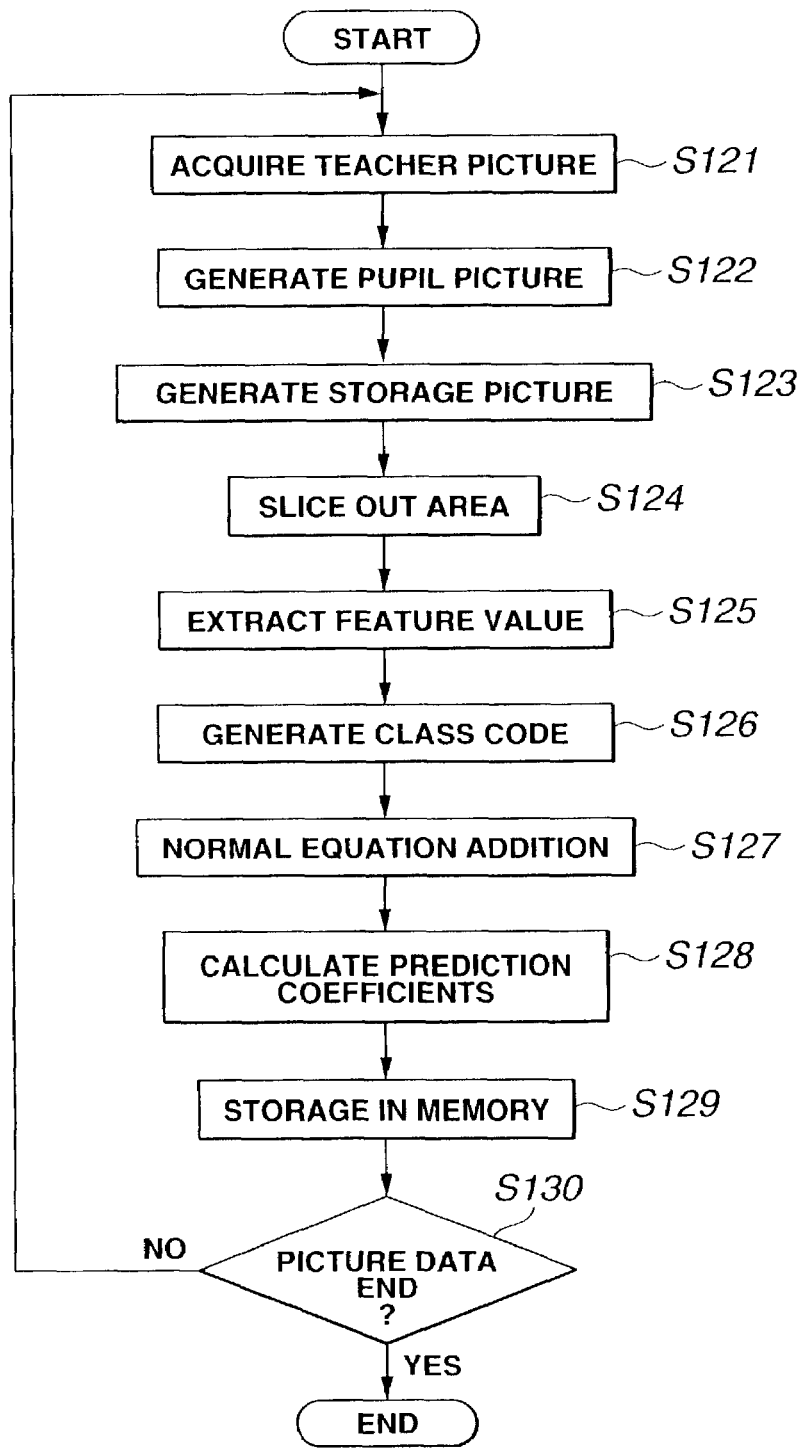
FIG. 35 is a flowchart showing the procedure of the learning processing executed on the picture processing apparatus of FIG. 30.

The above-described picture processing apparatus 300 executes picture processing in accordance with the flowchart shown in FIG. 35.

That is, in the present picture processing apparatus 300, the teacher data is first acquired at step S121.

At the next step S122, the pupil picture generating unit 301 performs preset processing on the teacher picture acquired at step S121 to generate a pupil picture equivalent to the input picture in the processing of picture generation.

At the next step S123, the pupil picture and the storage picture of the directly previous frame are weight-summed in the storage picture generating unit 302 to detect from the pupil picture the feature area corresponding to the still picture portion reduced in noise. The feature area so detected is stored as a storage picture in the storage picture memory 303.

At the next step S124, the class taps are extracted as the pixel information required for classification by the area extraction unit 304 from the pupil picture generated by the pupil picture generating unit 301, at the same time as a block formed by plural pixels lying at the registering positions of the pupil picture and the storage picture is also extracted.

At the next step S125, the feature value detection unit 305 acquires the dynamic range and the results of the waveform analysis from the class taps extracted from the area extraction unit 304, as feature value needed for classification of the generated pixels, while acquiring, from the blocks extracted by the area extraction unit 304, the information indicating whether the subject pixel is still or moving.

At the next step S126, the class code is generated by the class code generating unit 306 based on the feature value detected by the feature value detection unit 305 At the next step S127, data needed to solve the normal equation to find the prediction coefficients are calculated based on the class code from the class code generating unit 306, teacher picture and on the prediction taps from the area extraction unit 307.

At the next step S128, the prediction coefficient decision unit 309 executes preset calculations, using the results of calculations from the normal equation addition unit 308, to decide class-based prediction coefficients.

At the next step S129, the prediction coefficients, calculated by the prediction coefficient decision unit 309 from class to class, are stored in the memory 310.

In this picture processing apparatus 300, it is checked at the next step S130 whether or not the processing has been done on all of the picture data. Should there be any data to be processed, the program reverts to step S121 to repeat the processing as from step S121 to step S130 to process the totality of the picture data to terminate the learning processing.

Figure 36:
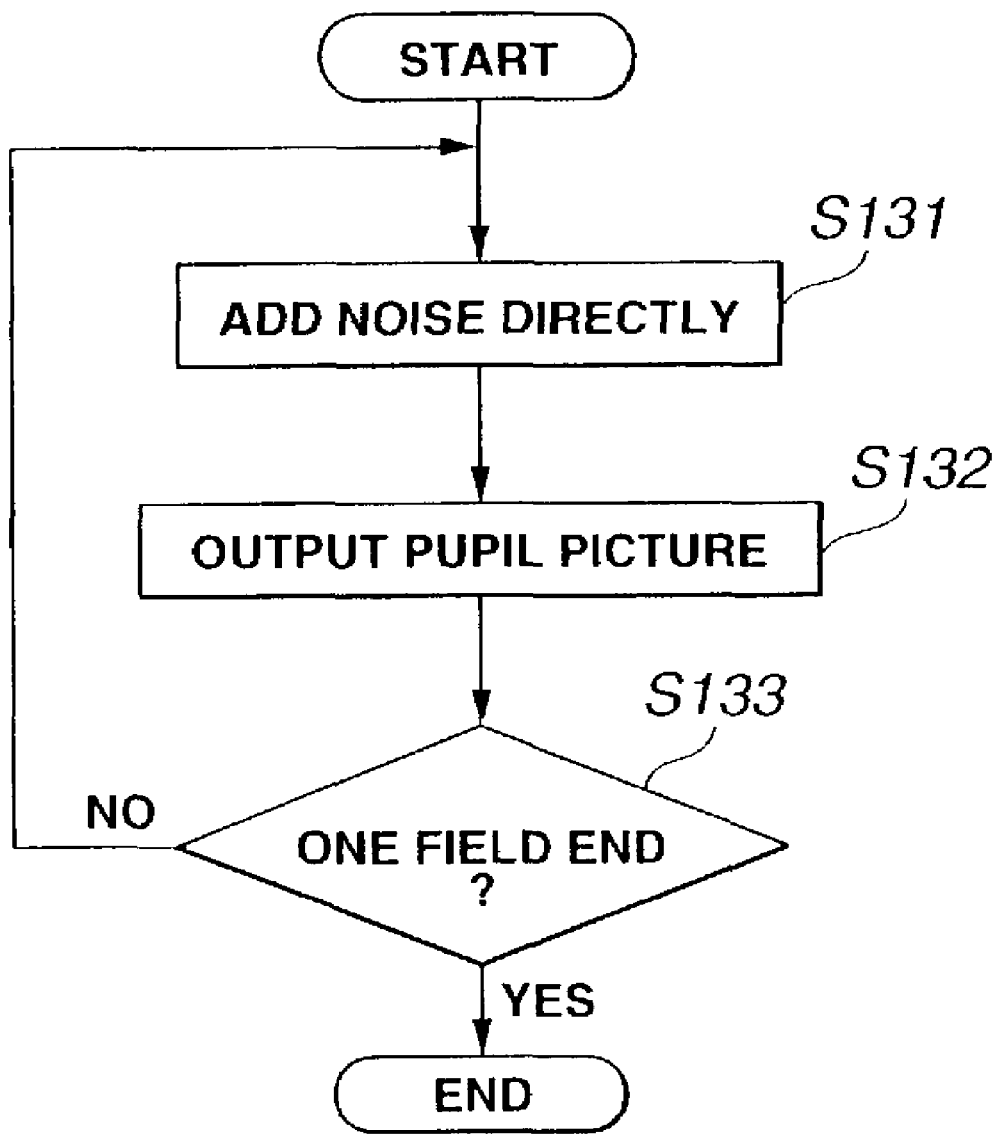
FIG. 36 is a flowchart showing the procedure of generating a pupil picture, executed in case the structure of FIG. 31 is used as the pupil picture generating unit in the picture processing apparatus of FIG. 30.

If the configuration of FIG. 31 is used as the present pupil picture generating unit 301, the processing of generating the pupil picture at the above step S122 is carried out in accordance with the procedure of the flowchart of FIG. 36.

That is, the present pupil picture generating unit 301 at step S131 directly adds the noise to the teacher picture by the attenuator 322.

At the next step S132, the teacher picture, summed with the noise by the processing of step S131, is output as pupil picture.

At the next step S133, it is checked whether or not the totality of the picture data for one field has been processed. If there is any data for processing, the program reverts to step S131 to repeat the processing from step S131 to step S133 to process the totality of the picture data to terminate the processing.

Figure 37:
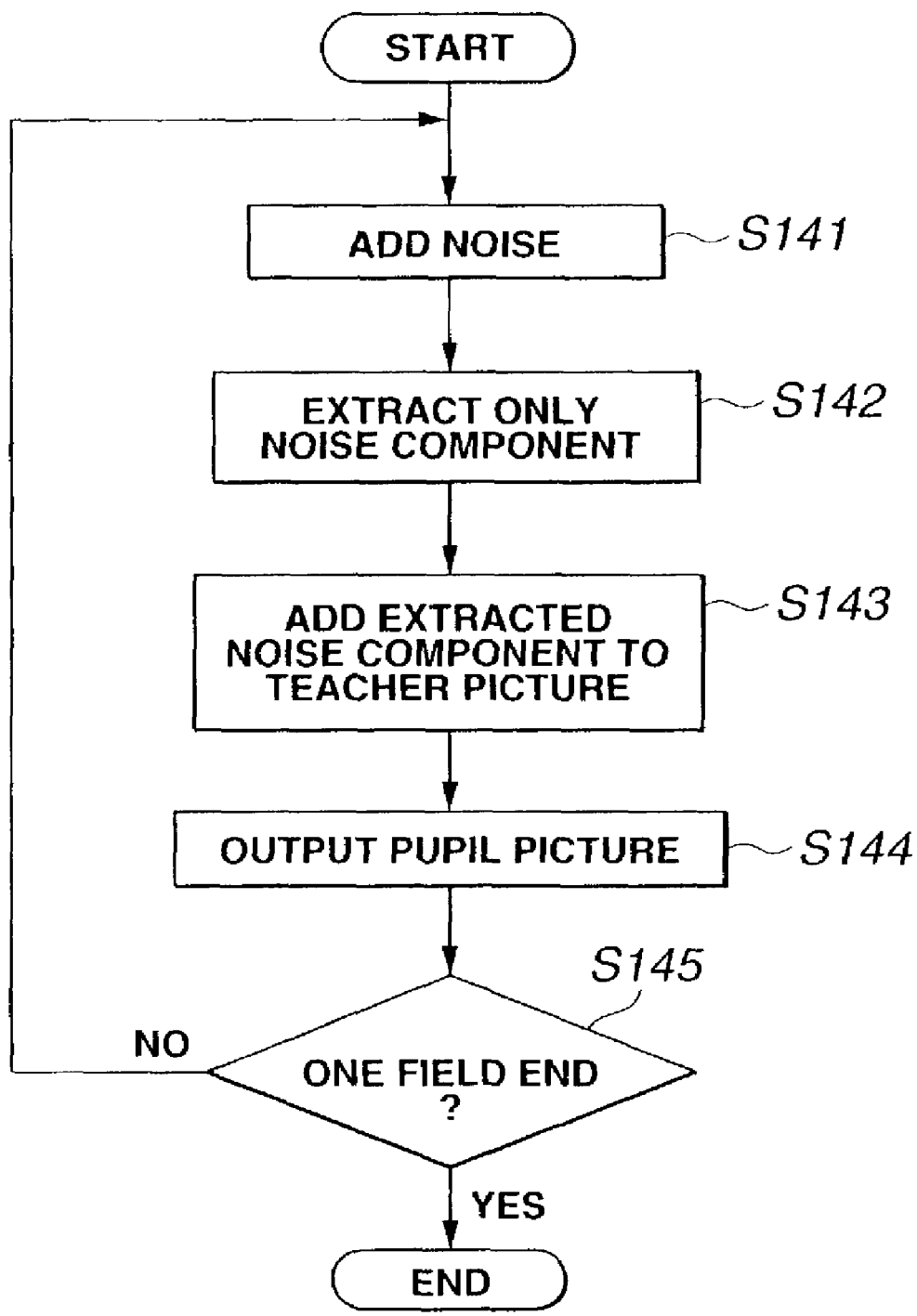
FIG. 37 is a flowchart for illustrating the procedure of generating a pupil picture, executed in case the structure of FIG. 32 is used as the pupil picture generating unit in the picture processing apparatus of FIG. 30.

If the configuration of FIG. 32 is used as the present pupil picture generating unit 301, the processing of generating the pupil picture at the above step S122 is carried out in accordance with the procedure of the flowchart of FIG. 37.

Specifically, the pupil picture generating unit 301 at step S141 adds the noise to a picture having a uniform background by the attenuator 322.

At the next step S142, the original picture with the uniform background is subtracted by substracter 324 from the picture with the uniform background, which is summed with the noise by the processing at step S141, thereby extracting only the noise component attributable to the attenuator 322.

At the next step S143, the noise extracted by the processing of the above step S143 is added to the teacher picture by the adder 325.

At the next step S144, the teacher picture, summed with the noise by the processing of step S143, is output as pupil picture.

At the next step S145, it is checked whether or not the totality of the picture data for one field has been processed. Should there be any picture data left for processing, the program reverts to step S141 to repeat the processing as from step S141 to S145 to process the totality of the picture data to terminate the processing.

Figure 38:
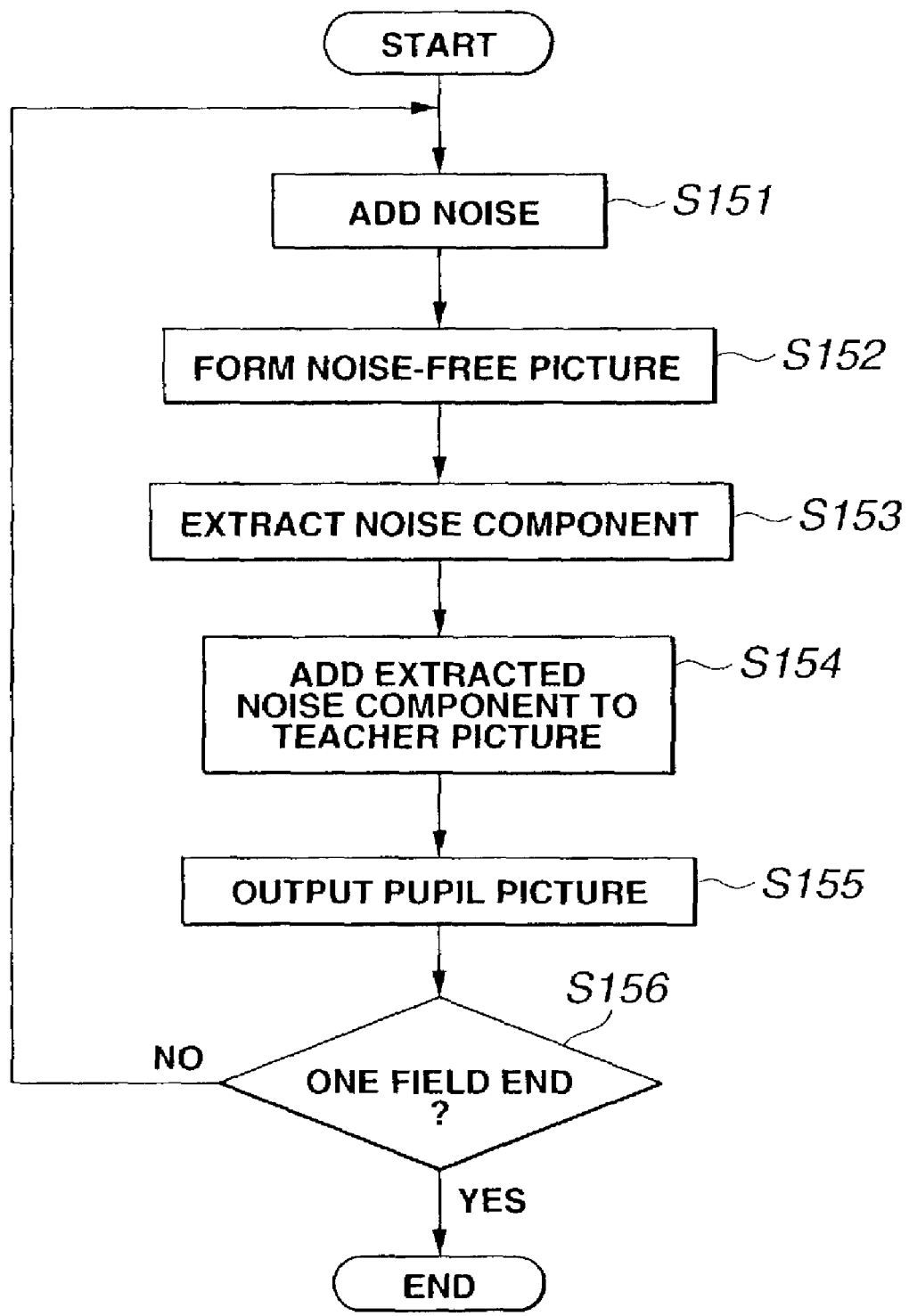
FIG. 38 is a flowchart for illustrating the procedure of generating a pupil picture, executed in case the structure of FIG. 33 is used as the pupil picture generating unit in the picture processing apparatus of FIG. 30.

If the configuration of FIG. 33 is used as the pupil picture generating unit 301, the processing of generating the pupil picture at the above step S122 is carried out in accordance with the procedure of the flowchart shown in FIG. 38.

That is, the present pupil picture generating unit 301 at step S151 adds the noise to a picture of the uniform background by the attenuator 322.

At the next step S152, frame addition by the frame addition circuit 326 is applied to the picture of the uniform background, which is summed with the noise by the processing of the above step S151, to generate a noise-free picture.

At the next step S153, the noise-free picture obtained by the processing at step S151 is subtracted by the substracter 324 from the picture with the uniform background, which is summed with the noise by the processing of the above step S151, thereby extracting only the noise component attributable to the attenuator 322.

At the next step S154, the noise extracted by the processing at step S153 is added to the teacher picture by the adder 325.

At the next step S155, the teacher picture summed with the noise by the processing at the above step S153 is output as the pupil picture.

At the next step S156, it is checked whether or not the totality of the picture data for one field has been processed. Should there be any picture data left for processing, the program reverts to step S151 to repeat the processing as from step S151 to S156 to process the totality of the picture data to terminate the processing.

Figure 39:
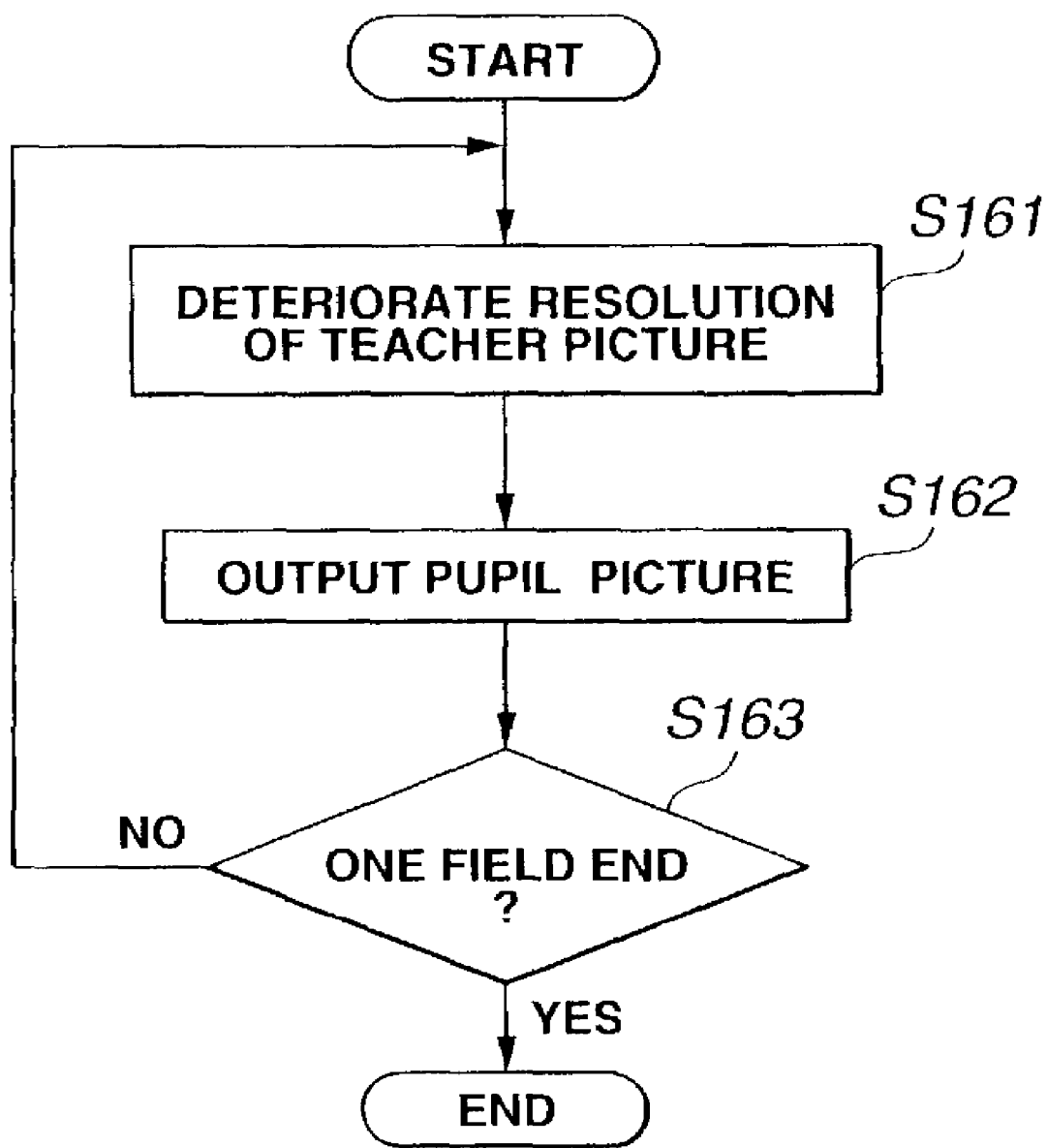
FIG. 39 is a flowchart for illustrating the procedure of generating a pupil picture, executed in case the teacher picture is higher in resolution than the pupil picture generated in the pupil picture generating unit in the picture processing apparatus of FIG. 30.

If, in the processing of generating the pupil picture at the above step S122, the teacher picture is higher in resolution than the pupil picture to be generated, the pupil picture is generated in accordance with the procedure of the flowchart of FIG. 39 to generate the pupil picture.

That is, the pupil picture generating unit 301 at step S161 applies the processing of deteriorating the resolution of the pupil picture by decimation or filtering to the teacher data.

At the next step S162, the teacher picture, deteriorated in resolution by the processing at step S161 is output as a pupil picture.

At step S163, it is verified whether or not the totality of the picture data for one field has been processed. Should there be any picture data left for processing, the program reverts to step S161 to repeat the processing as from step S161 to S163 to process the totality of the picture data to terminate the processing.

Figure 40:
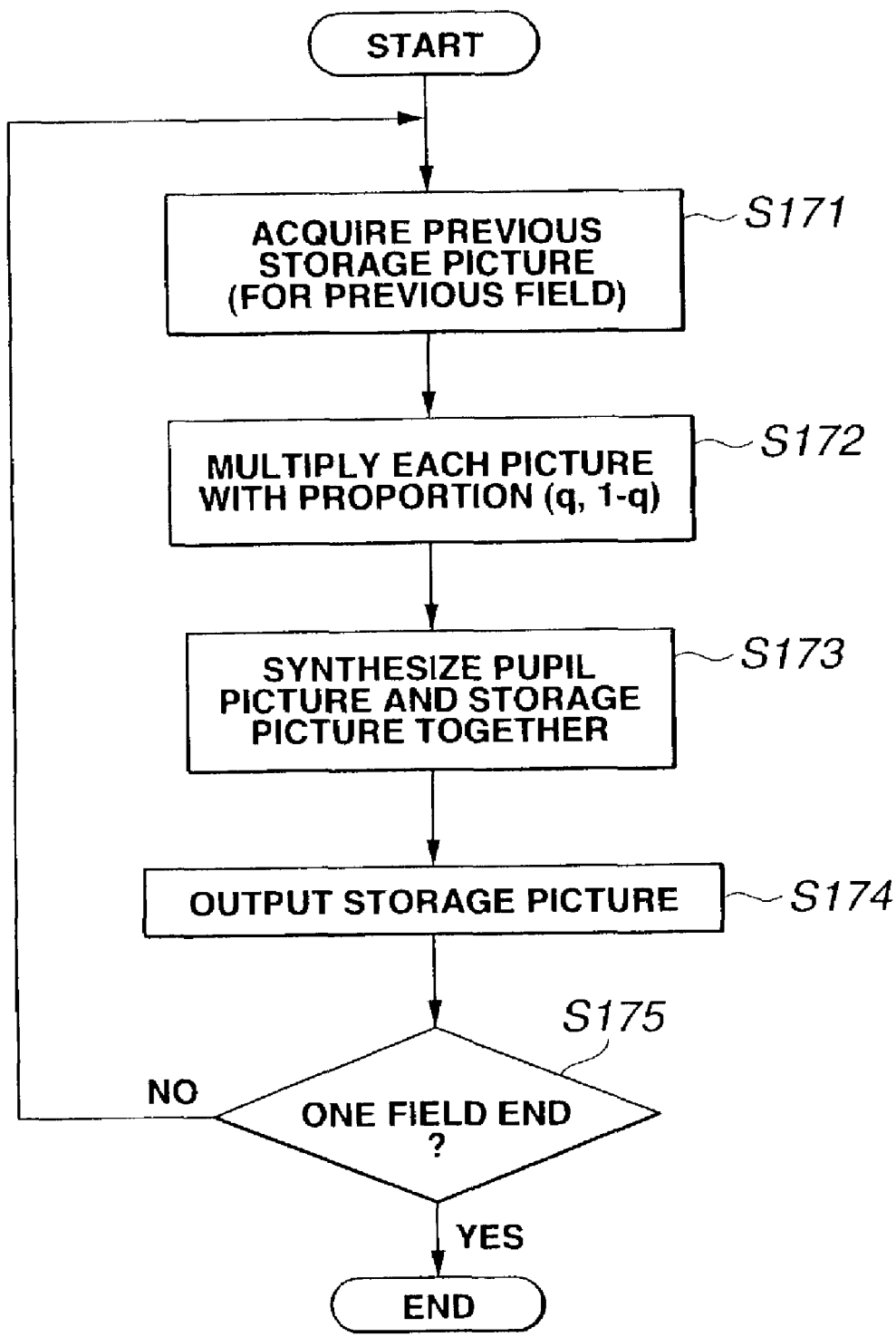
FIG. 40 is a flowchart showing the procedure of generating a stored picture in case the structure of FIG. 14 is used as the pupil picture generating unit in the picture processing apparatus of FIG. 30.

If the configuration of FIG. 14 is used as the pupil picture generating unit 302, the processing of generating the storage picture at the above step S123 is carried out in accordance with the procedure of the flowchart shown in FIG. 40.

Specifically, the present pupil picture generating unit 302 at step S171 acquires the storage picture of the directly previous field from the storage picture memory 303.

At the next step S172, the storage picture of the directly previous field is multiplied with a weighting value q, while the pupil picture is multiplied with a weighting value (1−q).

At the next step S173, the storage picture of the directly previous frame and the pupil picture, multiplied at the step S172 with the weighting values (q, 1−q), are summed and synthesized together to form a new storage picture.

At the next step S174, the new storage picture, synthesized at the above step S173, is output.

At step S175, it is verified whether or not the totality of the picture data for one field has been processed. Should there be any picture data left for processing, the program reverts to step S171 to repeat the processing as from step S171 to S175 to process the totality of the picture data to terminate the processing.

Figure 41:
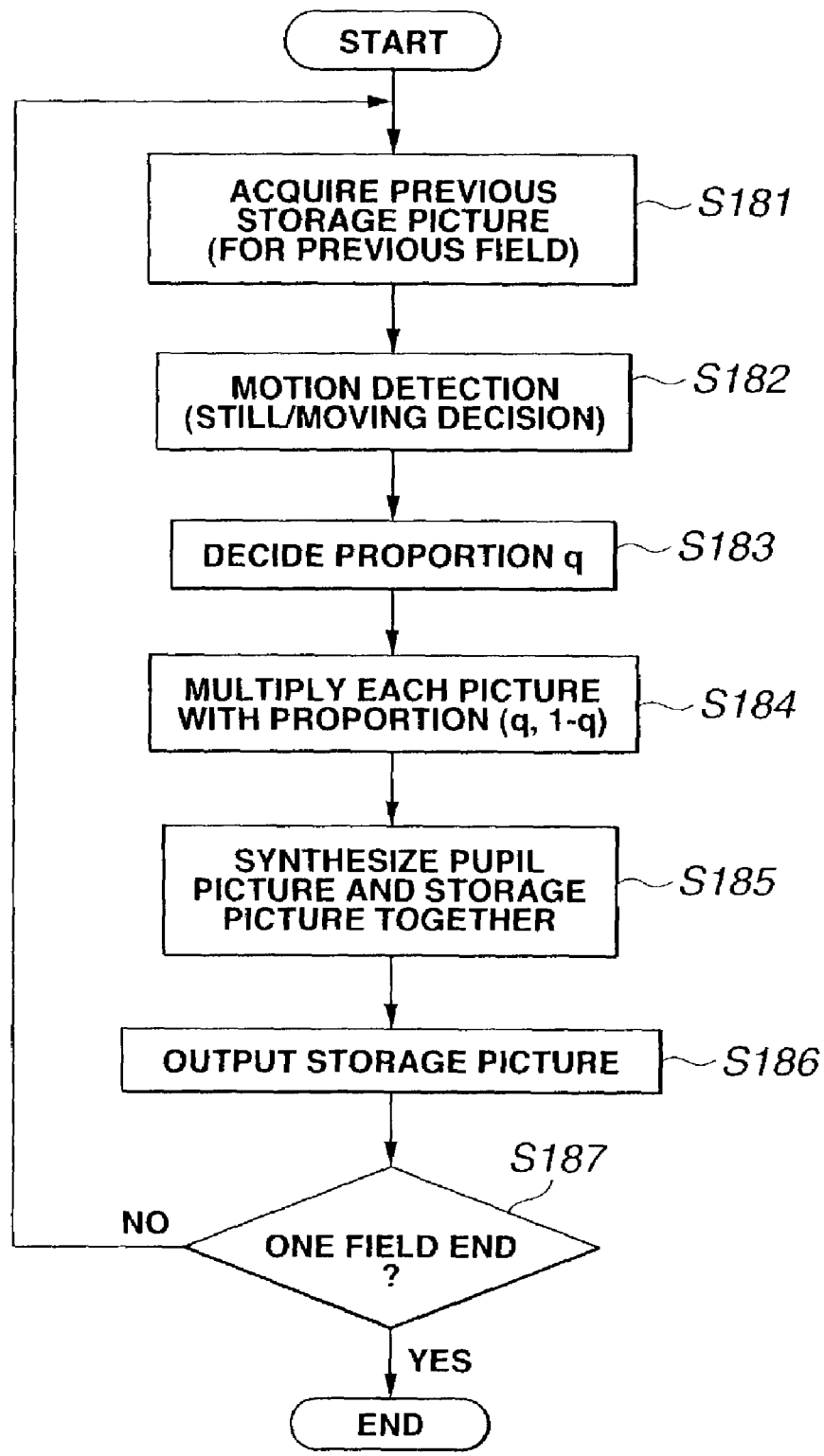
FIG. 41 is a flowchart showing the procedure of generating a stored picture in case the structure of FIG. 15 is used as the pupil picture generating unit in the picture processing apparatus of FIG. 30.

If the configuration of FIG. 15 is used as the pupil picture generating unit 302, the processing of generating the storage picture at the above step S123 is carried out in accordance with the procedure of the flowchart shown in FIG. 41.

Specifically, the present storage picture generating unit 302 at step S181 acquires the storage picture of the directly previous field from the storage picture memory 303.

At the next step S182, the motion detection unit 141 takes the difference between the registering pixels to make still/moving decision.

At the next step S183, the weighting value q is determined on the basis of the difference between the registering pixels, based on the difference value of the registering pixels as calculated at step S182.

At the next step S184, the storage picture of the directly previous field is multiplied with the weighting value q, while the pupil picture is multiplied with the weighting value 1−q.

At the next step S185, the storage picture of the directly previous field and the pupil data, multiplied at step S184 with the weighting values q and 1−q, respectively, are summed and synthesized together to form a new storage picture.

At the next step S186, a new storage picture, synthesized at the above step S185, is output.

At the next step S187, it is verified whether or not the totality of the picture data for one field has been processed. Should there be any picture data left for processing, the program reverts to step S181 to repeat the processing as from step S181 to S187 to process the totality of the picture data to terminate the processing.

Figure 42:
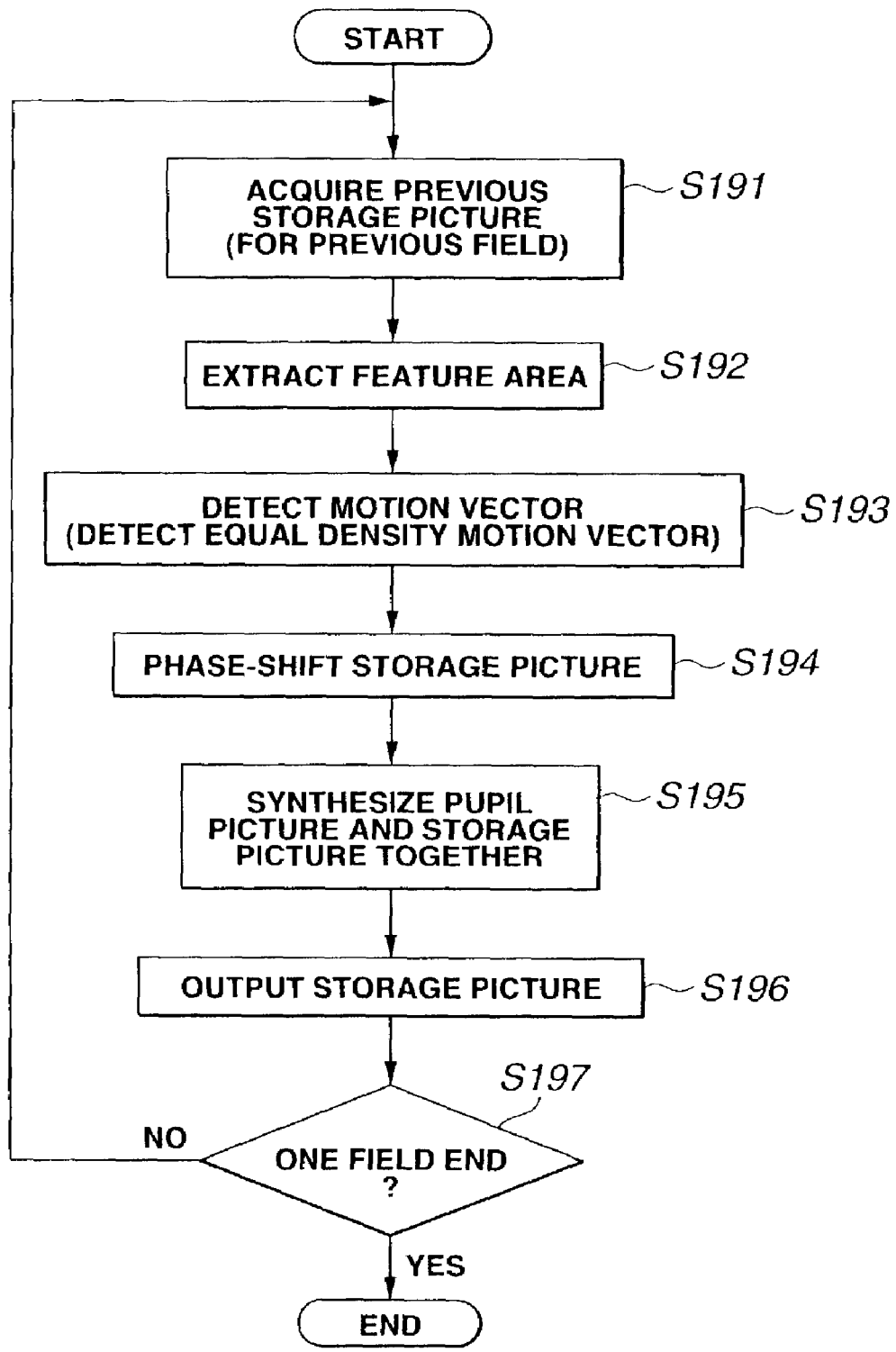
FIG. 42 is a flowchart showing the procedure of generating a stored picture in case the structure of FIG. 16 is used as the pupil picture generating unit in the picture processing apparatus of FIG. 30.

If the configuration of FIG. 16 is used as the pupil picture generating unit 302, the processing of generating the storage picture at the above step S123 is carried out in accordance with the procedure of the flowchart shown in FIG. 42.

That is, the storage picture generating unit 302 at step S191 acquires the storage picture of the previous field from the storage picture memory 303.

At the next step S193, a feature area is detected by an detection circuit 154 from the storage picture supplied from the storage memory 153.

At the next step S193, the equal density motion vector is detected based on the feature area detected at step S192. That is, the motion vector detection circuit 155 detects the motion vector between the feature area from the detection circuit 154 and the feature area in the pupil picture.

At the next step S194, the storage picture from the storage memory 153 is phase-shifted, based on the motion vector detected at step S193, by the phase shifting circuit 156, to effect position matching with the pupil picture.

At the next step S195, the storage picture and the pupil picture, position-matched at step S194, are summed and synthesized together to form a new storage picture.

At the next step S196, the new storage picture, synthesized at the above step S195, is output.

At the next step S197, it is verified whether or not the totality of the picture data for one field has been processed. Should there be any picture data left for processing, the program reverts to step S191 to repeat the processing as from step S191 to S197 to process the totality of the picture data to terminate the processing.

Figure 43:
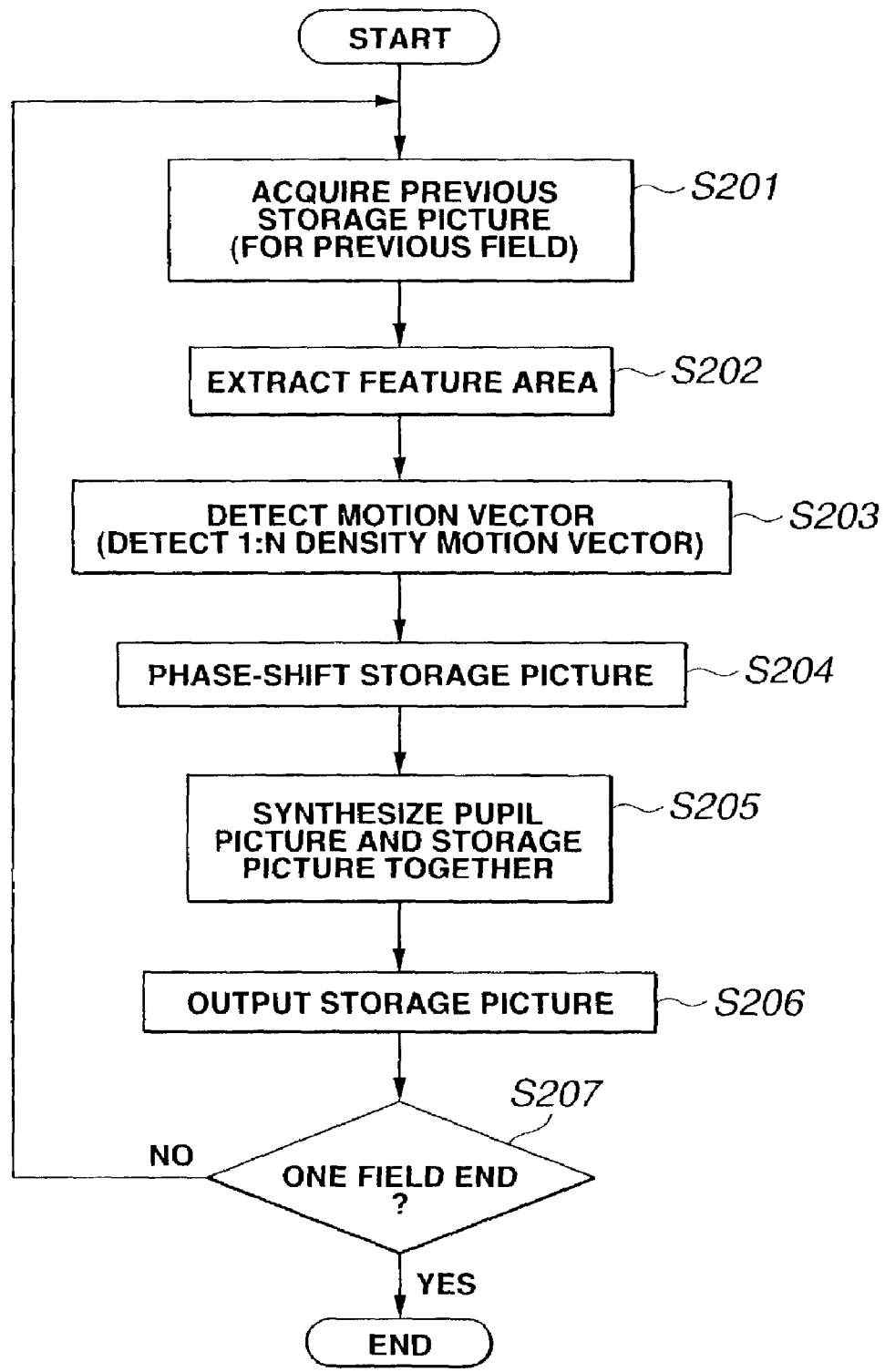
FIG. 43 is a flowchart for illustrating the procedure of generating a stored picture, executed in case the stored picture is higher in resolution than the pupil picture generated in the stored picture generating unit in the picture processing apparatus of FIG. 30.

If, in the processing of generating the storage picture at step S123, the storage picture is higher in resolution than the pupil picture to be generated, the storage picture is generated in accordance with the procedure of the flowchart shown in FIG. 43.

Specifically, the present storage picture generating unit 302 at step S201 acquires the storage picture of the directly previous field from the storage picture memory 303.

At the next step S202, the storage picture generating unit 302 detects the feature area, by the detection circuit 154, from the storage picture of the N-fold density, supplied from the storage memory 153.

At the next step S203, the 1:N density motion vector is detected of the pupil picture based on the feature area detected at step S192.

At the next step S194, the storage picture from the storage memory 153 is phase-shifted by the phase-shifting circuit 156, based on the motion vector detected at step S193, to effect position matching with respect to the pupil picture.

At the next step S195, the storage picture and the pupil picture, position-matched at step S194, are summed and synthesized together to form a new storage picture.

At the next step S196, the new storage picture, synthesized at the above step S195, is output.

At the next step S197, it is verified whether or not the totality of the picture data for one field has been processed. Should there be any picture data left for processing, the program reverts to step S191 to repeat the processing as from step S191 to S197 to process the totality of the picture data to terminate the processing.

The processing for detecting the motion vector in case of generating a picture (storage picture) higher in picture quality than the input picture (pupil picture) is explained.

An instance of such processing is shown in FIG. 44A, illustrating detection of a motion vector between a sole picture (base picture) Ps and a picture Ph having four-fold density in the perpendicular direction with respect to this picture Ps. In FIG. 44A, broken lines indicate the line positions, which in reality are lines devoid of pixels. The picture of four-fold density Ph may be handled as four uni-fold density pictures Ph1, Ph2, Ph3 and Ph4, of which the picture Ph1 is a picture spatially coincident with the base picture Ps and having line positions coincident with those of the base picture Ps, with the remaining three uni-fold density pictures having the respective line positions sequentially shifted each by one line.

That is, in FIG. 44A, the picture Ph1 is obtained on selecting the uppermost one of four consecutive lines of a set on the high density picture Ph. The picture Ph2 is obtained on selecting the second uppermost one of the four consecutive lines of the set on the high density picture Ph, while the picture Ph3 is obtained on selecting the second lowermost one of the four consecutive lines of the set. The picture Ph4 is obtained on selecting the lowermost one of the four consecutive lines of the set. A four-fold density picture is formed by combining these four pictures Ph1 to Ph4 together.

First, a base block Bs and a reference block Bh1 of the same size and of the same shape as the base block, each being indicated as a 5×5 block in FIG. 44B, are set at spatially registering positions with respect to the picture Ps and one of the four pictures Ph to Ph4, for example, Ph1, respectively, as shown in FIG. 44B. Then, absolute values of the differences of the values of pixels lying at the same positions as those of the base block Bs are found, as shown in FIG. 45. These absolute values are summed over the entire block to find the sum of the absolute values. The reference block Bh1 then is moved to different positions, in terms of a pixel of the uni-fold density picture as a unit, to find the sum of the absolute values at each of the as-moved positions. The sums of the absolute values, thus found, are stored in a table of the sums of the absolute values.

The range of movement is defined as a search range. For example, the sums of the absolute values are calculated for five reference blocks, shifted one pixel in the horizontal direction, and three reference blocks, shifted one pixel in the vertical direction, totaling at 5×3 reference blocks. In this case, a table of 5×3 sums of the absolute values is obtained. The center position of the 5×3 range is the point of origin 0. The point of origin 0 coincides with the spatial center of the base block Bs and that of the reference block Bh1. If, in the ultimate table of the sums of the absolute values T0, as now explained, the position of the reference block which gives the smallest value is at the point of origin, the motion vector is 0.

Next, a reference block Bh2, similar in shape and size to the reference block Bh1, is set at the same spatially position of the decimated picture Ph2 as the reference block Bh1. As in the case of the reference block Bh1, the sums of the absolute values of the differences between the base block Bs and the reference block Bh2 are found to produce a table of the sums of the absolute values T2. This table T2 is spatially below the table T1 by one line of the four-fold density picture. For the reference blocks Bh3, Bh4, block matching is effected with the base block Bs, as in the reference blocks Bh1, Bh2, to obtain tables of the sums of the absolute values T3 and T4. The table T3 is spatially below the table T2 by one line of the four-fold density picture, while the table T4 is spatially below the table T3 by one line of the four-fold density picture.

The four tables are synthesized in a reverse order to that in producing four uni-fold density pictures from the four-fold density picture to produce the ultimate table of the sums of the absolute values T0. This table shows the distribution of the sums of the absolute values of the 5×3×4 blocks. The smallest sum value is detected in the table T0. The vector from the point of origin 0 to the position of the reference block which gives the smallest sum value is detected as being the motion vector. This achieves detection of the motion vector with a precision of the four-fold density picture.

Although the above-described embodiment is configured for detecting the motion vector between the base picture and a picture having the four-fold density in the perpendicular direction, it is also possible to detect the motion vector between an N-fold density picture and the base picture, where N is preferably an integer exceeding 2, in the horizontal direction or in both the horizontal and vertical directions, in place of in the vertical direction.

Figure 47:
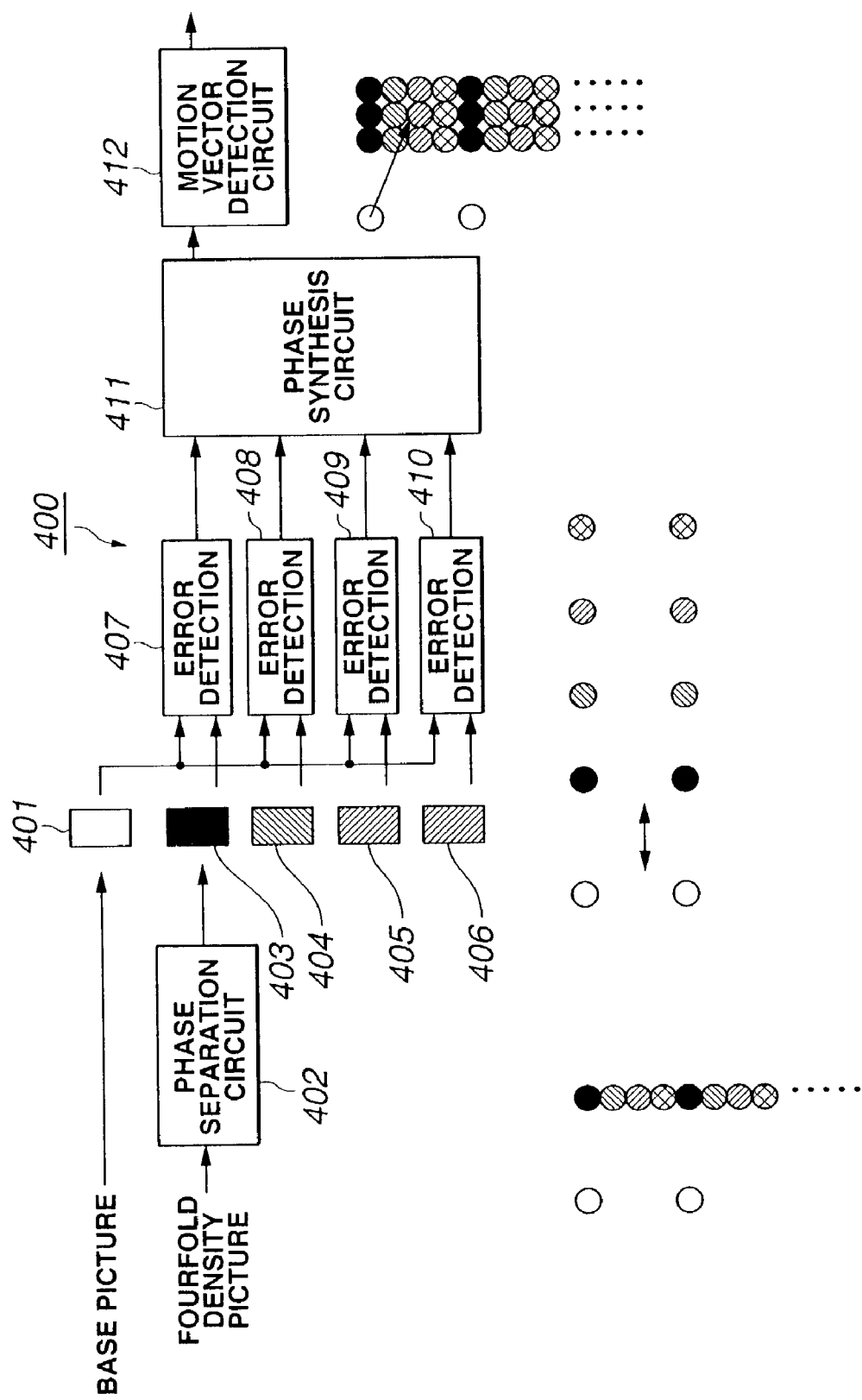
FIG. 47 is a block diagram showing the structure of a motion vector detection device used for detecting the motion vector between the base picture and a picture having four-fold density in the perpendicular direction.

FIG. 47 shows the configuration of a motion vector detection device 400 for detecting the motion vector between the base picture and the four-fold density picture in the perpendicular direction. This motion vector detection device 400 includes a block forming circuit 401 for splitting the base picture (picture Ps in FIG. 44A) into blocks and a phase separation circuit 402 for separating the four-fold density picture into N, for example, four, pictures (pictures Ph1 to Ph4 in FIG. 44A) having the same density as that of the base picture and also having the same spatial relationship as the base picture. The phase separation circuit 402 is fed with the base picture Ps and outputs data of the first line, through data of the second and third lines to data of the fourth line of each of sets of four lines, these data being thus separated on the line basis from one another.

The output of the picture Ph1 of the phase separation circuit 402 is sent to a block forming circuit 403 where it is broken down into blocks. Similarly, the outputs of the pictures Ph2, Ph3 and Ph4 of the phase separation circuit 402 are sent to block forming circuits 404 to 406, respectively, where the outputs of the respective pictures are broken down into blocks. The block forming circuits 403 to 406 separate the pictures Ph1 to Ph4 each into blocks of the same size and shape as the block formed by the block forming circuit 401, such as block of 5×5 pixels.

An output of the block forming circuit 401 is sent to error detection circuits 407 to 410. An output of the error detection circuit 407 has its other input fed with an output of the block forming circuit 403. The error detection circuit 407 summarized the sums of the absolute values of the differences of the values of pixels at the registering positions of the block Bs of the base picture and the block of the picture Ph1 from the block forming circuit 403. A table T1 for storing the sums of the absolute values is formed from one position of the reference block to another.

The other input of the error detection circuit 408 is fed with an output of the block forming circuit 404. The error detection circuit 408 summarizes the sums of the absolute values of the differences of the pixel values of the pixels at the registering positions of the block of the base picture and the block of the picture Ph2 from the block forming circuit 404. The error detection circuit 408 forms a table for holding the sums of the absolute values T2 from one position of the reference block to another. Similarly, the error detection circuit 409 forms a table T3 of the sums of the absolute values of the differences between the block of the base picture and the block of the picture Ph3, while the error detection circuit 410 forms a table T4 of the sums of the absolute values of the differences between the block of the base picture and the block of the picture Ph4.

The tables T1 to T4, formed by the error detection circuits 407 to 410, are sent to a phase synthesis circuit 411. The phase synthesis circuit 411 summarizes the sums of the absolute values in a reverse sequence to that used in the phase separation in the phase separation circuit 402 to form the absolute table T0. A motion vector detection circuit 412 detects the motion vector as it references thee table T0 formed by phase synthesis circuit 411. That is, the motion vector detection circuit 412 detects the least sum value among the sums of the absolute values to output a motion vector. In a lower part of the block diagram of FIG. 47, there is schematically shown the spatial relationship between pixels and sums of absolute valuers of the differences of the two pictures in the processing by the phase separation circuit 402, error detection circuits 407 to 410 and in the motion vector detection circuit 412.

In the learning processing by the present picture processing apparatus 300, as described above, not only the teacher picture and the pupil picture but also the storage picture are referenced to calculate the prediction coefficients. In calculating the prediction coefficients, the movement of the subject pixel is also used as one of the feature values to effect classification of the subject pixel. As a result, if a subject pixel is verified to be still, that is if a given picture is classified into a class of a still picture, the picture information of the storage picture, in which the noise of the still picture portion is reduced more effectively, is learned to a larger extent, whereas, if a given picture is classified into a class of a moving picture, the picture information of the storage picture, in which the noise of the moving picture portion is reduced more effectively, is learned to a larger extent.

With the above-described picture processing apparatus 100 or 190, executing the processing of picture generation using the prediction coefficients calculated in the learning processing by this picture processing apparatus 300, it becomes possible to reduce the noise contained in the input picture or to correct the edge of the feature area.

In the above-described embodiment, the prediction coefficients calculated by the learning processing by the picture processing apparatus 300 are stored in the ROM tables 108, 196 of the picture processing apparatus 100, 190 taking charge of the processing for picture generation. It is, however, also possible to generate data indicating pixel values, other coefficients or preset equations, needed to generate an output picture, and to have the so generated data stored in the ROM tables 108, 196.

In the above-described embodiment, a picture reduced in noise or a picture the edge of the feature area of which is not blurred is produced. The present invention may, however, be also applied to the case of generating a picture higher in picture quality than the input picture as to gradation, pixels or number of bits of data.

In the foregoing, the input picture is a progressive picture. The present invention may, however, be also applied to such a case in which the input picture is an interlaced picture.

The above-described sequence of operations by the picture processing apparatus 100, 190, 300 may be carried out on the hardware, however, it may also be carried out by the software. In the latter case, the above-described picture processing apparatus 100 may be functionally implemented by having the program forming the software installed and executed on a computer.

Figure 48:
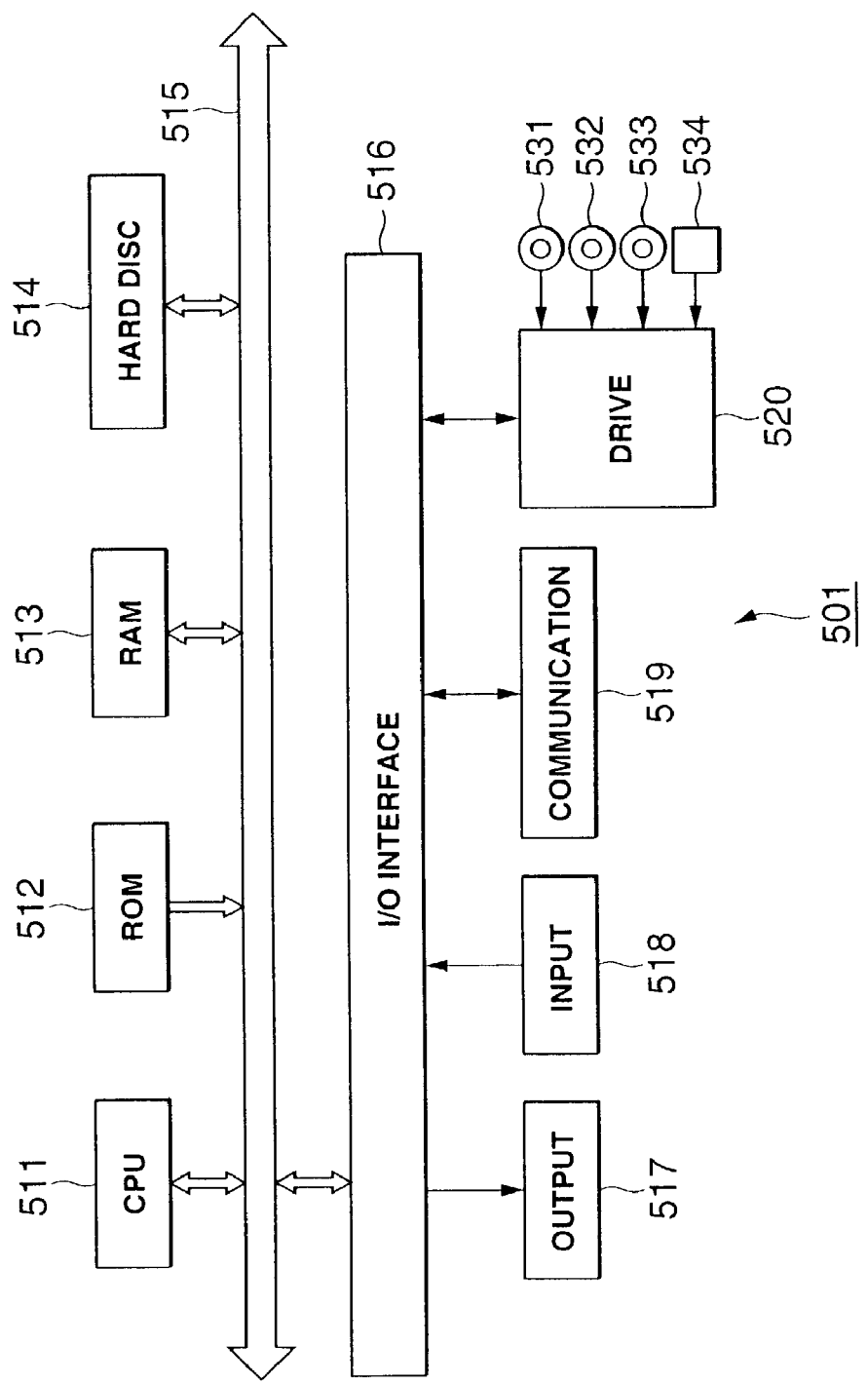
FIG. 48 is a block diagram showing an illustrative structure of a computer operating as the aforementioned picture processing apparatus.

FIG. 48 is a block diagram showing the configuration of an embodiment of a computer 501 operating as the above-described picture processing apparatus 100, 190 or 300. To a CPU (central processing unit) 511 is connected an input/output interface 516 over a bus 515. If a user's command is input from an input unit 518, such as a keyboard or a mouse, over an input/output interface 516, the program stored in a ROM (read-only memory) 512, or a recording medium, such as a hard disc 514, a magnetic disc 531, an optical disc 532, a magneto-optical disc 533, or a semiconductor memory 534, loaded on a drive 520, is loaded and run on a RAM (random access memory) 513. This permits the above-described various processing operations to be carried out. The CPU 511 also outputs the results of the processing on a display unit 517, formed e.g., by an LCD (liquid crystal display) through an input/output interface 516 as necessary. The program may also be stored on the hard disc 514 or on the ROM 512 of the computer 501 at the outset and furnished in this state to the user. Alternatively, the program may be furnished as a packaged medium, such as magnetic disc 531, optical disc 532, magneto-optical disc 533 or semiconductor memory 534. Still alternatively, the program may also be furnished to the hard disc 514 over a satellite or network through a communication unit 519.

In the present specification, the steps stating the program furnished by the recording medium include not only the processing carried out chronologically in the sequence stated therein, but also such processing which is carried out in parallel or batch-wise, without necessarily being carried out chronologically.

In the above-described picture processing method and apparatus, and the program for a recording medium, according to the present invention, a first picture is acquired, the so-acquired first picture is stored, and a new acquired first picture is stored at a position registering with the so stored first picture. Based on the position of a subject pixel of a second picture, the first pixel information is extracted from both the storage picture and the first picture acquired, and a preset feature value is detected from the first pixel information. Based on this feature value, the subject pixel is classified to one of plural classes by way of classification. Based on the position of the subject pixel, the second pixel information is extracted from both the storage picture and the acquired first picture and, using this second pixel information, the subject pixel is generated in accordance with a forming system preset in association with the class obtained in the classification. So, the second picture higher in picture quality than the first picture may be generated satisfactorily.

Moreover, in the picture processing method and apparatus, and the program for a recording medium, according to the present invention, a new pupil picture generated is stored at a position registering with a stored pupil picture to store a storage picture of the pupil picture. Based on the position of a subject pixel of a teacher picture equivalent to the second picture, the first pixel information is extracted from both the storage picture and the generated pupil picture. From the first pixel information, the preset feature value is detected and, based on the so detected feature value, the subject pixel is classified to one of the plural classes, by way of classification. Based on the position of the subject pixel, the second pixel information is extracted from both the storage picture and the generated first picture and preset data is found from class to class by using the second pixel information and the teacher picture. In this manner, the second picture may be generated which is higher in picture quality than the first picture.

What is claimed is:

1. A picture processing apparatus for generating a second picture from a first picture, said second picture being of higher picture quality than said first picture, comprising:
    acquisition means for acquiring said first picture;
    storage means for storing said first picture, acquired by said acquisition means;
    storage processing means for storing a new first picture acquired by said acquisition means at a position registering with said first picture stored in said storage means to permit a storage picture of said first picture to be stored in said storage means;
    first extraction means for extracting the first pixel information from both said storage picture and said first picture, acquired by said acquisition means, based on the position of a subject pixel of said second picture;
    feature value detection means for detecting a preset feature value from said first pixel information;
    classification means for classifying said subject pixel to one of a plurality of classes based on said feature value;
    second extraction means for extracting the second pixel information from both said storage picture and said first picture, acquired by said acquisition means, based on the position of said subject pixel; and
    generating means for generating said subject pixel by using said second pixel information in accordance with a generating system preset corresponding to the classes classified by said classification means.

2. The picture processing apparatus according to claim 1 wherein said storage processing means weight-sums said first picture and said storage picture in accordance with a preset weighting value to cause a resulting picture to be stored in said storage means.

3. The picture processing apparatus according to claim 2 wherein said storage processing means detects the motion of said first picture and sets said weighting value based on the detected motion.

4. The picture processing apparatus according to claim 2 wherein said storage picture is a picture higher in SN ratio in a still picture portion than said first picture.

5. The picture processing apparatus according to claim 1 wherein said storage processing means detects the motion of a feature area included in said first picture and causes said first picture to be moved to and stored at a position corresponding to said detected motion to cause the resulting storage picture to be stored in said storage means.

6. The picture processing apparatus according to claim 5 wherein the pixel density of said storage picture is higher than that of said first picture.

7. The picture processing apparatus according to claim 5 wherein the pixel density of said storage picture is equal to that of said first picture.

8. The picture processing apparatus according to claim 5 wherein the number of said pixels of said storage picture is larger than that of said first picture.

9. The picture processing apparatus according to claim 1 wherein said first extraction means extracts class taps from said first picture as said first pixel information and wherein said feature value detection means detects the distribution of pixel values of pixels forming said class tap as said feature value.

10. The picture processing apparatus according to claim 1 wherein said first extraction means extracts one or a plurality of pixels from each of said first picture and said storage picture from each of said first picture and said storage picture; said feature value detection means making still/moving decision of said subject pixel by using the pixel values of said one or a plurality of pixels; said feature value detection means detecting the results of decision as said feature value.

11. The picture processing apparatus according to claim 10 wherein said feature value detection means calculates the difference in luminance values of said first picture and said storage picture by using the pixel values of said one or a plurality of pixels; said feature value detection means detecting the calculated results as said feature value.

12. The picture processing apparatus according to claim 1 wherein said first extraction means extracts a first class tap from said first picture as said first pixel information and also extracts a second class tap from said storage picture; said feature value detection means making still/moving decision of said subject pixel by using said first and second class taps; said feature value detection means detecting the results of decision and the distribution of pixel values of pixels making up said first class tap as said feature values.

13. The picture processing apparatus according to claim 1 wherein said second extraction means extracts prediction taps as said second pixel information; said generating means including coefficient storage means having stored therein coefficients preset from class to class; said generating means executing calculations using said coefficients and said prediction taps to generate said second picture.

14. A picture processing method for generating a second picture from a first picture, said second picture being of higher picture quality than said first picture, comprising:
    an acquisition step of acquiring said first picture;
    a storage step of storing said first picture, acquired by said acquisition step;
    a storage processing step of storing a new first picture acquired by said acquisition step at a position registering with said first picture stored at said storage step to permit a storage picture of said first picture to be stored at said storage step;
    a first extraction step of extracting the first pixel information from both said storage picture and said first picture, acquired by said acquisition step, based on the position of a subject pixel of said second picture;

a feature value detection step of detecting a preset feature value from said first pixel information;

a classification step of classifying said subject pixel to one of a plurality of classes based on said feature value;

a second extraction step of extracting the second pixel information from both said storage picture and said first picture, acquired by said acquisition step, based on the position of said subject pixel; and a generating step of generating said subject pixel by said second pixel information in accordance with a generating system preset corresponding to the classes classified by said classification step.

15. The picture processing method according to claim 14 wherein said storage processing step weight-sums said first picture and said storage picture in accordance with a preset weighting value to cause a resulting picture to be stored at said storage step.

16. The picture processing method according to claim 15 wherein said storage processing step detects the motion of said first picture and sets said weighting value based on the detected motion.

17. The picture processing method according to claim 15 wherein said storage picture is a picture higher in SN ratio in a still picture portion than said first picture.

18. The picture processing method according to claim 14 wherein said storage processing step detects the motion of a feature area included in said first picture and causes said first picture to be moved to and stored at a position corresponding to said detected motion to cause the resulting storage picture to be stored at said storage step.

19. The picture processing method according to claim 18 wherein the pixel density of said storage picture is higher than that of said first picture.

20. The picture processing method according to claim 18 wherein the pixel density of said storage picture is equal to that of said first picture.

21. The picture processing method according to claim 18 wherein the number of said pixels of said storage picture is larger than that of said first picture.

22. The picture processing method according to claim 14 wherein said first extraction step extracts class taps from said first picture as said first pixel information and wherein said feature value detection step detects the distribution of pixel values of pixels forming said class tap as said feature value.

23. The picture processing method according to claim 14 wherein said first extraction step extracts one or a plurality of pixels from each of said first picture and said storage picture as said first pixel information; said feature value detection step making still/moving decision of said subject pixel by using the pixel values of said one or a plurality of pixels; said feature value detection step detecting the results of decision as said feature value.

24. The picture processing method according to claim 23 wherein said feature value detection step calculates the difference in luminance values of said first picture and said storage picture, by using the pixel values of said one or a plurality of pixels; said feature value detection step detecting the calculated results as said feature value.

25. The picture processing method according to claim 14 wherein said first extraction step extracts a first class tap from said first picture as said first pixel information and also extracts a second class tap from said storage picture; said feature value detection step making still/moving decision of said subject pixel by using said first and second class taps; said feature value detection step detecting the results of decision and the distribution of pixel values of pixels making up said first class tap as said feature values.

26. The picture processing method according to claim 14 wherein said second extraction step extracts prediction taps as said second pixel information; said generating step executing calculations using said coefficients preset from class to class and said prediction taps to generate said second picture.

27. A recording medium having recorded thereon a computer-readable program adapted for generating a second picture from a first picture, said second picture being of higher picture quality than said first picture, said program comprising:

an acquisition step of acquiring said first picture;

a storage step of storing said first picture, acquired by said acquisition step;

a storage processing step of storing a new first picture acquired by said acquisition step at a position registering with said first picture stored at said storage step to permit a storage picture of said first picture to be stored at said storage step;

a first extraction step of extracting the first pixel information from both said storage picture and said first picture, acquired by said acquisition step, based on the position of a subject pixel of said second picture;

a feature value detection step of detecting a preset feature value from said first pixel information;

a classification step of classifying said subject pixel to one of a plurality of classes based on said feature value;

a second extraction step of extracting the second pixel information from both said storage picture and said first picture, acquired by said acquisition step, based on the position of said subject pixel; and a generating step of generating said subject pixel by said second pixel information in accordance with a generating system preset corresponding to the classes classified at the classification step.

28. The recording medium having a computer-readable program recorded thereon according to claim 27 wherein said storage processing step weight-sums said first picture and said storage picture in accordance with a preset weighting value to cause a resulting picture to be stored at said storage step.

29. The recording medium having a computer-readable program recorded thereon according to claim 28 wherein said storage processing step detects the motion of said first picture and sets said weighting value based on the detected motion.

30. The recording medium having a computer-readable program recorded thereon according to claim 28 wherein said storage picture is a picture higher in SN ratio in a still picture portion than said first picture.

31. The recording medium having a computer-readable program recorded thereon according to claim 27 wherein said storage processing step detects the motion of a feature area included in said first picture and causes said first picture to be moved to and stored at a position corresponding to said detected motion to cause the resulting storage picture to be stored at said storage step.

32. The recording medium having a computer-readable program recorded thereon according to claim 28 wherein the pixel density of said storage picture is higher than that of said first picture.

33. The recording medium having a computer-readable program recorded thereon according to claim 28 wherein the pixel density of said storage picture is equal to that of said first picture.

34. The recording medium having a computer-readable program recorded thereon according to claim 28 wherein the number of pixels of said storage picture is larger than that of said first picture.

35. The recording medium having a computer-readable program recorded thereon according to claim 27 wherein said first extraction step extracts class taps from said first picture as said first pixel information and wherein said feature value detection step detects the distribution of pixel values of pixels forming said class tap as said feature value.

36. The recording medium having a computer-readable program recorded thereon according to claim 27 wherein said first extraction step extracts one or a plurality of pixels from each of said first picture and said storage picture as said first pixel information; said feature value detection step making still/moving decision of said subject pixel by using the pixel values of said one or a plurality of pixels; said feature value detection step detecting the results of decision as said feature value.

37. The recording medium having a computer-readable program recorded thereon according to claim 36 wherein said feature value detection step calculates the difference in luminance values of said first picture and said storage picture by using the pixel values of said one or a plurality of pixels; said feature value detection step detecting the calculated results as said feature value.

38. The recording medium having a computer-readable program recorded thereon according to claim 27 wherein said first extraction step extracts a first class tap from said first picture as said first pixel information and also extracts a second class tap from said storage picture; said feature value detection step making still/moving decision of said subject pixel by using said first and second class taps; said feature value detection step detecting the results of decision and the distribution of pixel values of pixels making up said first class tap as said feature values.

39. The recording medium having a computer-readable program recorded thereon according to claim 27 wherein said second extraction step extracts prediction taps as said second pixel information; said generating step executing calculations using said coefficients preset from class to class and said prediction taps to generate said second picture.

40. A picture processing apparatus for learning preset data used in generating a second picture from a first picture, said second picture being higher in picture quality than said first picture; comprising:
generating means for generating a pupil picture equivalent to said first picture;
storage means for storing said pupil picture;
storage processing means for causing a new pupil picture, generated by said generating means, to be stored at a position registering with said pupil picture stored in said storage means for causing a storage picture of said pupil picture to be stored in said storage means;
first extraction means for extracting said first picture information from both said storage picture and said pupil picture generated by said generating means, based on the position of said subject pixel of teacher data equivalent to said second picture;
feature value detection means for detecting a preset feature value from said first pixel information;
classification means for classifying said subject pixel to one of a plurality of classes;
second extraction means for extracting the second pixel information from both said storage picture and the first picture generated by said generating means, based on the position of said subject pixel; and
calculation means for finding said preset data from one class of classifying by said classification means to another, by using said second pixel information and said teacher data.

41. The picture processing apparatus according to claim 40 wherein said storage processing means weight-adds said pupil picture and said storage picture in accordance with a preset weighting value and causes the resulting picture to be stored in said storage means.

42. The picture processing apparatus according to claim 41 wherein said storage means sets said weighting value based on the values of said pupil picture and the storage picture or the difference values thereof.

43. The picture processing apparatus according to claim 41 wherein said storage processing means detects the motion of said pupil picture and sets said weighting value based on the detected motion.

44. The picture processing apparatus according to claim 41 wherein said storage picture is a picture higher in the SN ratio in a still picture portion thereof.

45. The picture processing apparatus according to claim 42 wherein said storage processing means detects the motion of a feature area contained in said pupil area and causes said pupil picture to be moved to and stored at a position corresponding to the detected motion to cause the resulting storage picture to be stored in said storage means.

46. The picture processing apparatus according to claim 45 wherein the pixel density of said storage picture is higher than that of said pupil picture.

47. The picture processing apparatus according to claim 45 wherein the pixel density of said storage picture is equal to that of said pupil picture.

48. The picture processing apparatus according to claim 40 wherein said first extraction means extracts a class tap from said pupil picture as said first pixel information and wherein said feature value detection means detects the distribution of pixel values of pixels making up said class tap as said feature value.

49. The picture processing apparatus according to claim 40 wherein said first extraction means extracts one or a plurality of pixels from each of said pupil picture and the storage picture as said first pixel information and wherein said feature value detection means uses the pixel values of said one or plural pixels to make still/moving decision of said subject pixel, while detecting the results of decision as said feature value.

50. The picture processing apparatus according to claim 49 wherein said first feature value detection means detects the differences of luminance values of said first picture and said storage picture by using the pixel value of said one or plural pixels and detects the calculated results as said feature value.

51. The picture processing apparatus according to claim 40 wherein said first extraction means extracts a first class tap from said pupil picture as said first pixel information, while extracting a second class tap from said storage picture; and wherein said feature value detection means makes still/moving decision of said subject pixel by using said first and second class taps and detects the results of decision and the distribution of pixel values of pixels making up said first class tap as said feature value.

52. The picture processing apparatus according to claim 40 wherein said second extraction means extracts prediction taps as said second pixel information.

53. A picture processing method by a picture processing apparatus for learning preset data used in generating a second picture from a first picture, said second picture being higher in picture quality than said first picture; comprising:

a generating step of generating a pupil picture equivalent to said first picture;

a storage step of storing said pupil picture;

a storage processing step of causing a new pupil picture, generated by processing at said generating step, to be stored at a position registering with said pupil picture stored in said storage step for causing a storage picture of said pupil picture to be stored in said storage step;

a first extraction step of extracting said first picture information from both said storage picture and said pupil picture generated by said generating step, based on the position of said subject pixel of teacher data equivalent to said second picture;

a feature value detection step of detecting a preset feature value from said first pixel information;

a classification step of classifying said subject pixel to one of a plurality of classes, by way of classification, based on said feature value;

a second extraction step of extracting the second pixel information from both said storage picture and the first picture generated by processing at said generating step, based on the position of said subject pixel; and a calculation step of finding said preset data from one class of classifying by said classification step to another, by using said second pixel information and said teacher data.

54. The picture processing method according to claim 53 wherein said storage processing means weight-adds said pupil picture and said storage picture in accordance with a preset weighting value and causes the resulting picture to be stored in said storage step.

55. The picture processing method according to claim 54 wherein said storage means sets said weighting value based on the values of said pupil picture and the storage picture or the difference values thereof.

56. The picture processing method according to claim 54 wherein said storage processing means detects the motion of said pupil picture and sets said weighting value based on the detected motion.

57. The picture processing method according to claim 54 wherein said storage picture is a picture higher in the SN ratio in a still picture portion thereof than said pupil picture.

58. The picture processing method according to claim 55 wherein said storage processing means detects the motion of a feature area contained in said pupil area and causes said pupil picture to be moved to and stored at a position corresponding to the detected motion to cause the resulting storage picture to be stored in said storage step.

59. The picture processing method according to claim 58 wherein the pixel density of said storage picture is higher than that of said pupil picture.

60. The picture processing method according to claim 58 wherein the pixel density of said storage picture is equal to that of said pupil picture.

61. The picture processing method according to claim 53 wherein said first extraction means extracts a class tap from said pupil picture as said first pixel information and wherein said feature value detection means detects the distribution of pixel values of pixels making up said class tap as said feature value.

62. The picture processing method according to claim 53 wherein said first extraction means extracts one or a plurality of pixels from each of said pupil picture and the storage picture as said first pixel information and wherein said feature value detection means uses the pixel values of said one or plural pixels to make still/moving decision of said subject pixel, while detecting the results of decision as said feature value.

63. The picture processing method according to claim 62 wherein said first feature value detection means detects the differences of luminance values of said first picture and said storage picture by using the pixel value of said one or plural pixels and detects the calculated results as said feature value.

64. The picture processing method according to claim 53 wherein said first extraction means extracts a first class tap from said pupil picture as said first pixel information, while extracting a second class tap from said storage picture; and wherein said feature value detection means makes still/moving decision of said subject pixel by using said first and second class taps and detects the results of decision and the distribution of pixel values of pixels making up said first class tap as said feature value.

65. The picture processing method according to claim 53 wherein said second extraction means extracts prediction taps as said second pixel information.

66. A recording medium having recorded thereon a computer-readable program for a picture processing apparatus adapted for learning preset data usable for generating a second picture from a first picture, said second picture being of higher picture quality than said first picture, said program comprising:

a generating step of generating a pupil picture equivalent to said first picture;

a storage step of storing said pupil picture;

a storage processing step of causing a new pupil picture, generated by processing at said generating step, to be stored at a position registering with said pupil picture stored in said storage step of causing a storage picture of said pupil picture to be stored in said storage step;

a first extraction step of extracting said first picture information from both said storage picture and said pupil picture generated by said generating step, based on the position of a subject pixel of teacher data equivalent to said second picture;

a feature value detection step of detecting a preset feature value from said first pixel information;

a classification step of classifying said subject pixel to one of a plurality of classes;

a second extraction step of extracting the second pixel information from both said storage picture and the first picture generated by processing at said generating step, based on the position of said subject pixel; and a calculation step of finding said preset data from one class of classifying by said classification step to another, by using said second pixel information and said teacher data.

67. The recording medium having recorded thereon a computer-readable program according to claim 66 wherein said storage processing step weight-adds said pupil picture and said storage picture in accordance with a preset weighting value and causes the resulting picture to be stored at said storage step.

68. The recording medium having recorded thereon a computer-readable program according to claim 67 wherein said storage step sets said weighting value based on the values of said pupil picture and the storage picture or the difference values thereof.

69. The recording medium having recorded thereon a computer-readable program according to claim 67 wherein said storage processing step detects the motion of said pupil picture and sets said weighting value based on the detected motion.

70. The recording medium having recorded thereon a computer-readable program according to claim 67 wherein said storage picture is a picture higher in the SN ratio in a still picture portion thereof than said pupil picture.

71. The recording medium having recorded thereon a computer-readable program according to claim 68 wherein said storage processing step detects the motion of a feature area contained in said pupil area and causes said pupil picture to be moved to and stored at a position corresponding to the detected motion to cause the resulting storage picture to be stored at said storage step.

72. The recording medium having recorded thereon a computer-readable program according to claim 71 wherein the pixel density of said storage picture is higher than that of said pupil picture.

73. The recording medium having recorded thereon a computer-readable program according to claim 71 wherein the pixel density of said storage picture is equal to that of said pupil picture.

74. The recording medium having recorded thereon a computer-readable program according to claim 66 wherein said first extraction step extracts a class tap from said pupil picture as said first pixel information and wherein said feature value detection step detects the distribution of pixel values of pixels making up said class tap as said feature value.

75. The recording medium having recorded thereon a computer-readable program according to claim 66 wherein said first extraction step extracts one or a plurality of pixels from each of said pupil picture and the storage picture, as said first pixel information, and wherein said feature value detection step uses the pixel values of said one or plural pixels to make still/moving decision of said subject pixel, while detecting the results of decision as said feature value.

76. The recording medium having recorded thereon a computer-readable program according to claim 75 wherein said first feature value detection step detects the differences of luminance values of said first picture and said storage picture by using the pixel value of said one or plural pixels and detects the calculated results as said feature value.

77. The recording medium having recorded thereon a computer-readable program according to claim 66 wherein said first extraction step extracts a first class tap from said pupil picture as said first pixel information, while extracting a second class tap from said storage picture; and wherein said feature value detection step makes still/moving decision of said subject pixel by using said first and second class taps and detects the results of decision and the distribution of pixel values of pixels making up said first class tap as said feature value.

78. The recording medium having recorded thereon a computer-readable program according to claim 66 wherein said second extraction step extracts prediction taps as said second pixel information.

\* \* \* \* \*